(12) United States Patent  (10) Patent No.: US 8,501,948 B2
Konemann  (45) Date of Patent: Aug. 6, 2013

(54) MULTIPLE CHROMOPHORES BASED ON RYLENE

(75) Inventor: Martin Konemann, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1080 days.

(21) Appl. No.: 11/996,074

(22) PCT Filed: Jul. 27, 2006

(86) PCT No.: PCT/EP2006/064733
§ 371 (c)(1),
(2), (4) Date: Jul. 30, 2008

(87) PCT Pub. No.: WO2007/014902
PCT Pub. Date: Feb. 8, 2007

(65) Prior Publication Data
US 2008/0287678 A1  Nov. 20, 2008

(30) Foreign Application Priority Data
Aug. 3, 2005 (DE) .......................... 10 2005 037 115

(51) Int. Cl.
C07D 221/18 (2006.01)
C07D 471/22 (2006.01)

(52) U.S. Cl.
USPC .................................. 546/33; 546/37; 546/26

(58) Field of Classification Search
USPC ..................................................... 546/33, 37
See application file for complete search history.

(56) References Cited

U.S. PATENT DOCUMENTS

| | | | |
|---|---|---|---|
| 5,405,962 A | | 4/1995 | Muellen et al. |
| 5,645,965 A | * | 7/1997 | Duff et al. .................... 430/58.8 |
| 5,808,073 A | | 9/1998 | Boehm et al. |
| 5,986,099 A | | 11/1999 | Muellen et al. |
| 6,124,458 A | | 9/2000 | Muellen et al. |
| 6,143,905 A | | 11/2000 | Boehm et al. |
| 6,326,494 B1 | | 12/2001 | Boehm et al. |
| 6,878,825 B2 | | 4/2005 | Krieger et al. |
| 7,138,522 B2 | | 11/2006 | Krieger et al. |
| 7,145,010 B2 | | 12/2006 | Boehm et al. |
| 2004/0068114 A1 | | 4/2004 | Krieger et al. |
| 2005/0222416 A1 | | 10/2005 | Bohm et al. |

FOREIGN PATENT DOCUMENTS

| DE | 101 08 156 | 8/2002 |
|---|---|---|
| DE | 102 12 358 | 10/2003 |
| DE | 10 2005 021 362 | 11/2006 |

(Continued)

OTHER PUBLICATIONS

Chang-Cheng You et al. Chemistry a European Journal (2006) 12(28):7510-7519.*

(Continued)

Primary Examiner — Nyeemah A Grazier

(74) Attorney, Agent, or Firm — Oblon, Spivak, McClelland, Maier & Neustadt, L.L.P.

(57) ABSTRACT

A rylene-based polychromophore of the general formula I

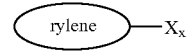

Figure 1:
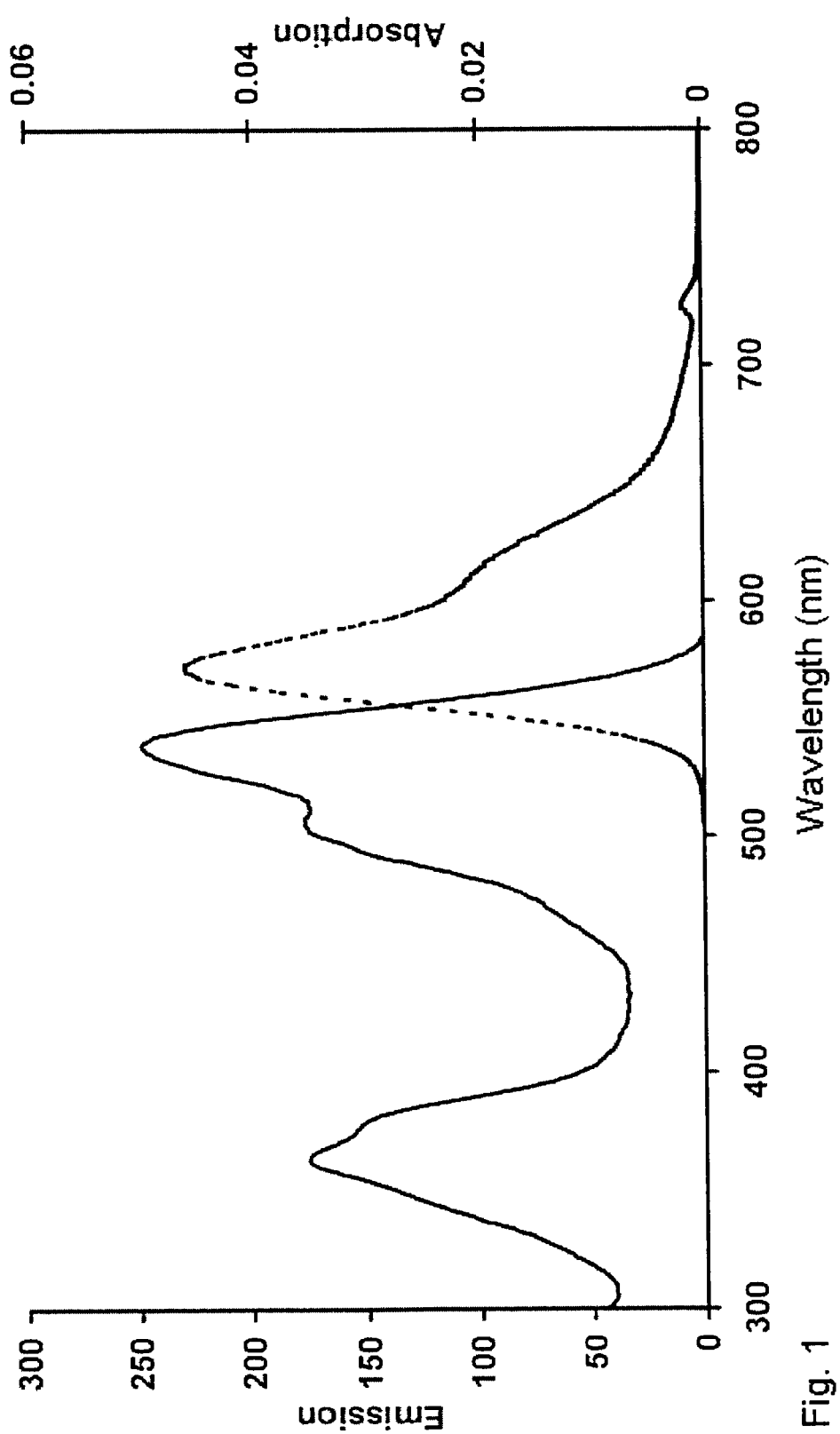

I in which the variables are each defined as follows:
rylene is a radical of the formula

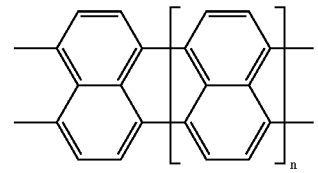

which has been functionalized by at least one imide group, ester group or amide group and which may additionally be substituted by aryloxy, arylthio, hetaryloxy and/or hetarylthio;

X is a rylenedicarboximide radical which absorbs at a different wavelength from the rylene radical, is bonded to the X radical in the peri-position via Y via a moiety

—Y'-A-Y—, is bonded to the rylene radical and may likewise be substituted by aryloxy, arylthio, hetaryloxy and/or hetarylthio;

A is a bridging member having at least one aromatic or heteroaromatic radical, the Y or Y and Y' groups being bonded to the aromatic or heteroaromatic radical;

Y is a moiety

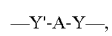 (i)

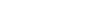

(ii)

Y' is a moiety

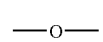 (i)

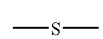

(ii)

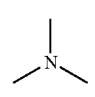

(iii)

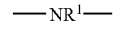

(iv)

where the moieties (i) and (ii) may be part of the ester groups of the rylene radical and the moieties (iii) are part of the imide groups of the rylene radical and the moieties (iv) are part of the amide groups of the rylene radical;

$R^1$ is hydrogen or $C_1$-$C_{18}$-alkyl, where the $R^1$ radicals may be the same or different when they occur repeatedly;
n is 1, 2 or 3;
x is from 1 to 7.

5 Claims, 6 Drawing Sheets

FOREIGN PATENT DOCUMENTS

| | | |
|---|---|---|
| DE | 10 2005 032 583 | 1/2007 |
| EP | 0 596 292 | 5/1994 |
| WO | WO 96/22331 | 7/1996 |
| WO | WO 96/22332 | 7/1996 |
| WO | WO 97/22607 | 6/1997 |
| WO | WO 02/066438 | 8/2002 |
| WO | WO 02/076988 | 10/2002 |
| WO | WO 03/104232 | 12/2003 |

OTHER PUBLICATIONS

U.S. Appl. No. 12/666,127, filed Dec. 22, 2009, Koenemann et al.

Fabian. Nolde, et al., "Synthesis and Modification of Terrylenediimides as High-Performance Fluorescent Dyes", XP-002365259, Chem. Eur. J. 2005, 11, pp. 3959-3967.

Frank Wuerthner, et al., "Core-Substituted Naphthalene Bisimides: New Fluorophors with Tunable Emission Wavelength fo FRET Studies", XP-002439542, Chem. Eur. J. 2002, 8, No. 20, pp. 4742-4750.

Peter Schlichting, et al. "A Bichromophore Based on Perylene and Terrylene for Energy Transfer Studies at the Single-Molecule Level", Chem. Eur. J. 1999, 5, No. 8, pp. 2388-2395.

Dr. K. Muellen, et al. "Shape—Persistent, Fluorescent Polyphenylene Dyads and a Triad for Efficeint Vectorial Transduction of Excitation Energy", Angewandte Chem. 2002, 114, No. 11, pp. 1980-1984.

Michael J. Ahrens, et al., "Self-Assembly of Supramolecular Light-Harvesting Arrays from Covalent Multi-Chromophore Perylene-3,4:9, 10-bis(dicarboximide) Building Blocks" J. Am. Chem. Soc. 2004, 126, pp. 8284-8294.

* cited by examiner

MULTIPLE CHROMOPHORES BASED ON RYLENE

The present invention relates to novel rylene-based polychromophores of the general formula I

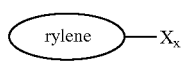

I in which the variables are each defined as follows:
rylene is a radical of the formula

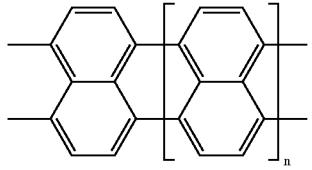

which has been functionalized by at least one imide group, ester group or amide group and which may additionally be substituted by aryloxy, arylthio, hetaryloxy and/or hetarylthio;

X is a rylenedicarboximide radical which absorbs at a different wavelength from the rylene radical, is bonded to the X radical in the peri-position via Y via a moiety

—Y'-A-Y— is bonded to the rylene radical and may likewise be substituted by aryloxy, arylthio, hetaryloxy and/or hetarylthio;

A is a bridging member having at least one aromatic or heteroaromatic radical, the Y or Y and Y' groups being bonded to the aromatic or heteroaromatic radical;

Y is a moiety

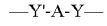

Y' is a moiety

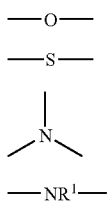

where the moieties (i) and (ii) may be part of the ester groups of the rylene radical and the moieties (iii) are part of the imide groups of the rylene radical and the moieties (iv) are part of the amide groups of the rylene radical;

$R^1$ is hydrogen or $C_1$-$C_{18}$-alkyl, where the $R^1$ radicals may be the same or different when they occur repeatedly;

n is 1, 2 or 3;

x is from 1 to 7.

The invention further relates to novel rylene dicarboximide derivatives of the general formula III

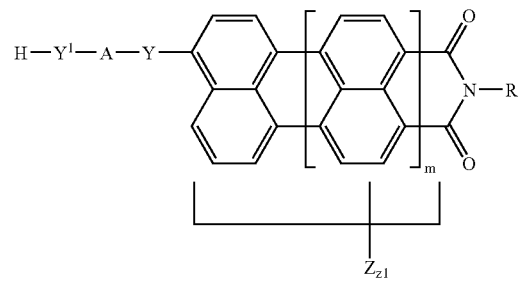

III in which the variables are each defined as follows:

Z is aryloxy, arylthio, hetaryloxy or hetarylthio, to each of which may be fused further saturated or unsaturated 5- to 7-membered rings whose carbon skeleton may be interrupted by one or more —O—, —S—, —NR¹—, —N═CR¹—, —CO—, —SO— and/or —SO₂— moieties, where the entire ring system may be mono- or polysubstituted by the (i), (ii), (iii), (iv) and/or (v) radicals:

(i) $C_1$-$C_{30}$-alkyl whose carbon chain may be interrupted by one or more —O—, —S—, —NR¹—, —N═CR¹—, —C≡C—, —CR¹═CR¹—, —CO—, —SO— and/or —SO₂— moieties and which may be mono- or polysubstituted by: $C_1$-$C_{12}$-alkoxy, $C_1$-$C_6$-alkylthio, —C≡CR¹, —CR¹═CR¹₂, hydroxyl, mercapto, halogen, cyano, nitro, —NR²R³, —NR²COR³, —CONR²R³, —SO₂NR²R³, —COOR², —SO₃R², aryl and/or saturated or unsaturated $C_4$-$C_7$-cycloalkyl whose carbon skeleton may be interrupted by one or more —O—, —S—, —NR¹—, —N═CR¹—, —CR¹═CR¹—, —CO—, —SO— and/or —SO₂— moieties, where the aryl and cycloalkyl radicals may each be mono- or polysubstituted by $C_1$-$C_{18}$-alkyl and/or the above radicals specified as substituents for alkyl;

(ii) $C_3$-$C_8$-cycloalkyl whose carbon skeleton may be interrupted by one or more —O—, —S—, —NR¹—, —N═CR¹—, —CR¹═CR¹—, —CO—, —SO— and/or —SO₂— moieties and to which may be fused further saturated or unsaturated 5- to 7-membered rings whose carbon skeleton may be interrupted by one or more —O—, —S—, —NR¹—, —N═CR¹—, —CR¹═CR¹—, —CO—, —SO— and/or —SO₂— moieties, where the entire ring system may be mono- or polysubstituted by: $C_1$-$C_{18}$-alkyl, $C_1$-$C_{12}$-alkoxy, $C_1$-$C_6$-alkylthio, —C≡CR¹, —CR¹═CR¹₂, hydroxyl, mercapto, halogen, cyano, nitro, —NR²R³, —NR²COR³, —CONR²R³, —SO₂NR²R³, —COOR² and/or —SO₃R²;

(iii) aryl or hetaryl, to which may be fused further saturated or unsaturated 5- to 7-membered rings whose carbon skeleton may be interrupted by one or more —O—, —S—, —NR¹—, —N═CR¹—, —CR¹═CR¹—, —CO—, —SO— and/or —SO₂— moieties, where the entire ring system may be mono- or polysubstituted by: $C_1$-$C_{18}$-alkyl, $C_1$-$C_{12}$-alkoxy, $C_1$-$C_6$-alkylthio, —C≡CR¹, —CR¹═CR¹₂, hydroxyl, mercapto, halogen, cyano, nitro, —NR²R³, —NR²COR³, —CONR²R³, —SO₂NR²R³, —COOR², —SO₃R², aryl and/or hetaryl, each of which may be mono- or polysubstituted by $C_1$-$C_{18}$-alkyl, $C_1$-$C_{12}$-alkoxy, hydroxyl, mercapto, halogen, cyano, nitro, —NR²R³, —NR²COR³, —CONR²R³, —SO₂NR²R³, —COOR² and/or —SO₃R²;

(iv) a —U-aryl radical which may be mono- or polysubstituted by the above radicals specified as substituents for the aryl radicals (iii), where U is an —O—, —S—, —NR$^1$—, —CO—, —SO— or —SO$_2$— moiety;

(v) C$_1$-C$_{12}$-alkoxy, C$_1$-C$_6$-alkylthio, —C≡CR$^1$, —CR$^1$=CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ or —SO$_3$R$^2$, where the Z radicals may be the same or different when z>1 and/or z1>1;

A is a bridging member having at least one aromatic or heteroaromatic radical, where the Y or Y and Y' groups are bonded to the aromatic or heteroaromatic radical;

Y is —O— or —S—;

Y$^1$ is —O—, —S— or —NR$^1$—;

R is hydrogen;

C$_1$-C$_{30}$-alkyl whose carbon chain may be interrupted by one or more —O—, —S—, —NR$^1$—, —N=CR$^1$—, —C≡C—, —CR$^1$=CR$^1$—, —CO—, —SO— and/or —SO$_2$— moieties and which may be mono- or polysubstituted by the (ii), (iii), (iv) and/or (v) radicals specified as substituents for the Z radicals;

C$_3$-C$_8$-cycloalkyl to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by the (i), (ii), (iii), (iv) and/or (v) radicals specified as substituents for the Z radicals;

aryl or hetaryl, to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by the (i), (ii), (iii), (iv), (v) radicals specified as substituents for the Z radicals, and/or aryl- and/or hetarylazo, each of which may be mono- or polysubstituted by C$_1$-C$_{10}$-alkyl, C$_1$-C$_6$-alkoxy and/or cyano;

where the R radicals may be the same or different when they occur repeatedly in formula I;

R' is hydrogen or C$_1$-C$_{18}$-alkyl, where the R$^1$ radicals may be the same or different when they occur more than once;

R$^2$, R$^3$ are each independently hydrogen;

C$_1$-C$_{18}$-alkyl whose carbon chain may be interrupted by one or more —O—, —S—, —CO—, —SO— and/or —SO$_2$— moieties and which may be mono- or polysubstituted by C$_1$-C$_{12}$-alkoxy, C$_1$-C$_6$-alkylthio, hydroxyl, mercapto, halogen, cyano, nitro and/or —COOR$^1$;

aryl or hetaryl, to each of which may be fused further saturated or unsaturated 5 to 7-membered rings whose carbon skeleton may be interrupted by one or more —O—, —S—, —CO— and/or —SO$_2$— moieties, where the entire ring system may be mono- or polysubstituted by C$_1$-C$_{12}$-alkyl and/or the above radicals specified as substituents for alkyl;

m is 0, 1 or 2;

z1 when m=0: 0;

when m=1: from 0 to 2;

when m=2: from 2 to 4.

as intermediates for the polychromophores 1.

The invention also relates to processes for preparing the polychromophores I and the rylenedicarboximide derivatives 1 μl.

The invention finally relates to the use of the polychromophores I for coloring organic and inorganic materials, for producing aqueous polymer dispersions which absorb and/or emit electromagnetic radiation, for obtaining markings and inscriptions invisible to the human eye, as filters or emitters in display applications, as emitters in chemiluminescence applications and as active components in photovoltaics.

Rylene chromophores, especially the rylenetetracarboximides and -dicarboximides, constitute a chemically very stable class of special effect substances and are therefore of interest for many technical fields of application. The chromophores based on perylene and terrylene are notable especially for their fluorescence properties, while it is in particular their absorption in the near infrared region of the electromagnetic spectrum that is of significance in the case of the higher homologs.

The rylene chromophores are known and described, for example, in EP-A-596 292, WO-A-96/22331, 96/22332, 97/22607, 02/66438, 02/76988 and 03/104232 and the prior German patent applications 10 2005 021 362.6 and 10 2005 032 583.1.

Modification of their absorption behavior allows the action of the rylene chromophores to be improved even further. For instance, extension of the absorbed spectral region is advantageous for many applications, for example for optimal utilization of the fluorescence effect in daylight. This extension can be achieved advantageously by joining differently absorbing chromophores to one another via chemical bonds. In these polychromophores, the energy is absorbed by the chromophore absorbing at the shorter wavelength to the chromophore absorbing at the longer wavelength.

Chem. Eur. J. 5, page 2388-2395 (1999) describes bichromophores based on terrylene/perylene, in which a peri-hexyl-substituted perylene is bonded via a hexamethylene radical to the second imide nitrogen atom of N-(2,6-diisopropylphenyl)-1,6-di(4-tertoctylphenoxy)terrylenetetracarboximide.

The bichromophores described in DE-A-102 12 358 are also based on perylenetetracarboximides which are bonded to an imide nitrogen via an ester or amide function or directly with a chromophore absorbing at a shorter wavelength from the group of anthraquinone, anthracene, naphthalene, pyrene or fluorene.

Dendritic polychromophores are known from Angew. Chem. 114, 1980-1984 (2002). Here, a central N,N'-bis(2,6-diisopropylphenoxy)terrylentetracarboximide molecule is combined with 4 or 8 N-(2,6-diisopropylphenyl)perylenedicarboximide molecules or with 4 N-(2,6-diisopropylphenyl)perylenedicarboximide molecules and 8 N-(2,6-diisopropylphenyl)naphthalenedicarboximide molecules. The bonding here is via (pentaphenyl)phenyl units.

Chem. Eur. 8, 4742-4750 (2002) describes bichromophores based on two naphthalenetetracarboximides bridged via an amide function, in which the chromophoric system of a diimide has been modified by introducing butylamino substituents in order to shift its absorption bathochromically.

Finally, J. Am. Chem. Soc. 126, 8284-8294 (2004) describes bichromophores based on differently substituted perylenetetracarboximides in which the outer chromophores are bonded via phenylene bridges to the imide nitrogen atoms and directly to the rylene skeleton of the central chromophore.

The known polychromophores which are of particular interest owing to their absorption and emission properties are obtainable only by complicated, multistage syntheses using protecting group chemistry.

It was therefore an object of the invention to provide polychromophores which can be prepared in a manner advantageous in process technology terms, especially also on the industrial scale, via few synthetic stages, and whose absorption and emission properties can be adjusted in a controlled manner to the particular application.

Accordingly, the polychromophores of the formula I

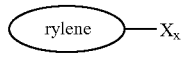  I have been found.

The inventive polychromophores I consist of the rylene chromophore based on perylene, terrylene or quaterrylene, to which at least one rylenedicarboximide which absorbs at a different wavelength to the rylene chromophore is bonded as a further chromophore X.

The X chromophore may have the same number of naphthalene units as the rylene chromophore, but then has to differ from it by the type of substitution (different or more or less substituents), so that the wavelength of its absorption is shifted compared to that of the rylene chromophore.

The X chromophore preferably differs from the rylene chromophore in the number of naphthalene units. The X chromophore is more preferably the next lowest homolog in each case, i.e. a naphthalene-, perylene- or terrylenedicarboximide.

The rylene chromophore of the inventive polychromophores has been functionalized by at least one imide, ester or amide group or by two preferably identical groups. Preference is given to the rylenetetracarboximides, rylenedicarboxylic esters, rylenedicarboxamides and rylenedicarboximides, particular preference being given to the rylenetetracarboximides and rylenedicarboximides and very particular preference being given to the rylenetetracarboximides.

The X chromophore is joined to the rylene chromophore in the peri-position via the moiety

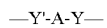

which is bonded to X via Y (—O— or —S—).

The X chromophore may be bonded to the carbon skeleton of the rylene chromophore or via the groups which functionalize it.

The bonding to the carbon skeleton is via an —O— or —S— moiety (Y'=(i) or (ii)). The bonding via the functionalizing groups is possible in various ways. For instance, Y' may be part of the imide group (Y'=(iii)), of the amide group (Y'=(iv)) or of the ester group (Y'=(i) or (ii)).

The bridging member A joining the Y and Y' moieties has at least one aromatic or heteroaromatic radical to which Y and Y' are bonded.

A is preferably an arylene or hetarylene radical of the formulae

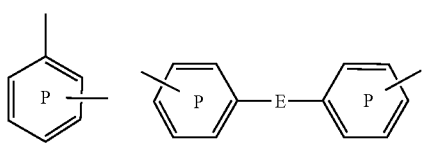

in which the rings P may be the same or different, may comprise heteroatoms as ring atoms and/or may have fused 5- to 7-membered rings whose carbon skeleton may be interrupted by one or more —O—, —S—, —NR$^1$—, —N═CR$^1$—, —CR$^1$═CR$^1$—, —CO—, —SO— and/or —SO$_2$— moieties, where the entire ring system may be mono- or polysubstituted by the (i), (ii), (iii) and/or (v) radicals specified as substituents for the Z radicals.

E is:

a chemical bond;

an —O—, —S—, —NR$^1$—, —N═CR$^1$—, —C≡C—, —CR$^1$═CR$^1$—, —CO—, —SO— or —SO$_2$— moiety or $C_1$-$C_{12}$-alkylene or $C_4$-$C_7$-cycloalkylene whose carbon chain may in each case be interrupted once or more than once by these moieties and which may each be mono- or polysubstituted by the (i), (ii), (iii) and/or (v) radicals specified as substituents for the Z radicals; arylene or hetarylene, each of which may likewise be mono- or polysubstituted by the (i), (ii), (iii) and/or (v) radicals, hydroxyl and mercapto being excluded as (v) radicals.

Particularly preferred bridging members A are arylene radicals of the formulae

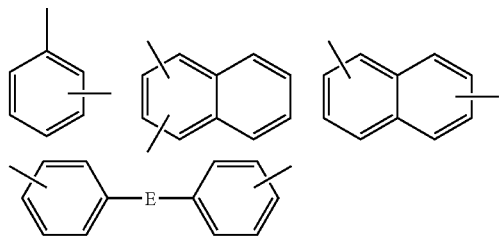

in which the phenylene or naphthylene rings may be mono- or polysubstituted by $C_1$-$C_{18}$-alkyl and E is a chemical bond, methylene or isopropylene.

Specific examples of particularly preferred bridging members A are:

1,4-, 1,3- and 1,2-phenylene, 1,4-[2,5-di(tert-butyl)]phenylene, 1,4-(2,5-dihexyl)phenylene, 1,4-[2,5-di(tert-octyl)]phenylene, 1,4-(2,5-didodecyl)phenylene, 1,4-[2,5-di(2-dodecyl)]phenylene, 1,4- and 1,8-naphthylene, 4,4'-, 3,3'- and 2,2'-biphenylene, 4,4'-di(2,2',6,6'-tetramethyl)phenylene, 4,4'-di(2,2',6,6'-tetraethyl)phenylene, 4,4'-di(2,2',6,6'-tetraisopropyl)phenylene, 4,4'-di(2,2',6,6'-tetrahexyl)phenylene, 4,4'-di[2,2',6,6'-tetra(2-hexyl)]phenylene, 4,4'-di[2,2',6,6'-tetra(tert-octyl)]phenylene, 4,4'-di(2,2',6,6'-tetradodecyl)phenylene and 4,4'-di[2,2',6,6'-tetra(2-dodecyl)]phenylene and

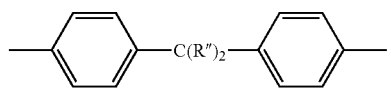

where R" is hydrogen, methyl, ethyl or phenyl.

Very particularly preferred bridging members A are 1,4-phenylene and 4,4'-di(2,2',6,6'-tetramethyl)phenylene.

The rylene chromophore and/or the X chromophore may also be substituted in the rylene skeleton by (het)aryloxy or (het)arylthio radicals.

Examples of particularly suitable substituents include phenoxy, thiophenoxy, 2-naphthoxy, 2-naphthylthio, 2-, 3- and 4-pyridyloxy, 2-, 3- and 4-pyridylthio, 2-, 4- and 5-pyrimidyloxy and 2-, 4- and 5-pyrimidylthio, preference being given to phenoxy and thiophenoxy and particular preference being given to phenoxy.

The introduction of these substituents allows the particular chromophoric system to be enlarged and hence the absorption to be shifted bathochromically in a controlled manner.

The (het)aryloxy or (het)arylthio radicals themselves may in turn be substituted as desired. Suitable substituents are listed below in the description of the preferred inventive polychromophores.

Controlled substitution of the (het)aryloxy or (het)arylthio radicals additionally allows the shape of the absorption band of the particular chromophore to be influenced. For instance, (het)aryloxy or (het)arylthio radicals substituted in the ortho, ortho'-position bring about an increase in the fluorescence quantum yields, which is why these radicals are of particular interest as substituents for the chromophore absorbing and emitting at longer wavelength. Rylenetetra- and -dicarboxylic acid derivatives substituted by these radicals are described in the prior German patent application 10 2005 032 583.1.

Particularly suitable ortho,ortho'-substituted phenoxy and thiophenoxy radicals have the formula

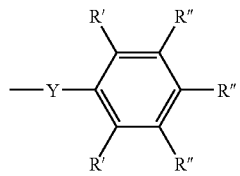

in which the variables are each defined as follows:
Y is —O— or —S—, preferably —O—;
R' are identical or different radicals:
(i) $C_1$-$C_{18}$-alkyl, whose carbon chain may be interrupted by one or more —O—, —S—, —NR$^1$— and/or —CO— moieties and which may be mono- or polysubstituted by $C_1$-$C_{12}$-alkoxy, hydroxyl and/or halogen, where not more than one alkyl radical R' may have a tertiary carbon atom in the 1-position,
(ii) $C_3$-$C_8$-cycloalkyl, which may be mono- or polysubstituted by $C_1$-$C_{18}$-alkyl and/or $C_1$-$C_{12}$-alkoxy, where not more than one alkyl radical R' may have a tertiary carbon atom in the 1-position,
(iii) aryl or hetaryl, each of which may be mono- or polysubstituted by $C_1$-$C_{18}$-alkyl, $C_1$-$C_{12}$-alkoxy, hydroxyl and/or halogen;
(iv) a —U-aryl radical which may be mono- or polysubstituted by the above radicals specified as substituents for the aryl radicals (iii), where U is an —O—, —S— or —NR$^1$— moiety;
(v) $C_1$-$C_{12}$-alkoxy, hydroxyl, halogen or cyano;
R" are identical or different radicals:
hydrogen;
one of the (i), (ii), (iii), (iv) and (v) radicals specified for R', where the alkyl radicals (i) and the cycloalkyl radicals (ii) may have tertiary carbon atoms in the 1-position;
R$^1$ is hydrogen or $C_1$-$C_6$-alkyl.

Very particularly preferred R' radicals are the alkyl, cycloalkyl and phenyl radicals, in particular the alkyl radicals R' with a secondary or primary carbon atom in the 1-position, and also methyl and the cycloalkyl radicals R' with a secondary carbon atom in the 1-position, where particular emphasis should be given to the alkyl and cycloalkyl radicals with a secondary carbon atom in the 1-position.

These phenoxy and thiophenoxy radicals are preferably substituted only in the ortho- and ortho'-position or additionally in the para-position.

Specific examples of very particularly preferred phenoxy and thiophenoxy radicals include:
2,6-dimethylphenoxy, 2,6-diethylphenoxy, 2,6-diisopropylphenoxy, 2,6-di(2-butyl)phenoxy, 2,6-di(n-butyl)phenoxy, 2,6-di(2-hexyl)phenoxy, 2,6-di(n-hexyl)phenoxy, 2,6-di(2-dodecyl)phenoxy, 2,6-di(n-dodecyl)phenoxy, 2,6-dicyclohexylphenoxy, 2,6-diphenylphenoxy, 2,6-di-methyl-4-(n-butyl)phenoxy, 2,6-diethyl-4-(n-butyl)phenoxy, 2,6-diisopropyl-4-(n-butyl)phenoxy, 2,6-di(2-butyl)-4-(n-butyl) phenoxy, 2,4,6-tri(n-butyl)phenoxy, 2,6-di(2-hexyl)-4-(n-butyl)phenoxy, 2,6-di(n-hexyl)-4-(n-butyl)phenoxy, 2,6-di (2-dodecyl)-4-(n-butyl)-phenoxy, 2,6-di(n-dodecyl)-4-(n-butyl)phenoxy, 2,6-dicyclohexyl-4-(n-butyl)phenoxy, 2,6-diphenyl-4-(n-butyl)phenoxy, 2,6-dimethyl-4-(n-nonyl) phenoxy, 2,6-diethyl-4-(n-nonyl)phenoxy, 2,6-diisopropyl-4-(n-nonyl)phenoxy, 2,6-di(2-butyl)-4-(n-nonyl)phenoxy, 2,6-di(2-butyl)-4-(n-nonyl)phenoxy, 2,6-di(2-hexyl)-4-(n-nonyl)phenoxy, 2,6-di(n-hexyl)-4-(n-nonyl)phenoxy, 2,6-di (2-dode-cyl)-4-(n-nonyl)phenoxy, 2,6-di(n-dodecyl)-4-(n-nonyl)phenoxy, 2,6-dicyclohexyl-4-(n-nonyl)phenoxy, 2,6-diphenyl-4-(n-nonyl)phenoxy, 2,6-dimethyl-4-(n-octadecyl) phenoxy, 2,6-diethyl-4-(n-octadecyl)-phenoxy, 2,6-diisopropyl-4-(n-octadecyl)phenoxy, 2,6-di(2-butyl)-4-(n-octadecyl)phen-oxy, 2,6-di(2-butyl)-4-(n-octadecyl) phenoxy, 2,6-di(2-hexyl)-4-(n-octadecyl)phenoxy, 2,6-di(n-hexyl)-4-(n-octadecyl)phenoxy, 2,6-di(2-dodecyl)-4-(n-octadecyl)phenoxy, 2,6-di(n-dodecyl)-4-(n-octadecyl) phenoxy, 2,6-dicyclohexyl-4-(n-octadecyl)phenoxy, 2,6-dimethyl-4-(tert-butyl)phenoxy, 2,6-diethyl-4-(tertbutyl) phenoxy, 2,6-diisopropyl-4-(tert-butyl)phenoxy, 2,6-di(2-butyl)-4-(tertbutyl)phenoxy, 2,6-di-(n-butyl)-4-(tert-butyl) phenoxy, 2,6-di(2-hexyl)-4-(tertbutyl)phenoxy, 2,6-di(n-hexyl)-4-(tert-butyl)-phenoxy, 2,6-di(2-dodecyl)-4-(tertbutyl)phenoxy, 2,6-di(n-dodecyl)-4-(tert-butyl)-phenoxy, 2,6-dicyclohexyl-4-(tertbutyl)phenoxy, 2,6-diphenyl-4-(tert-butyl)phenoxy, 2,6-dimethyl-4-(tert-octyl) phenoxy, 2,6-diethyl-4-(tert-octyl)phenoxy, 2,6-diisopropyl-4-(tert-octyl)phenoxy, 2,6-di(2-butyl)-4-(tert-octyl)phenoxy, 2,6-di(n-butyl)-4-(tert-octyl)phenoxy, 2,6-di(2-hexyl)-4-(tert-octyl)phenoxy, 2,6-di(n-hexyl)-4-(tert-octyl)phenoxy, 2,6-di(2-dodecyl)-4-(tert-octyl)phenoxy, 2,6-di(n-dodecyl)-4-(tert-octyl)phenoxy, 2,6-dicyclohexyl-4-(tert-octyl)phenoxy and 2,6-diphenyl-4-(tert-octyl)phenoxy;
2,6-dimethylthiophenoxy, 2,6-diethylthiophenoxy, 2,6-diisopropylthiophenoxy, 2,6-di(2-butyl)thiophenoxy, 2,6-di(n-butyl)thiophenoxy, 2,6-di(2-hexyl)thiophenoxy, 2,6-di(n-hexyl)thiophenoxy, 2,6-di(2-dodecyl)thiophenoxy, 2,6-di(n-dodecyl)thiophenoxy, 2,6-dicyclohexylthiophenoxy, 2,6-diphenylthiophenoxy, 2,6-dimethyl-4-(n-butyl)thiophenoxy, 2,6-diethyl-4-(n-butyl)thiophenoxy, 2,6-diisopropyl-4-(n-butyl)thiophenoxy, 2,6-di(2-butyl)-4-(n-butyl)-thiophenoxy, 2,4,6-tri(n-butyl)thiophenoxy, 2,6-di(2-hexyl)-4-(n-butyl) thiophenoxy, 2,6-di(n-hexyl)-4-(n-butyl)thiophenoxy, 2,6-di (2-dodecyl)-4-(n-butyl)thiophenoxy, 2,6-di(n-dodecyl)-4-(n-butyl)thiophenoxy, 2,6-dicyclohexyl-4-(n-butyl) thiophenoxy, 2,6-diphenyl-4-(n-butyl)phenoxy, 2,6-dimethyl-4-(n-nonyl)thiophenoxy, 2,6-diethyl-4-(n-nonyl) thiophenoxy, 2,6-diisopropyl-4-(n-nonyl)thiophenoxy, 2,6-di(2-butyl)-4-(n-nonyl)thiophenoxy, 2,6-di(2-butyl)-4-(n-nonyl)thiophenoxy, 2,6-di(2-hexyl)-4-(n-nonyl) thiophenoxy, 2,6-di(n-hexyl)-4-(n-nonyl)thiophenoxy, 2,6-di(2-dodecyl)-4-(n-nonyl)thiophenoxy, 2,6-di(n-dodecyl)-4-(n-nonyl)thiophenoxy, 2,6-dicyclohexyl-4-(n-nonyl) thiophenoxy, 2,6-diphenyl-4-(n-nonyl)phenoxy, 2,6-(dimethyl)-4-(n-octadecyl)-thiophenoxy, 2,6-(diethyl)-4-(n-octadecyl)thiophenoxy, 2,6-diisopropyl-4-(n-octadecyl)-thiophenoxy, 2,6-di(2-butyl)-4-(n-octadecyl)thiophenoxy, 2,6-di(2-butyl)-4-(n-octadecyl)thiophenoxy, 2,6-di(2-hexyl)-4-(n-octadecyl)thiophenoxy, 2,6-di(n-hexyl)-4-(n-octa-decyl)thiophenoxy, 2,6-di(2-dodecyl)-4-(n-octadecyl) thiophenoxy, 2,6-di(n-dodecyl)-4-(n-octadecyl)

thiophenoxy, 2,6-dicyclohexyl-4-(n-octadecyl)thiophenoxy, 2,6-dimethyl-4-(tert-butyl)thiophenoxy, 2,6-diethyl-4-(tert-butyl)thiophenoxy, 2,6-diisopropyl-4-(tert-butyl)thiophenoxy, 2,6-di(2-butyl)-4-(tert-butyl)thiophenoxy, 2,6-di-(n-butyl)-4-(tert-butyl)thiophenoxy, 2,6-di(2-hexyl)-4-(tert-butyl)thiophenoxy, 2,6-di(n-hexyl)-4-(tert-butyl)thiophenoxy, 2,6-di(2-dodecyl)-4-(tert-butyl)thiophenoxy, 2,6-di(n-dodecyl)-4-(tert-butyl)thiophenoxy, 2,6-dicyclohexyl-4-(tert-butyl)thiophenoxy, 2,6-diphenyl-4-(tert-butyl)thiophenoxy, 2,6-dimethyl-4-(tert-octyl)thiophenoxy, 2,6-diethyl-4-(tert-octyl)thiophenoxy, 2,6-diisopropyl-4-(tert-octyl)thiophenoxy, 2,6-di(2-butyl)-4-(tert-octyl)thiophenoxy, 2,6-di-(n-butyl)-4-(tert-octyl)thiophenoxy, 2,6-di(2-hexyl)-4-(tert-octyl)thiophenoxy, 2,6-di(n-hexyl)-4-(tert-octyl)thiophenoxy, 2,6-di(2-dodecyl)-4-(tert-octyl)thiophenoxy, 2,6-di(n-dodecyl)-4-(tert-octyl)thiophenoxy, 2,6-dicyclohexyl-4-(tert-octyl)thiophenoxy and 2,6-diphenyl-4-(tert-octyl)thiophenoxy.

A preferred group of the inventive polychromophores has the general formula I'

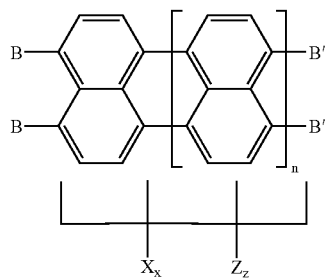

in which the variables are each defined as follows:

X is a rylenedicarboximide radical of the formula

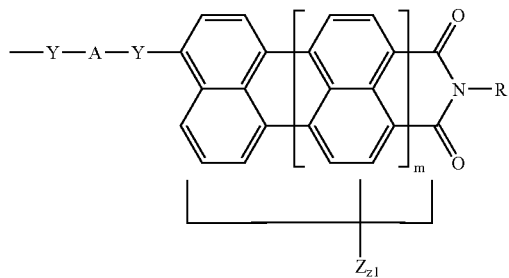

where the X radicals may be the same or different;

Z is aryloxy, arylthio, hetaryloxy or hetarylthio, to each of which may be fused further saturated or unsaturated 5- to 7-membered rings whose carbon skeleton may be interrupted by one or more —O—, —S—, —NR$^1$—, —N═CR$^1$—, —CO—, —SO— and/or —SO$_2$— moieties, where the entire ring system may be mono- or polysubstituted by the (i), (ii), (iii), (iv) and/or (v) radicals:

(i) $C_1$-$C_{30}$-alkyl whose carbon chain may be interrupted by one or more —O—, —S—, —NR$^1$—, —N═CR$^1$—, —C≡C—, —CR$^1$═CR$^1$—, —CO—, —SO— and/or —SO$_2$— moieties and which may be mono- or polysubstituted by: $C_1$-$C_{12}$-alkoxy, $C_1$-$C_6$-alkylthio, —C≡CR$^1$, —CR$^1$═CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or saturated or unsaturated $C_4$-$C_7$-cycloalkyl whose carbon skeleton may be interrupted by one or more —O—, —S—, —NR$^1$—, —N═CR$^1$—, —CR$^1$═CR$^1$—, —CO—, —SO— and/or —SO$_2$— moieties, where the aryl and cycloalkyl radicals may each be mono- or polysubstituted by $C_1$-$C_{18}$-alkyl and/or the above radicals specified as substituents for alkyl;

(ii) $C_3$-$C_8$-cycloalkyl whose carbon skeleton may be interrupted by one or more —O—, —S—, —NR$^1$—, —N═CR$^1$—, —CR$^1$═CR$^1$—, —CO—, —SO— and/or —SO$_2$— moieties and to which may be fused further saturated or unsaturated 5- to 7-membered rings whose carbon skeleton may be interrupted by one or more —O—, —S—, —NR$^1$—, —N═CR$^1$—, —CR$^1$═CR$^1$—, —CO—, —SO— and/or —SO$_2$— moieties, where the entire ring system may be mono- or polysubstituted by: $C_1$-$C_{18}$-alkyl, $C_1$-$C_{12}$-alkoxy, $C_1$-$C_6$-alkylthio, —C≡CR$^1$, —CR$^1$═CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iii) aryl or hetaryl, to which may be fused further saturated or unsaturated 5- to 7-membered rings whose carbon skeleton may be interrupted by one or more —O—, —S—, —NR$^1$—, —N═CR$^1$—, —CR$^1$═CR$^1$—, —CO—, —SO— and/or —SO$_2$— moieties, where the entire ring system may be mono- or polysubstituted by: $C_1$-$C_{18}$-alkyl, $C_1$-$C_{12}$-alkoxy, $C_1$-$C_6$-alkylthio, —C≡CR$^1$, —CR$^1$═CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or hetaryl, each of which may be mono- or polysubstituted by $C_1$-$C_{18}$-alkyl, $C_1$-$C_{12}$-alkoxy, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iv) a —U-aryl radical which may be mono- or polysubstituted by the above radicals specified as substituents for the aryl radicals (iii), where U is an —O—, —S—, —NR$^1$—, —CO—, —SO— or —SO$_2$— moiety;

(v) $C_1$-$C_{12}$-alkoxy, $C_1$-$C_6$-alkylthio, —C≡CR$^1$, —CR$^1$═CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ or —SO$_3$R$^2$, where the Z radicals may be the same or different when z>1 and/or z1>1;

B' when n=1, 2 or 3:

are joined together with formation of a six-membered ring to give a radical of the formula (a) or (b)

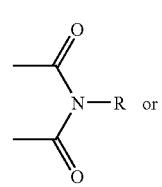

-continued

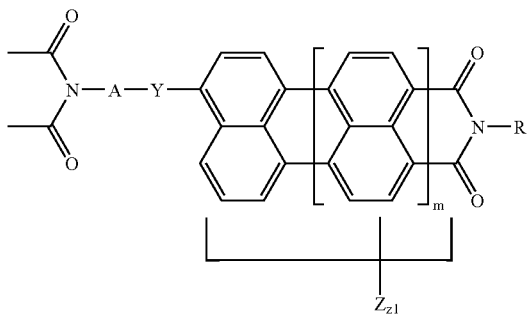
(b)

or
one B radical is hydrogen and the other radical is an X radical;
when n=1, additionally:
both are hydrogen, one B radical is hydrogen and the other radical is Z, or one B radical is hydrogen, halogen or cyano and the other radical is a radical of the formula (c)

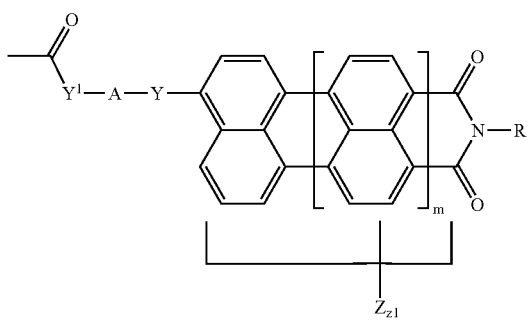
(c)

B', when n=1, 2 or 3:
are joined to one another with formation of a six-membered ring to give a radical of the formula (a) when the B radicals together are a radical of the formula (a);
are joined together with formation of a six-membered ring to give a radical of the formula (a) when one B radical is hydrogen and the other radical is an X radical, where, when n=2 or 3: x=0 and z≠0;
are joined together with formation of a six-membered ring to give a radical of the formula (b) when the B radicals together are a radical of the formula (a) or (b), or one B radical is hydrogen and the other radical is an X or Z radical, where,
when n=2 or 3, x=0 and z≠0;
when n=1, additionally:
are joined together with formation of a six-membered ring to give a radical of the formula (a) or (b) when one B radical is hydrogen and the other radical is a Z radical;
one B' radical is hydrogen, halogen or cyano and the other radical is a radical of the formula (c) when one B radical is hydrogen, halogen or cyano and the other radical is a radical of the formula (c);
A is a bridging member having at least one aromatic or heteroaromatic radical, where the Y or Y and Y' groups are bonded to the aromatic or heteroaromatic radical;
Y is —O— or —S—;
$Y^1$ is —O—, —S— or —$NR^1$—;

R is hydrogen;
$C_1$-$C_{30}$-alkyl whose carbon chain may be interrupted by one or more —O—, —S—, —$NR^1$—, —N=$CR^1$—, —C≡C—, —$CR^1$=$CR^1$—, —CO—, —SO— and/or —$SO_2$— moieties and which may be mono- or polysubstituted by the (ii), (iii), (iv) and/or (v) radicals specified as substituents for the Z radicals;
$C_3$-$C_8$-cycloalkyl to which may be fused further saturated or unsaturated 5- to 7-membered rings whose carbon skeleton may be interrupted by one or more —O—, —S—, —$NR^1$—, —N=$CR^1$—, —$CR^1$=$CR^1$—, —CO—, —SO— and/or —$SO_2$— moieties, where the entire ring system may be mono- or polysubstituted by the (i), (ii), (iii), (iv) and/or (v) radicals specified as substituents for the Z radicals;
aryl or hetaryl, to which may be fused further saturated or unsaturated 5- to 7-membered rings whose carbon skeleton may be interrupted by one or more —O—, —S—, —$NR^1$—, —N=$CR^1$—, —$CR^1$=$CR^1$—, —CO—, —SO— and/or —$SO_2$— moieties, where the entire ring system may be mono- or polysubstituted by the (i), (ii), (iii), (iv), (v) radicals specified as substituents for the Z radicals, and/or aryl- and/or hetarylazo, each of which may be mono- or polysubstituted by $C_1$-$C_{10}$-alkyl, $C_1$-$C_6$-alkoxy and/or cyano;
where the R radicals may be the same or different when they occur repeatedly in formula I;
$R^1$ is hydrogen or $C_1$-$C_{18}$-alkyl, where the $R^1$ radicals may be the same or different when they occur more than once;
$R^2$, $R^3$ are each independently hydrogen;
$C_1$-$C_{18}$-alkyl whose carbon chain may be interrupted by one or more —O—, —S—, —CO—, —SO— and/or —$SO_2$— moieties and which may be mono- or polysubstituted by $C_1$-$C_{12}$-alkoxy, $C_1$-$C_6$-alkylthio, hydroxyl, mercapto, halogen, cyano, nitro and/or —$COOR^1$;
aryl or hetaryl, to each of which may be fused further saturated or unsaturated 5- to 7-membered rings whose carbon skeleton may be interrupted by one or more —O—, —S—, —CO— and/or —$SO_2$— moieties, where the entire ring system may be mono- or polysubstituted by $C_1$-$C_{12}$-alkyl and/or the above radicals specified as substituents for alkyl;
n is 1, 2 or 3;
m is 0, 1 or 2;
x, when n=1:
is from 2 to 4 or else 0 when the B radicals and the B' radicals are each a radical of the formula (b) or one B radical and one B' radical are each a radical of the formula (c);
when n=2:
is from 2 to 6 when the B radicals and the B' radicals are each a radical of the formula (a);
is 0 for all further definitions of the B and B' radicals;
when n=3:
is from 2 to 4 when the B radicals and the B' radicals are each a radical of the formula (a);
is 0 for all further definitions of the B and B' radicals;
z is from 0 to 8, where x+z≦8, and, when n=2 or 3: z≠0 when x=0;
z1 when m=0: 0;
when m=1: from 0 to 2;
when m=2: from 2 to 4.
In particularly preferred polychromophores of the formula I', the variables are each defined as follows:
Z is phenoxy or thiophenoxy, each of which may be mono- or polysubstituted by identical or different (i), (ii), (iii), (iv) and/or (v) radicals:

(i) $C_1$-$C_{30}$-alkyl whose carbon chain may be interrupted by one or more —O—, —S—, —NR$^1$—, —C≡C—, —CR$^1$=CR$^1$— and/or —CO— and/or —SO$_2$— moieties and which may be mono- or polysubstituted by: $C_1$-$C_{12}$-alkoxy, hydroxyl, halogen, cyano, and/or aryl which may be mono- or polysubstituted by $C_1$-$C_{18}$-alkyl and/or $C_1$-$C_6$-alkoxy;

(ii) $C_3$-$C_8$-cycloalkyl whose carbon skeleton may be interrupted by one or more —O—, —S—, —NR$^1$—, —CR$^1$=CR$^1$— and/or —CO— moieties and which may be mono- or polysubstituted by $C_1$-$C_{18}$-alkyl, $C_1$-$C_{12}$-alkoxy and/or $C_1$-$C_6$-alkylthio;

(iii) aryl or hetaryl, to which may be fused further saturated or unsaturated 5- to 7-membered rings whose carbon skeleton may be interrupted by one or more O—, —S—, —NR$^1$—, —N=CR$^1$—, —CR$^1$=CR$^1$—, —CO—, —SO— and/or —SO$_2$— moieties, where the entire ring system may be mono- or polysubstituted by: $C_1$-$C_{18}$-alkyl, $C_1$-$C_{12}$-alkoxy, —C≡CR$^1$, —CR$^1$=CR$^1$, hydroxyl, halogen, cyano, —NR$^2$R$^3$, —NR$^2$COR$^3$, —CONR$^2$R$^3$, —SO$_2$NR$^2$R$^3$, —COOR$^2$ and/or —SO$_3$R$^2$, aryl and/or hetaryl, each of which may be mono- or polysubstituted by $C_1$-$C_{18}$-alkyl, $C_1$-$C_{18}$-alkoxy and/or cyano;

(iv) a —U-aryl radical which may be mono- or polysubstituted by the above radicals specified as substituents for the aryl radicals (iii), where U is an —O—, —S—, —NR$^1$—, —CO—, —SO— or —SO$_2$— moiety;

(v) $C_1$-$C_{12}$-alkoxy, $C_1$-$C_6$-alkylthio, —C≡CR$^1$, —CR$^1$=CR$^1_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ or —SO$_3$R$^2$, where the Z radicals may be the same or different when z>1 and/or z1>1;

A is an arylene or hetarylene radical of the formulae

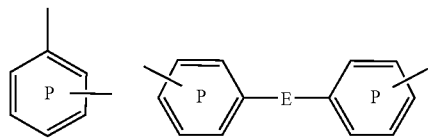

in which the rings P may be the same or different, may comprise heteroatoms as ring atoms and/or may have fused 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by (i), (ii), (iii) and/or (v) radicals specified as substituents for the Z radicals, where the A radicals may be the same or different when they occur repeatedly in formula I;

E is a chemical bond, an —O—, —S—, —NR$^1$—, —N=CR$^1$—, —C≡C—, —CR$^1$=CR$^1$—, —CO—, —SO— or —SO$_2$— moiety or $C_1$-$C_{12}$-alkylene or $C_4$-$C_7$-cycloalkylene, whose carbon chain may in each case be interrupted once or more than once by these moieties and which may each be mono- or polysubstituted by the (i), (ii), (iii) and/or (v) radicals specified as substituents for the Z radicals;

arylene or hetarylene, each of which may be mono- or polysubstituted by the (i), (ii), (iii) and/or (v) radicals specified as substituents for the Z radicals, where hydroxyl and mercapto are excluded as (v) radicals;

Y is —O—;

Y$^1$ is —O— or —NR$^1$—;

R is $C_1$-$C_{30}$-alkyl whose carbon chain may be interrupted by one or more —O— and/or —CO— moieties and which may be mono- or polysubstituted by: $C_1$-$C_6$-alkoxy, cyano and/or aryl which may be mono- or polysubstituted by $C_1$-$C_{18}$-alkyl and/or $C_1$-$C_6$-alkoxy;

phenyl, naphthyl, pyridyl or pyrimidyl, each of which may be mono- or polysubstituted by: $C_1$-$C_{18}$-alkyl, $C_1$-$C_6$-alkoxy, halogen, cyano, nitro, —CONR$^2$R$^3$, —SO$_2$NR$^2$R$^3$ and/or phenyl- and/or naphthylazo, each of which may be mono- or polysubstituted by $C_1$-$C_{10}$-alkyl, $C_1$-$C_6$-alkoxy and/or cyano;

$C_5$-$C_8$-cycloalkyl which may be mono- or polysubstituted by $C_1$-$C_6$-alkyl, where the R radicals may be the same or different when they occur more than once in formula I;

R$^1$ is hydrogen or $C_1$-$C_6$-alkyl;

R$^2$, R$^3$ are each independently hydrogen;

$C_1$-$C_{18}$-alkyl which may be mono- or polysubstituted by $C_1$-$C_6$-alkoxy, hydroxyl, halogen and/or cyano;

aryl or hetaryl, each of which may be mono- or polysubstituted by $C_1$-$C_6$-alkyl and/or the above radicals specified as substituents for alkyl;

n is 1 or 2;

m is 0 or 1 where m=n−1;

x, when n=1:

is from 2 to 4 or else 0 when the B radicals and the B' radicals are each a radical of the formula (b), or one B radical and one B' radical are each a radical of the formula (c);

when n=2:

is from 2 to 4 when the B radicals and the B' radicals are each a radical of the formula (a);

is 0 for all further definitions of the B and B' radicals;

z is from 0 to 4, where x+z≦4, where, when n=2: z≠0 when x=0;

z1, when m=0: 0;

when m=1: from 0 to 2.

Finally, in very particularly preferred polychromophores of the formula I', the variables are each defined as follows:

Z is phenoxy which may be mono- or polysubstituted by identical or different (i), (ii), (iii), (iv) and/or (v) radicals:

(i) $C_1$-$C_{18}$-alkyl whose carbon chain may be interrupted by one or more —O—, —S—, —NR$^1$— and/or —CO— moieties and which may be mono- or polysubstituted by: $C_1$-$C_{12}$-alkoxy, hydroxyl and/or halogen;

(ii) $C_3$-$C_8$-cycloalkyl which may be mono- or polysubstituted by $C_1$-$C_{18}$-alkyl and/or $C_1$-$C_{12}$-alkoxy;

(iii) aryl or hetaryl which may be mono- or polysubstituted by $C_1$-$C_{18}$-alkyl, $C_1$-$C_{12}$-alkoxy, hydroxyl and/or halogen;

(iv) a —U-aryl radical which may be mono- or polysubstituted by the above radicals specified as substituents for the aryl radicals (iii), where U is an —O—, —S— or —NR$^1$— moiety;

(v) $C_1$-$C_{12}$-alkoxy, hydroxyl, halogen or cyano;

B, B' are each independently joined to give a radical of the formula (a) or (b);

A is an arylene radical of the formulae

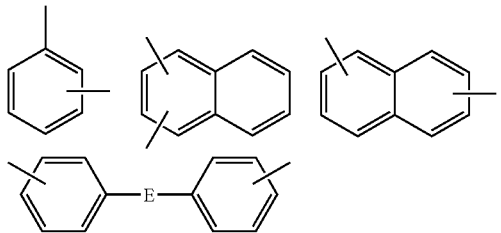

in which the phenylene or naphthylene rings may be mono- or polysubstituted by $C_1$-$C_{18}$-alkyl, where the A radicals may be the same or different when they occur more than once in formula I;

E is a chemical bond, methylene or isopropylene;

Y, $Y^1$ are each —O—;

R are identical radicals:
$C_1$-$C_{30}$-alkyl whose carbon chain may be interrupted by one or more —O— and/or —CO— moieties and which may be mono- or polysubstituted by: $C_1$-$C_6$-alkoxy, cyano and/or aryl which may be mono- or polysubstituted by $C_1$-$C_{18}$-alkyl or $C_1$-$C_6$-alkoxy;

phenyl, naphthyl, pyridyl or pyrimidyl, each of which may be mono- or polysubstituted by: $C_1$-$C_{18}$-alkyl, $C_1$-$C_6$-alkoxy, halogen, cyano, nitro, —CONR$^2$R$^3$, —SO$_2$NR$^2$R$^3$ and/or phenyl- and/or naphthylazo, each of which may be mono- or polysubstituted by $C_1$-$C_{10}$-alkyl, $C_1$-$C_6$-alkoxy and/or cyano;

$C_5$-$C_8$-cycloalkyl which may be mono- or polysubstituted by $C_1$-$C_6$-alkyl, $R^1$ is hydrogen or $C_1$-$C_6$-alkyl;

$R^2$, $R^3$ are each independently hydrogen;
$C_1$-$C_{18}$-alkyl which may be mono- or polysubstituted by $C_1$-$C_6$-alkoxy, hydroxyl, halogen and/or cyano;
aryl or hetaryl, each of which may be mono- or polysubstituted by $C_1$-$C_6$-alkyl and/or the above radicals specified as substituents for alkyl;

n is 1 or 2;

m is 0 or 1 where m=n−1;

x, when n=1:
is from 2 to 4 or else 0 when the B radicals and the B' radicals are each a radical of the formula (b);
when n=2:
is from 2 to 4 when the B radicals and the B' radicals are each a radical of the formula (a);
is 0 when the B and B' radicals are each a radical of the formula (b);

z is from 0 to 4, where x+z≦4;

z1 is 0.

Specific examples of the R, R', R" and $R^1$ to $R^3$ radicals occurring in the inventive formulae and their substituents include:

methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above terms isooctyl, isononyl, isodecyl and isotridecyl are trivial terms and stem from the alcohols obtained by the oxo process);

2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxamidecyl and 3,6,9,12-tetraoxatetradecyl;

2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiamidecyl and 3,6,9,12-tetrathiatetradecyl;

2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl, 3,6,9-trimethyl-3,6,9-triazaundecyl, 12-methyl-3,6,9,12-tetraazamidecyl and 3,6,9,12-tetramethyl-3,6,9,12-tetraazamidecyl;

(1-ethylethylidene)aminoethylene, (1-ethylethylidene)aminopropylene, (1-ethylethylidene)aminobutylene, (1-ethylethylidene)aminodecylene and (1-ethylethylidene)aminododecylene;

propan-2-on-1-yl, butan-3-on-1-yl, butan-3-on-2-yl and 2-ethylpentan-3-on-1-yl;

2-methylsulfoxidoethyl, 2-ethylsulfoxidoethyl, 2-propylsulfoxidoethyl, 2-isopropylsulfoxidoethyl, 2-butylsulfoxidoethyl, 2- and 3-methylsulfoxidopropyl, 2- and 3-ethylsulfoxidopropyl, 2- and 3-propylsulfoxidopropyl, 2- and 3-butylsulfoxidopropyl, 2- and 4-methylsulfoxidobutyl, 2- and 4-ethylsulfoxidobutyl, 2- and 4-propylsulfoxidobutyl and 4-butylsulfoxidobutyl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

carboxymethyl, 2-carboxyethyl, 3-carboxypropyl, 4-carboxybutyl, 5-carboxypentyl, 6-carboxyhexyl, 8-carboxyoctyl, 10-carboxydecyl, 12-carboxydodecyl and 14-carboxytetradecyl;

sulfomethyl, 2-sulfoethyl, 3-sulfopropyl, 4-sulfobutyl, 5-sulfopentyl, 6-sulfohexyl, 8-sulfooctyl, 10-sulfodecyl, 12-sulfododecyl and 14-sulfotetradecyl;

2-hydroxyethyl, 2- and 3-hydroxypropyl, 1-hydroxyprop-2-yl, 3- and 4-hydroxybutyl, 1-hydroxybut-2-yl and 8-hydroxy-4-oxaoctyl;

2-cyanoethyl, 3-cyanopropyl, 3- and 4-cyanobutyl, 2-methyl-3-ethyl-3-cyanopropyl, 7-cyano-7-ethylheptyl and 4,7-dimethyl-7-cyanoheptyl;

2-chloroethyl, 2- and 3-chloropropyl, 2-, 3- and 4-chlorobutyl, 2-bromoethyl, 2- and 3-bromopropyl and 2-, 3- and 4-bromobutyl;

2-nitroethyl, 2- and 3-nitropropyl and 2-, 3- and 4-nitrobutyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

methylthio, ethylthio, propylthio, isopropylthio, butylthio, isobutylthio, sec-butylthio, tertbutylthio, pentylthio, isopentylthio, neopentylthio, tert-pentylthio and hexylthio;

ethynyl, 1- and 2-propynyl, 1-, 2- and 3-butynyl, 1-, 2-, 3- and 4-pentynyl, 1-, 2-, 3-, 4- and 5-hexynyl, 1-, 2-, 3-, 4-, 5-, 6-, 7-, 8- and 9-decynyl, 1-, 2-, 3-, 4-, 5-, 6-, 7-, 8-, 9-, 10- and 11-dodecynyl and 1-, 2-, 3-, 4-, 5-, 6-, 7-, 8-, 9-, 10-, 11-, 12-, 13-, 14-, 15-, 16- and 17-octadecynyl;

ethenyl, 1- and 2-propenyl, 1-, 2- and 3-butenyl, 1-, 2-, 3- and 4-pentenyl, 1-, 2-, 3-, 4- and 5-hexenyl, 1-, 2-, 3-, 4-, 5-, 6-, 7-, 8- and 9-decenyl, 1-, 2-, 3-, 4-, 5-, 6-, 7-, 8-, 9-, 10- and 11-dodecenyl and 1-, 2-, 3-, 4-, 5-, 6-, 7-, 8-, 9-, 10-, 11-, 12-, 13-, 14-, 15-, 16- and 17-octadecenyl;

methylamino, ethylamino, propylamino, isopropylamino, butylamino, isobutylamino pentylamino, hexylamino, dimethylamino, methylethylamino, diethylamino, dipropylamino, diisopropylamino, dibutylamino, diisobutylamino, dipentylamino, dihexylamino, dicyclopentylamino, dicyclohexylamino, dicycloheptylamino, diphenylamino and dibenzylamino;

formylamino, acetylamino, propionylamino and benzoylamino;

carbamoyl, methylaminocarbonyl, ethylaminocarbonyl, propylaminocarbonyl, butylaminocarbonyl, pentylaminocarbonyl, hexylaminocarbonyl, heptylaminocarbonyl, octylaminocarbonyl, nonylaminocarbonyl, decylaminocarbonyl and phenylaminocarbonyl;

aminosulfonyl, N,N-dimethylaminosulfonyl, N,N-diethylaminosulfonyl, N-methyl-N-ethylaminosulfonyl, N-methyl-N-dodecylaminosulfonyl, N-dodecylaminosulfonyl, (N,N-dimethylamino)ethylaminosulfonyl, N,N-(propoxyethyl)dodecylaminosulfonyl, N,N-diphenylaminosulfonyl, N,N-(4-tert-butylphenyl)octadecylaminosulfonyl and N,N-bis(4-chlorophenyl)aminosulfonyl;

methoxycarbonyl, ethoxycarbonyl, propoxycarbonyl, isopropoxycarbonyl, hexoxycarbonyl, dodecyloxycarbonyl, octadecyloxycarbonyl, phenoxycarbonyl, (4-tert-butylphenoxy)carbonyl and (4-chlorophenoxy)carbonyl;

methoxysulfonyl, ethoxysulfonyl, propoxysulfonyl, isopropoxysulfonyl, butoxysulfonyl, isobutoxysulfonyl, tert-butoxysulfonyl, hexoxysulfonyl, dodecyloxysulfonyl, octadecyloxysulfonyl, phenoxysulfonyl, 1- and 2-naphthyloxysulfonyl, (4-tertbutylphenoxy)sulfonyl and (4-chlorophenoxy)sulfonyl;

chlorine, bromine and iodine;

phenylazo, 2-naphthylazo, 2-pyridylazo and 2-pyrimidylazo;

cyclopropyl, cyclobutyl, cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl and 3-, 4- and 5-propylcyclooctyl; 3- and 4-hydroxycyclohexyl, 3- and 4-nitrocyclohexyl and 3- and 4-chlorocyclohexyl;

1-, 2- and 3-cyclopentenyl, 1-, 2-, 3- and 4-cyclohexenyl, 1-, 2- and 3-cycloheptenyl and 1-, 2-, 3- and 4-cyclooctenyl;

2-dioxanyl, 1-morpholinyl, 1-thiomorpholinyl, 2- and 3-tetrahydrofuryl, 1-, 2- and 3-pyrrolidinyl, 1-piperazyl, 1-diketopiperazyl and 1-, 2-, 3- and 4-piperidyl;

phenyl, 2-naphthyl, 2- and 3-pyrryl, 2-, 3- and 4-pyridyl, 2-, 4- and 5-pyrimidyl, 3-, 4- and 5-pyrazolyl, 2-, 4- and 5-imidazolyl, 2-, 4- and 5-thiazolyl, 3-(1,2,4-triazyl), 2-(1,3,5-triazyl), 6-quinaldyl, 3-, 5-, 6- and 8-quinolinyl, 2-benzoxazolyl, 2-benzothiazolyl, 5-benzothiadiazolyl, 2- and 5-benzimidazolyl and 1- and 5-isoquinolyl;

1-, 2-, 3-, 4-, 5-, 6- and 7-indolyl, 1-, 2-, 3-, 4-, 5-, 6- and 7-isoindolyl, 5-(4-methylisoindolyl), 5-(4-phenylisoindolyl), 1-, 2-, 4-, 6-, 7- and 8-(1,2,3,4-tetrahydroisoquinolinyl), 3-(5-phenyl)-(1,2,3,4-tetrahydroisoquinolinyl), 5-(3-dodecyl-(1,2,3,4-tetrahydroisoquinolinyl), 1-, 2-, 3-, 4-, 5-, 6-, 7- and 8-(1,2,3,4-tetrahydroquinolinyl) and 2-, 3-, 4-, 5-, 6-, 7- and 8-chromanyl, 2-, 4- and 7-quinolinyl, 2-(4-phenylquinolinyl) and 2-(5-ethylquinolinyl);

2-, 3- and 4-methylphenyl, 2,4-, 3,5- and 2,6-dimethylphenyl, 2,4,6-trimethylphenyl, 2-, 3- and 4-ethylphenyl, 2,4-, 3,5- and 2,6-diethylphenyl, 2,4,6-triethylphenyl, 2-, 3- and 4-propylphenyl, 2,4-, 3,5- and 2,6-dipropylphenyl, 2,4,6-tripropylphenyl, 2-, 3- and 4-isopropylphenyl, 2,4-, 3,5- and 2,6-diisopropylphenyl, 2,4,6-triisopropylphenyl, 2-, 3- and 4-butylphenyl, 2,4-, 3,5- and 2,6-dibutylphenyl, 2,4,6-tributylphenyl, 2-, 3- and 4-isobutylphenyl, 2,4-, 3,5- and 2,6-diisobutylphenyl, 2,4,6-triisobutylphenyl, 2-, 3- and 4-sec-butylphenyl, 2,4-, 3,5- and 2,6-di-sec-butylphenyl and 2,4,6-tri-sec-butylphenyl; 2-, 3- and 4-methoxyphenyl, 2,4-, 3,5- and 2,6-dimethoxyphenyl, 2,4,6-trimethoxyphenyl, 2-, 3- and 4-ethoxyphenyl, 2,4-, 3,5- and 2,6-diethoxyphenyl, 2,4,6-triethoxyphenyl, 2-, 3- and 4-propoxyphenyl, 2,4-, 3,5- and 2,6-dipropoxyphenyl, 2-, 3- and 4-isopropoxyphenyl, 2,4- and 2,6-diisopropoxyphenyl and 2-, 3- and 4-butoxyphenyl; 2-, 3- and 4-chlorophenyl and 2,4-, 3,5- and 2,6-dichlorophenyl; 2-, 3- and 4-hydroxyphenyl and 2,4-, 3,5- and 2,6-dihydroxyphenyl; 2-, 3- and 4-cyanophenyl; 3- and 4-carboxyphenyl; 3- and 4-carboxamidophenyl, 3- and 4-N-methylcarboxamidophenyl and 3- and 4-N-ethylcarboxamidophenyl; 3- and 4-acetylaminophenyl, 3- and 4-propionylaminophenyl and 3- and 4-butyrylaminophenyl; 3- and 4-N-phenylaminophenyl, 3- and 4-N-(o-tolyl)aminophenyl, 3- and 4-N-(m-tolyl)aminophenyl and 3- and 4-N-(p-tolyl)aminophenyl; 3- and 4-(2-pyridyl)aminophenyl, 3- and 4-(3-pyridyl)aminophenyl, 3- and 4-(4-pyridyl)aminophenyl, 3- and 4-(2-pyrimidyl)aminophenyl and 4-(4-pyrimidyl)aminophenyl;

4-phenylazophenyl, 4-(1-naphthylazo)phenyl, 4-(2-naphthylazo)phenyl, 4-(4-naphthylazo)phenyl, 4-(2-pyridylazo)phenyl, 4-(3-pyridylazo)phenyl, 4-(4-pyridylazo)phenyl, 4-(2-pyrimidylazo)phenyl, 4-(4-pyrimidylazo)phenyl and 4-(5-pyrimidylazo)phenyl;

phenoxy, phenylthio, 2-naphthoxy, 2-naphthylthio, 2-, 3- and 4-pyridyloxy, 2-, 3- and 4-pyridylthio, 2-, 4- and 5-pyrimidyloxy and 2-, 4- and 5-pyrimidylthio.

The particular significance of the inventive polychromophores I is that they can be pre-pared on the industrial scale via few synthetic stages and can be adapted in a controlled manner to the particular application. For instance, it is possible in a simple manner, depending on the required absorption and emission properties, to combine an appropriate rylene chromophore with the X chromophore appropriate in each case.

The inventive polychromophores are prepared by means of the reaction of appropriate known rylene reactants with the likewise inventive rylenedicarboximide derivatives of the formula III defined at the outset

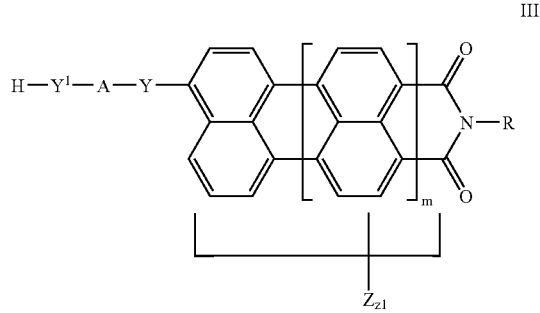

which constitute the intermediates of the inventive polychromophores I.

Preferred and particularly preferred definitions of the variables Z, A, Y, R and z1 correspond to the preferred and particularly preferred definitions of these variables in the formula I' specified above.

Depending on the position in which the X chromophore is to be bonded to the rylene chromophore, the rylene and X chromophores are advantageously bonded to one another by nucleophilic substitution, imidation, esterification or amidation.

These reactions are described in detail group by group hereinbelow.

It is not mentioned explicitly here that mixtures of the solvents or of the further assistants may be used, but this is self-evident.

When no further statements are made hereinbelow on the variables occurring in the formulae, they are each as defined above for formula I'.

Nucleophilic Substitution

Polychromophores I which have X chromophores bonded to the carbon skeleton of the rylene chromophore are advantageously obtainable by reacting the corresponding halogenated (preferably chlorinated or brominated) rylenecarboximides (II) with inventive rylenedicarboximide derivatives of the formula IIIa

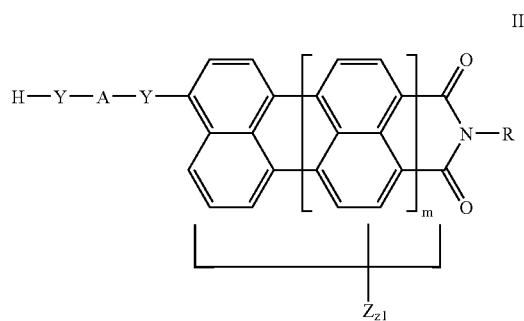

in which Y is oxygen or sulfur.

When the halogen exchange is not undertaken quantitatively, it is also possible, by additional reaction with a compound of the general formula IV

H—Z    IV, to introduce the (het)aryloxy and (het)arylthio substituents Z into the rylene skeleton.

The sequence of reaction is as desired, i.e. it is possible to introduce a) first the X radicals and then the Z radicals or b) first the Z radicals and then the X radicals or c) even the X and Z radicals simultaneously.

When these reactions are not effected quantitatively, the resulting polychromophores can still comprise traces of halogen. If desired, an additional dehalogenation can be undertaken in these cases, for example a transition metal-catalyzed reductive or a base-induced dehalogenation, as described in WO-A-02/76988.

Hereinafter, the preparation processes which likewise form part of the subject-matter of this invention are summarized, each of which is based on this nucleophilic substitution undertaken in accordance with the invention in the presence of a base and of a non-nucleophilic solvent.

For instance, a process has been found for preparing polychromophores based on rylenetetracarboximides of the general formula Ia

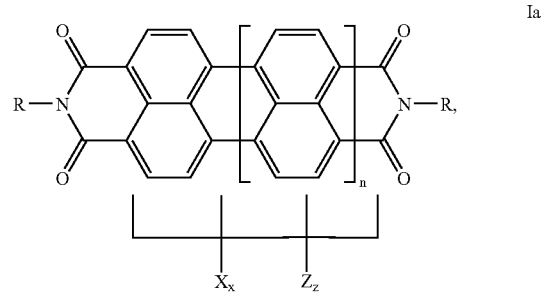

which comprises reacting a halogenated rylenetetracarboximide of the general formula IIa

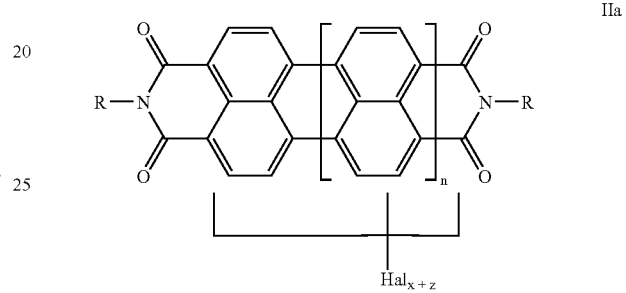

in which Hal is chlorine or bromine, in the presence of a base and of a non-nucleophilic solvent, a) with from 0.8 to 1.2 mol per mole of halogen atom to be exchanged of a rylenedicarboximide derivative of the general formula IIIa

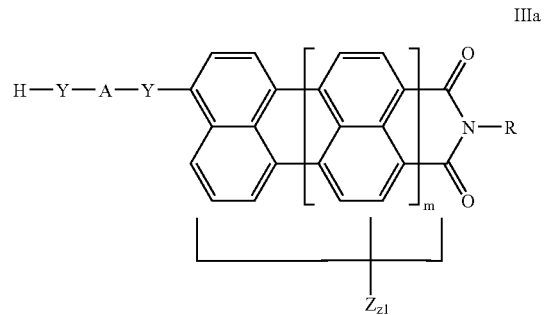

to give a rylenetetracarboximide of the formula Ia in which z=0 or b) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the general formula IV

H—Z    IV or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa or simultaneously with in each case from 0.8 to 1.2 mol per mole of halogen atom to be exchanged of the rylenedicarboximide derivative of the formula IIIa and of the compound of the formula IV to give a rylenetetracarboximide of the formula Ia in which z≠0.

Also found has been a process for preparing polychromophores based on rylenedicarboximides of the general formula Ib

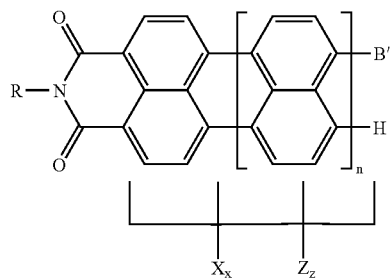

in which n=1, B' is hydrogen, an X radical or a Z radical, which comprises reacting a halogenated rylenedicarboximide of the general formula IIb

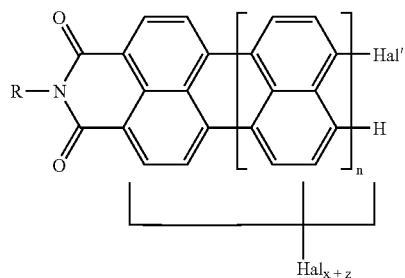

in which n=1 ist and Hal' is hydrogen or Hal where Hal is chlorine or bromine, in the presence of a base and of a non-nucleophilic solvent, a) with from 0.8 to 1.2 mol per mole of halogen atom to be exchanged of a rylenedicarboximide derivative of the general formula IIIa

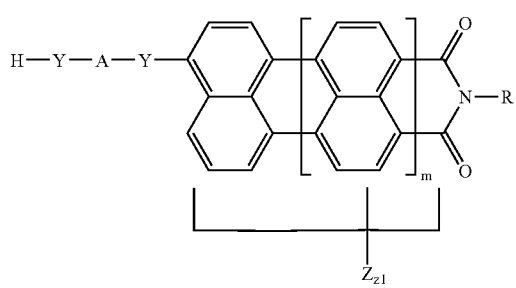

to give a rylenedicarboximide of the formula Ib in which z=0 or b) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the general formula IV

H—Z    IV or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa or simultaneously with in each case from 0.8 to 1.2 mol per mole of halogen atom to be exchanged of the rylenedicarboximide derivative of the formula IIIa and of the compound of the formula IV to give a rylenedicarboximide of the formula Ib in which z≠0.

Additionally found has been a process for preparing polychromophores based on rylenedicarboximides of the general formula Ib'

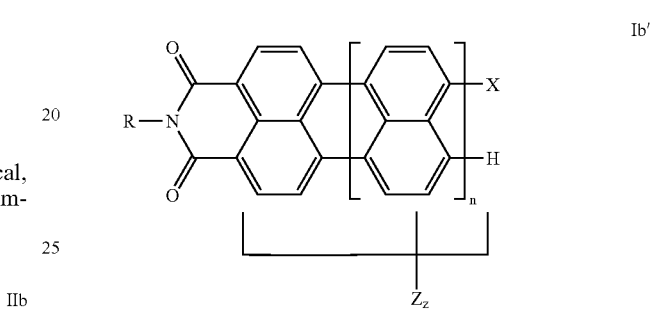

in which n=2 or 3 and z=from 2 to 8, which comprises reacting a peri-halorylenedicarboximide of the general formula IIb'

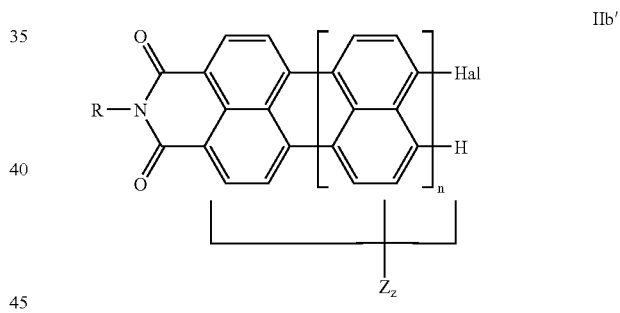

in which n=2 or 3 and z=from 2 to 8 and Hal is chlorine or bromine, in the presence of a base and of a non-nucleophilic solvent, with from 0.8 to 1.2 mol per mole of a rylenedicarboximide derivative of the general formula IIIa

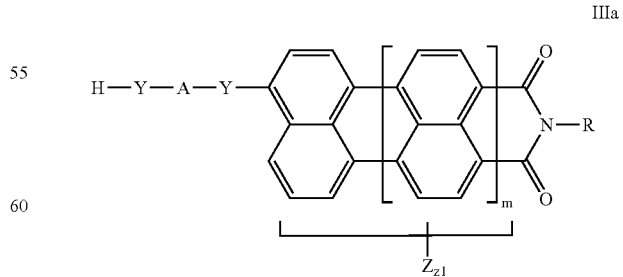

Since the Z radicals are preferably phenoxy or thiophenoxy radicals, the compound of the formula IV is, for the sake of simplicity, designated as (thio)phenol IV in the more precise description of the nucleophilic substitution on the halogenated rylene derivatives II which follows.

Since the nucleophilic substitution by the rylenedicarboximide derivative IIIa and by the (thio)phenol IV are undertaken under comparable reaction conditions in the presence of a non-nucleophilic solvent and of a base, the following statements, unless stated otherwise, relate to both reactions.

Suitable non-nucleophilic solvents are in particular polar aprotic solvents, especially N,N-disubstituted aliphatic carboxamides (preferably N,N-di-$C_1$-$C_4$-alkyl-$C_1$-$C_4$-carboxamides) and N-alkyllactams such as dimethylformamide, diethylformamide, dimethylacetamide, dimethylbutyramide and N-methylpyrrolidone, preference being given to N-methylpyrrolidone.

The non-nucleophilic solvents used may also be nonpolar aprotic solvents, but these solvents are not preferred. Examples include aromatic hydrocarbons such as benzene, toluene and xylene.

The amount of solvents depends upon the solubility of the reactants. In general, from 5 to 200 ml, in particular from 10 to 100 ml, of solvent are required per g of rylenecarboximide (II).

Suitable bases are in particular inorganic and organic alkali metal or alkaline earth metal bases, the alkali metal bases being particularly suitable. Examples of inorganic bases are the carbonates and hydrogencarbonates, hydroxides, hydrides and amides of alkali metals and alkaline earth metals; examples of organic bases are the alkoxides (especially the $C_1$-$C_{10}$-alkoxides, in particular tert-$C_4$-$C_6$-alkoxides), (phenyl)alkylamides (especially the bis($C_1$-$C_4$-alkyl)amides) and triphenylmethylmetallates of alkali metals and alkaline earth metals. Preferred bases are the carbonates and hydrogencarbonates, particular preference being given to the carbonates. Preferred alkali metals are lithium, sodium, potassium and cesium; particularly suitable alkaline earth metals are magnesium and calcium.

Specific examples of the metallic bases include: lithium carbonate, sodium carbonate, potassium carbonate and cesium carbonate, sodium hydrogencarbonate and potassium hydrogencarbonate; lithium hydroxide, sodium hydroxide, potassium hydroxide and cesium hydroxide; lithium hydride, sodium hydride and potassium hydride; lithium amide, sodium amide and potassium amide; lithium methoxide, sodium methoxide, potassium methoxide, lithium ethoxide, sodium ethoxide, potassium ethoxide, sodium isopropoxide, potassium isopropoxide, sodium tert-butoxide, potassium tert-butoxide, lithium (1,1-dimethyl)octoxide, sodium (1,1-dimethyl)octoxide and potassium (1,1-dimethyl)octoxide; lithium dimethylamide, lithium diethylamide, lithium diisopropylamide, sodium diisopropylamide, lithium hexamethyldisilazide, sodium hexamethyldisilazide, potassium hexamethyldisilazide, triphenylmethyllithium, triphenylmethylsodium and triphenylmethylpotassium.

In addition to these metallic bases, purely organic nitrogen bases are also suitable.

Suitable examples thereof are alkylamines, especially tri($C_2$-$C_6$-alkyl)amines, such as triethylamine, tripropylamine and tributylamine, alcoholamines, especially mono-, di- and tri($C_2$-$C_4$-alcohol)amines, such as mono-, di- and triethanolamine, and heterocyclic bases such as pyridine, 4-(N,N-dimethylamino)pyridine, (4-pyrrolidino)pyridine, N-methylpiperidine, N-methylpiperidone, N-methylmorpholine, N-methyl-2-pyrrolidone, pyrimidine, quinoline, isoquinoline, quinaldine, diazabicyclooctane (DABCO), diazabicyclononene (DBN) and diazabicycloundecene (DBU).

Very particularly preferred bases are lithium carbonate, sodium carbonate, potassium carbonate and cesium carbonate.

In general, at least 0.5 equivalent of base is required per mole of rylenedicarboximide derivative IIIa or (thio)phenol IV. Particularly suitable use amounts for the carbonates are from 0.5 to 5 equivalents, especially from 0.5 to 2 equivalents, per mole of IIIa or IV. In the case of the purely organic bases, the use amount is preferably from 0.4 to 10 equivalents, more preferably from 0.4 to 3 equivalents, per mole of IIIa or IV. When the organic base is used simultaneously as a solvent, which may be the case especially for the heterocyclic bases, a quantitative restriction is of course superfluous.

When the two reactions are undertaken in succession, the total amount of base required may be initially charged directly or supplemented for the second reaction.

The reaction may be undertaken in the presence of phase transfer catalysts.

Suitable phase transfer catalysts are in particular quaternary ammonium salts and phosphonium salts such as tetra ($C_1$-$C_{18}$-alkyl)ammonium halides and tetrafluoroborates, benzyltri($C_1$-$C_{18}$-alkyl)ammonium halides and tetrafluoroborates and tetra($C_1$-$C_{18}$-alkyl)- and tetraphenylphosphonium halides, and crown ethers. The halides are generally the fluorides, chlorides, bromides and iodides, preference being given to the chlorides and bromides. Particularly suitable specific examples are: tetraethylammonium chloride, tetrabutylammonium bromide, tetrabutylammonium iodide, tetrabutylammonium tetrafluoroborate and benzyltriethylammonium chloride; tetrabutylphosphonium bromide and tetraphenylphosphonium chloride and bromide; 18-crown-6, 12-crown-4 and 15-crown-5.

When a phase transfer catalyst is used, its use amount is typically from 0.4 to 10 equivalents, in particular from 0.4 to 3 equivalents, per mole of rylenedicarboximide derivative IIIa or (thio)phenol IV.

In general, from 0.8 to 1.2 mol of rylenedicarboximide derivative IIIa or (thio)phenol IV are used per mole of halogen atom to be exchanged. When the reaction with the (thio)phenol IV is undertaken as the second step, up to 3 mol of IV per mole of halogen atom to be exchanged may be used in order to ensure complete reaction.

The reaction temperature depends in turn upon the reactivity of the substrate and is generally within the range from 30 to 150° C.

It is appropriate to undertake the reaction under inert gas, for example nitrogen or argon.

The reaction time is typically from 0.5 to 96 h, in particular from 2 to 72 h.

In terms of process technology, it is possible in the nucleophilic substitution to proceed in different ways.

It is possible first to mix the reactants and then to heat them together to the reaction temperature. Especially to achieve high degrees of substitution, it may be advantageous to initially charge only a portion of the rylenedicarboximide derivative IIIa or (thio)phenol IV and of the base and to add the rest only at a later stage, if appropriate after intermediate isolation of the product reacted in the more reactive positions.

The isolation of the resulting polychromophores I can be undertaken as follows when inorganic bases are used:

The inorganic salts obtained can first be filtered off, and then the polychromophore I precipitated by addition of lower aliphatic alcohols such as methanol, ethanol, isopropanol, butanol or ethylene glycol monobutyl ether, of water or of water/alcohol mixtures, or by evaporation of the solvent, and subsequently filtered off.

However, the inorganic salts can also be filtered off together with the precipitated polychromophore I and washed out by washing with water and/or dilute inorganic acids such as hydrochloric acid or sulfuric acid.

If desired, the resulting polychromophores I may be additionally purified by subjecting them to a filtration or column chromatography on silica gel. Suitable eluents are in particular halogenated aliphatic hydrocarbons such as methylene chloride and chloroform, aliphatic and aromatic hydrocarbons such as cyclohexane, petroleum ether, benzene, toluene and xylene, aliphatic alcohols such as methanol and ethanol, and aliphatic carboxylic esters such as ethyl acetate, which are preferably used in the form of mixtures.

The resulting polychromophores I may, if desired, also be purified by recrystallization or fractional crystallization. For this purpose, in addition to the abovementioned solvents, N,N-disubstituted aliphatic carboxamides such as dimethylformamide and dimethyllacetamide, and N-alkyllactams such as N-methylpyrrolidone, and also sulfuric acid are also suitable. Preferred solvents are the halogenated hydrocarbons, the carboxamides and the N-alkyllactams, and mixtures thereof with alcohols and/or water.

Imidation

Polychromophores I in which the X chromophores are bonded via the imide groups of the rylene chromophore may be obtained advantageously by reacting the corresponding rylenecarboxylic anhydrides (ii) with inventive rylenedicarboximide derivatives of the formula IIIc

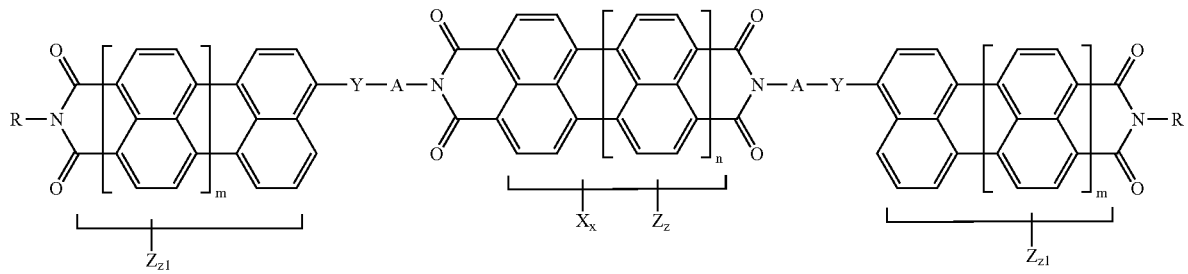

Ic

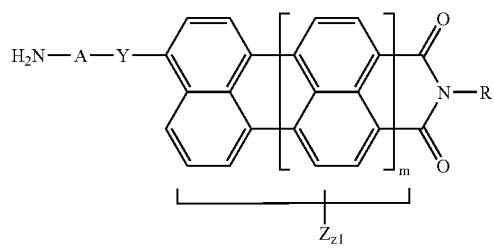

IIIc

When the rylenecarboxylic anhydrides (II) used have been halogenated in the rylene skeleton, which may be the case for the perylenetetracarboxylic dianhydrides and -dicarboxylic anhydrides, it is additionally possible to introduce X chromophores and/or Z substituents into the skeleton of the rylene chromophore by the above-described nucleophilic substitution.

Hereinafter, the processes for preparing inventive polychromophores are summarized, said processes likewise forming part of the subject-matter of this invention and being based on this imidation reaction undertaken in accordance with the invention in the presence of a high-boiling solvent and, if desired, of a Lewis acid.

Thus, a process has been found for preparing polychromophores based on rylenetetracarboximides of the general formula Ic in which n=1, x is 0 or from 2 to 4, which comprises reacting an optionally halogenated rylenetetracarboxylic dianhydride of the general formula IIc

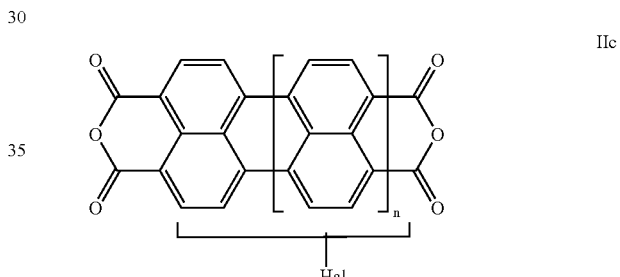

IIc in which n=1 and Hal is chlorine or bromine, in the presence of a high-boiling solvent and, if desired, of a Lewis acid, with from 1.8 to 3 mol per mole of a rylenedicarboximide derivative of the general formula IIIc

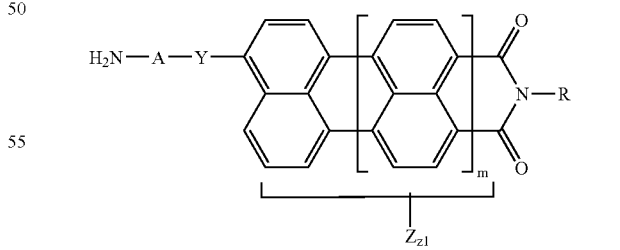

IIIc to give a rylenetetracarboximide of the formula Ic in which x=z=0, and, if appropriate, reacting the resulting rylenetetracarboximide Ic halogenated in the rylene ring, after intermediate isolation, in the presence of a base and of a non-nucleophilic solvent, a) with from 0.8 to 1.2 mol per mole of halogen atom to be exchanged of a rylenedicarboximide derivative of the general formula IIIa in which n=1, B' is hydrogen, an X radical or a Z radical and x is 0 or from 2 to 4, which comprises reacting an optionally halogenated rylenedicarboxylic anhydride of the general formula IId

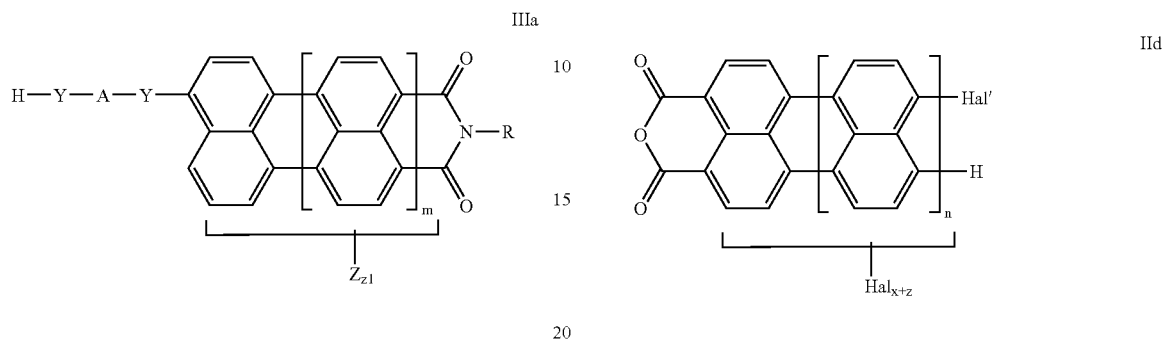

to give a rylenetetracarboximide of the formula Ic in which x≠0 and z=0 or b) reacting it with from 0.8 to 3 mol per mole of halogen atom to be exchanged of a compound of the general formula IV

H—Z  IV to give a rylenetetracarboximide of the formula Ic in which z≠0 and x=0, or c) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the formula IV or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa or simultaneously with in each case from 0.8 to 1.2 mol per mole of halogen atom to be exchanged of the rylenedicarboximide derivative of the formula IIIa and of the compound of the formula IV to give a rylenetetracarboximide of the formula Ic in which x≠0 and z≠0.

Additionally found has been a process for preparing polychromophores based on rylenedicarboximides of the general formula Id in which n=1 and Hal' is hydrogen or Hal where Hal is chlorine or bromine, in the presence of a high-boiling solvent and, if desired, of a Lewis acid, with from 0.8 to 1.2 mol per mole of a rylenedicarboximide derivative of the general formula IIIc

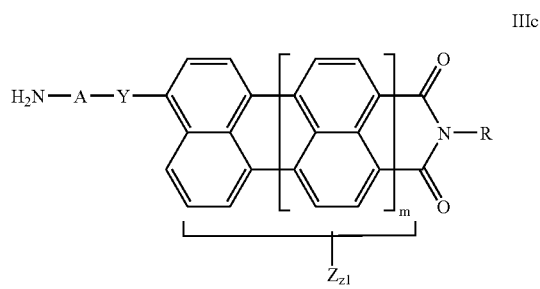

to give a rylenedicarboximide of the formula Id in which x=z=0, and, if appropriate, reacting the resulting rylenedicarboximide Id halogenated in the rylene ring, after intermediate isolation, in the presence of a base and of a non-nucleophilic solvent,

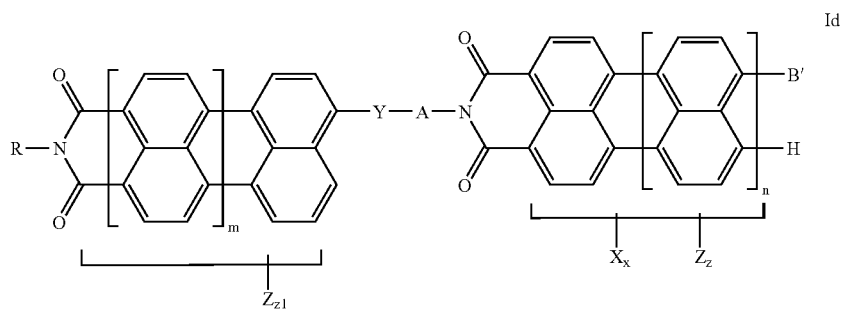

a) with from 0.8 to 1.2 mol per mole of halogen atom to be exchanged of a rylenedicarboximide derivative of the general formula IIIa

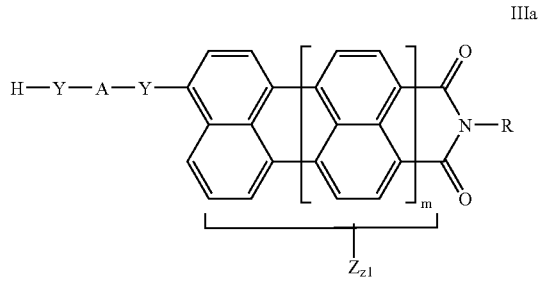

to give a rylenedicarboximide of the formula Id in which x≠0 and z=0
or
b) reacting it with from 0.8 to 3 mol per mole of halogen atom to be exchanged of a compound of the general formula IV

H—Z         IV to give a rylenedicarboximide of the formula Id in which z≠0 and x=0,
or
c) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the general formula IV
or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa
or simultaneously with in each case from 0.8 to 1.2 mol per mole of halogen atom to be exchanged of the rylenedicarboximide derivative of the formula IIIa and of the compound of the formula IV
to give a rylenedicarboximide of the formula Id in which x≠0 and z≠0.

Also found has been a process for preparing polychromophores based on rylenetetracarboximides of the general formula Ie in which n=1, which comprises reacting an optionally halogenated rylenetetracarboxylic monoanhydride monoimide of the general formula IIe

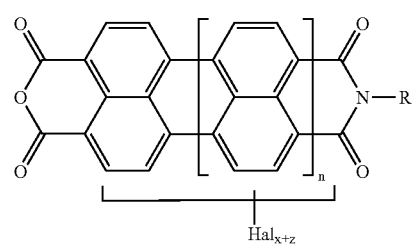

in which n=1 and Hal is chlorine or bromine, in the presence of a high-boiling solvent and, if desired, of a Lewis acid, with from 0.8 to 1.2 mol per mole of a rylenedicarboximide derivative of the general formula IIIc

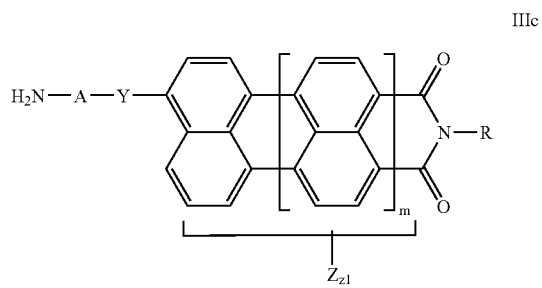

to give a rylenetetracarboximide of the formula Ie in which x=z=0,
and, if appropriate, reacting the resulting rylenedicarboximide Ie halogenated in the rylene ring, after intermediate isolation, in the presence of a base and of a non-nucleophilic solvent,

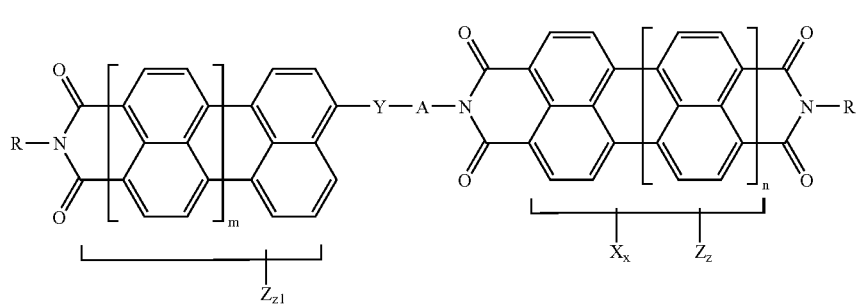

a) with from 0.8 to 1.2 mol per mole of halogen atom to be exchanged of a rylenedicarboximide derivative of the general formula IIIa

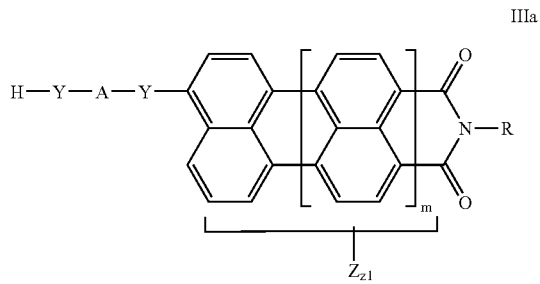

to give a rylenetetracarboximide of the formula Ie in which x≠0 and z=0
or
b) reacting it with from 0.8 to 3 mol per mole of halogen atom to be exchanged of a compound of the general formula IV

H—Z                    IV to give a rylenetetracarboximide of the formula Ie in which z≠0 and x=0,
or
c) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the formula IV
or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa
or simultaneously with in each case from 0.8 to 1.2 mol per mole of halogen atom to be exchanged of the rylenedicarboximide derivative of the formula IIIa and of the compound of the formula IV
to give a rylenetetracarboximide of the formula Ie in which x≠0 and z≠0.

Also found has been a process for preparing polychromophores based on rylenetetracarboximides of the general formula Ic' in which n=2 or 3 and z=from 2 to 8, which comprises reacting a rylenetetracarboxylic dianhydride of the general formula IIc'

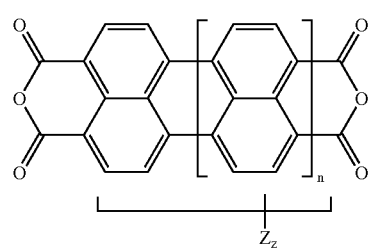

in which n=2 or 3 and z=from 2 to 8, in the presence of a high-boiling solvent and of a Lewis acid, with from 0.8 to 1.2 mol per mole of a rylenedicarboximide derivative of the general formula IIIc

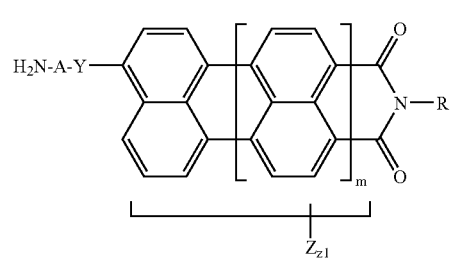

Finally, a process has been found for preparing polychromophores based on rylenedicarboximides of the general formula Id'

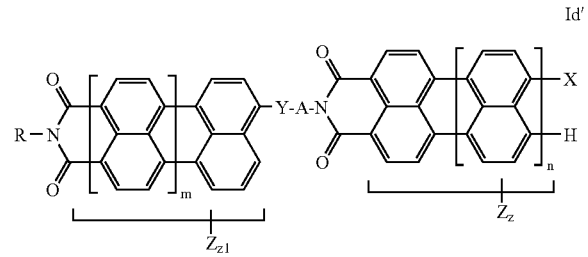

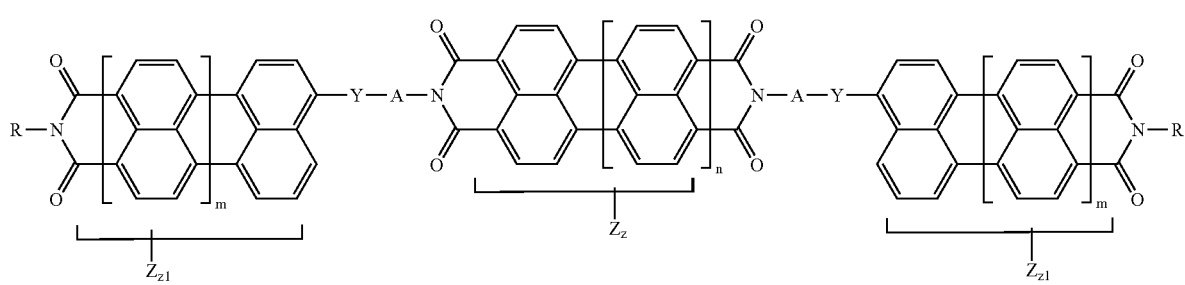

in which n=2 or 3 and z=from 2 to 8, which comprises reacting a peri-halorylenedicarboxylic anhydride of the general formula IId'

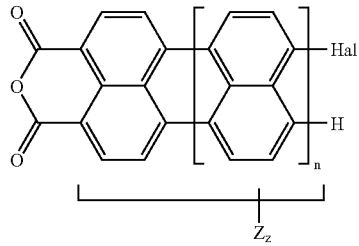

in which n=2 or 3 and z=from 2 to 8 and Hal is chlorine or bromine, in the presence of a high-boiling solvent and of a Lewis acid, with from 0.8 to 1.2 mol per mole of a rylenedicarboximide derivative of the general formula IIIc

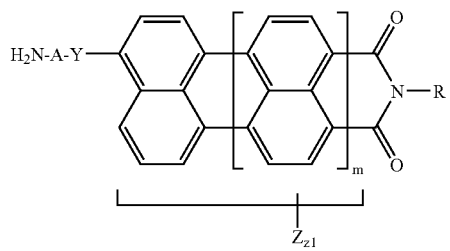

Not least, a process has been found for preparing polychromophores based on rylenetetracarboximides of the general formula Ie'

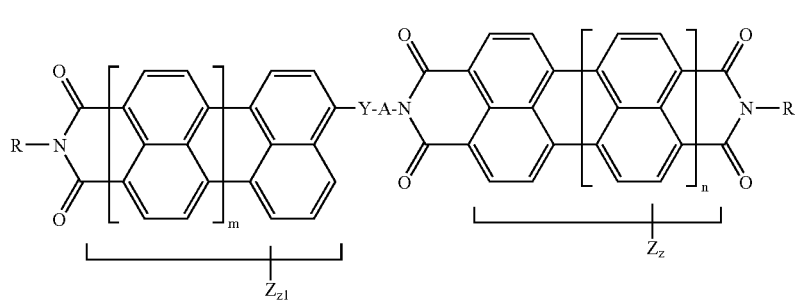

in which n=2 or 3 and z=from 2 to 8, which comprises reacting a rylenetetracarboxylic monoanhydride monoimide of the general formula IIe'

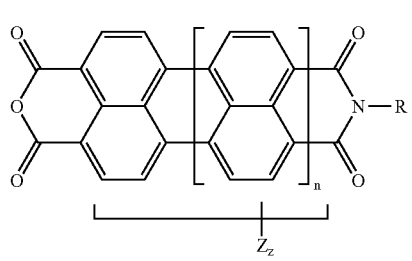

in which n=from 2 to 8, in the presence of a high-boiling solvent and of a Lewis acid, with from 0.8 to 1.2 mol per mole of a rylenedicarboximide derivative of the general formula IIIc

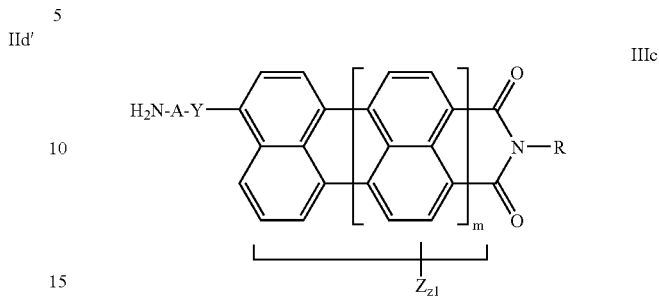

to give a rylenetetracarboximide of the formula Ie'.

According to the invention, the imidation reaction between the appropriate rylenecarboxylic anhydride (II) and the amino-functionalized rylenedicarboximide derivative IIIc is undertaken in the presence of a high-boiling solvent.

Suitable solvents are polar aprotic solvents such as trialkylamines, nitrogen-containing heterocycles, N,N-disubstituted aliphatic carboxamides and N-alkyllactams.

Specific examples of particularly preferred solvents include: triethylamine, tripropylamine and tributylamine; quinoline, isoquinoline, quinaldine, pyrimidine, N-methylpiperidine and pyridine; dimethylformamide, diethylformamide, dimethylacetamide and dimethylbutyramide; N-methylpyrrolidone. The preferred solvent from this group is quinoline.

Suitable solvents are also protic solvents, especially aliphatic carboxylic acids, preferably $C_2$-$C_{12}$ carboxylic acids, such as acetic acid, propionic acid, butanoic acid and hexanoic acid, acetic acid and propionic acid being preferred protic solvents.

Depending on the reactivity of the reactants, preference is given either to the aprotic or to the protic solvents. Thus, the aprotic solvents are preferable for the reaction of unhalogenated rylenecarboxylic anhydrides (II), while the protic solvents are preferred in the reaction of the more reactive halogenated rylenecarboxylic anhydrides II.

In general, from 1 to 100 ml, in particular from 3 to 70 ml of solvent are used per g of rylenecarboxylic anhydride (II).

In the imidation, it is also possible to use a Lewis acid as a catalyst.

The use of a Lewis acid is advisable especially in the reaction of the less reactive unhalogenated rylenecarboxylic anhydrides (II) and/or less reactive rylenedicarboximide derivative IIIc.

Suitable Lewis acids are in particular zinc, copper and iron salts, and it is also possible to use the oxides in the case of copper. Preference is given to the zinc and copper compounds, particular preference being given to the zinc compounds.

Examples of suitable Lewis acids are zinc acetate, zinc propionate, copper(I) oxide, copper(II) oxide, copper(I) chloride, copper(I) acetate and iron(III) chloride, very particular preference being given to zinc acetate.

When a Lewis acid is used, generally from 0.5 to 3 equivalents, preferably from 0.5 to 1.5 equivalents are used per mole of anhydride group to be converted in the rylenecarboxylic anhydride (II).

The reaction temperature likewise depends upon the reactivity of the reactants and is generally in the range from 100 to 250° C. In the case of the less reactive unhalogenated rylenecarboxylic anhydrides (II), preference is given to temperatures of from 150 to 230° C.; the reaction of the more reactive halogenated rylenecarboxylic anhydrides (II) is preferably undertaken at from 110 to 170° C.

If desired, the water of reaction which forms and the water introduced, if appropriate, by the assistants, is distilled off during the reaction.

It is advisable to work under protective gas, for example nitrogen or argon.

The reaction time is typically from 1 to 48 h, in particular from 6 to 18 h.

In process technology terms, the procedure in the imidation is appropriately as follows:

A mixture of rylenecarboxylic anhydride (II), rylenedicarboximide derivative IIIc, solvent and, if appropriate, Lewis acid is heated, if desired while distilling off the water which forms, to the desired reaction temperature for from 1 to 48 h. When too much solvent is also distilled off as the water is distilled off, an appropriate further amount has to be added.

The isolation of the resulting polychromophores I can be undertaken as follows:

The polychromophores I are precipitated out or crystallized out by cooling and adding a protic solvent such as water or a lower aliphatic alcohol, washed with one of the aforementioned solvents and, if appropriate, a dilute mineral acid to remove residues of rylenedicarboximide derivative IIIc and/or inorganic salts, and dried.

As described for the nucleophilic substitution, the resulting polychromophores I can, if desired, be further purified by subjecting them to column chromatography or column filtration, or a recrystallization or fractional crystallization.

Esterification

Polychromophores I in which the X chromophores are bonded to the rylene chromophore via ester groups may advantageously be obtained starting from the corresponding rylenedicarbonyl chlorides IIf. The rylene chromophore here is especially perylene.

This invention accordingly further provides a process for preparing polychromophores based on rylenedicarboxylic esters of the general formula If

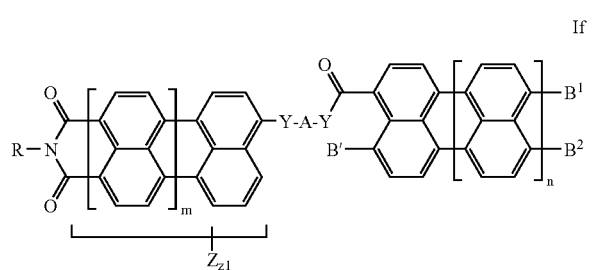

in which n=1, B' is hydrogen, halogen or cyano, one of the two B$^1$ and B$^2$ radicals is a radical of the formula

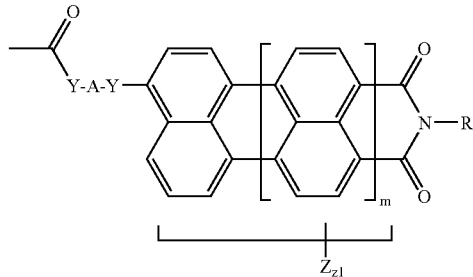

and the other radical is hydrogen, halogen or cyano, which comprises converting a rylenedicarboximide derivative of the general formula IIIa

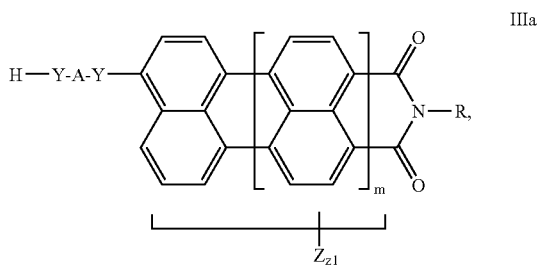

in the presence of an alkali metal base and of an aprotic solvent, to the alkali metal salt of the general formula IIIf

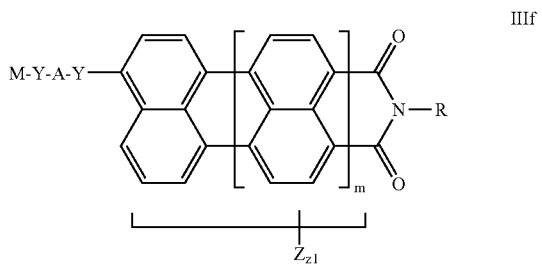

in which M is an alkali metal cation, and then reacting it with a rylenedicarbonyl chloride of the general formula IIf

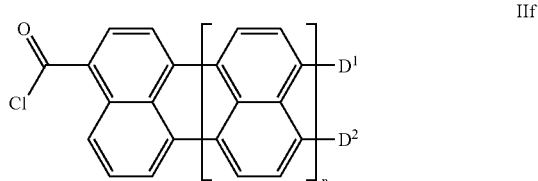

in which n=1 and one of the two D$^1$ and D$^2$ radicals is —COCl and the other radical is hydrogen, in a molar ratio of from 0.8:1 to 1.2:1, to give a rylenedicarboxylic ester of the formula If in which B' and the remaining B$^1$ or B$^2$ radicals are each hydrogen, and, if desired, halogenating the resulting rylenedicarboxylic ester, after intermediate isolation, in the presence of a polar organic solvent and of a Lewis acid, with N-halosuccinimide to give the rylenedicarboxylic ester of the formula If in which B' and the remaining $B^1$ or $B^2$ radical are each halogen, and, if desired, converting the resulting halogenated rylenedicarboxylic ester, with a metal cyanide in the presence of an aprotic solvent and of a transition metal catalyst, to the corresponding cyano-substituted rylenedicarboxylic ester of the formula If in which B' and the remaining $B^1$ or $B^2$ radical are each cyano.

Perylene dicarbonyl chlorides IIf used as a reactant for the esterification are typically also present in the form of mixtures of the 3,9- and 3,10-isomer, the polychromophores If are also obtained as a corresponding isomer mixture.

The esterification is undertaken in the presence of an aprotic solvent and of an alkali metal base.

Suitable aprotic solvents are in particular polar aprotic solvents such as aprotic ethers and the aforementioned N,N-disubstituted aliphatic carboxamides and N-alkyllactams.

Examples of the preferred ethers are: dialkyl ethers which may have two identical or different alkyl radicals and generally have from 3 to 8 carbon atoms, and diaryl ethers; dialkyl ethers, especially di($C_1$-$C_6$-alkyl)ethers and diaryl ethers (in particular diphenyl ethers) of monomeric and oligomeric $C_2$-$C_3$-alkylene glycols which may comprise up to six alkylene oxide units, particular preference being given to diethylene glycol di($C_1$-$C_4$-alkyl)ethers, and cyclic ethers.

Specific examples include: tert-butyl methyl ether; diphenyl ether; diethylene glycol dimethyl, diethyl, dipropyl, diisopropyl, dibutyl, di-sec-butyl and di-tert-butyl ether, diethylene glycol methyl ethyl ether, triethylene glycol dimethyl and diethyl ether and triethylene glycol methyl ethyl ether; tetrahydrofuran and dioxane. Very particular preference is given to diethylene glycol dimethyl and diethyl ether.

Also suitable are nonpolar aprotic solvents such as aliphatics (especially $C_8$-$C_{18}$-alkanes), unsubstituted, alkyl-substituted and fused cycloaliphatics (especially unsubstituted $C_7$-$C_{10}$-cycloalkanes, $C_6$-$C_8$-cycloalkanes which are substituted by from one to three $C_1$-$C_6$-alkyl groups, polycyclic saturated hydrocarbons having from 10 to 18 carbon atoms), alkyl- and cycloalkyl-substituted aromatics (especially benzene which is substituted by from one to three $C_1$-$C_6$-alkyl groups or one $C_5$-$C_8$-cycloalkyl radical) and fused aromatics which may be alkyl-substituted and/or partly hydrogenated (especially naphthalene which is substituted by from one to four $C_1$-$C_6$-alkyl groups).

Specific examples include: octane, isooctane, nonane, isononane, decane, isodecane, undecane, dodecane, hexadecane and octadecane, cycloheptane, cyclooctane, methylcyclohexane, dimethylcyclohexane, trimethylcyclohexane, ethylcyclohexane, diethylcyclohexane, propylcyclohexane, isopropylcyclohexane, dipropylcyclohexane, butylcyclohexane, tert-butylcyclohexane, methylcycloheptane and methylcyclooctane; toluene, o-, m- and p-xylene, 1,3,5-trimethylbenzene (mesitylene), 1,2,4- and 1,2,3-trimethylbenzene, ethylbenzene, propylbenzene, isopropylbenzene, butylbenzene, isobutylbenzene, tert-butylbenzene and cyclohexylbenzene; naphthalene, decahydronaphthalene (decalin), 1- and 2-methylnaphthalene and 1- and 2-ethylnaphthalene; combinations of the aforementioned solvents, as can be obtained from the high-boiling, partly or fully hydrogenated fractions from thermal and catalytic cracking processes in crude oil or naphtha processing, for examples mixtures of the Exsol® type and alkylbenzene mixtures of the Solvesso® type.

In general, from 2 to 75 ml, in particular from 3 to 50 ml of solvent are used per g of rylenedicarboximide derivative IIIa.

Suitable alkali metal bases are in particular alkali metal hydrides, especially lithium hydride, sodium hydride and potassium hydride.

In general, from 0.8 to 1.2 mol, preferably from 0.9 to 1.1 mol of alkali metal base are used per mole of rylenedicarboximide derivative IIIa.

In general, rylenedicarboximide derivative IIIf and rylenedicarbonyl chloride IIf are reacted in a molar ratio of from 0.8:1 to 1.2:1.

The reaction temperature is typically from 0 to 75° C., in particular from 20 to 50° C.

It is advisable to undertake the esterification under anhydrous conditions.

The reaction time is generally from 1 to 48 h, preferably from 3 to 10 h.

In process technology terms, the procedure in the esterification is appropriately as follows:

solvent, alkali metal base and rylenedicarboximide derivative IIIa are initially charged, the mixture is heated, if desired, to the desired reaction temperature and the rylenedicarboximide derivative IIIa is converted in this way to its salt IIIf. The rylenedicarbonyl chloride IIf is then added and the mixture is stirred at the desired reaction temperature for from 3 to 10 h.

The polychromophores If can be isolated by diluting with protic solvents such as water and lower aliphatic alcohols, filtering off, repeated washing with an aqueous base, for example an alkali metal hydrogencarbonate solution, and finally with water, and subsequent drying.

As described for the nucleophilic substitution, the resulting polychromophores If may, if desired, be purified further by subjecting them to column chromatography or column filtration, or to a recrystallization or fractional crystallization, sulfuric acid being excluded as a solvent.

When polychromophores If which have a dihalogenated, especially dichlorinated or dibrominated, rylene chromophore (formula If: B'=remaining $B^1$ or $B^2$ radical=halogen) are to be prepared, the polychromophore If obtained in the esterification can be reacted with N-halosuccinimide in the presence of a polar organic solvent and of a Lewis acid.

Suitable polar organic solvents are in particular aprotic solvents. Preferred examples of these solvents are the aforementioned N,N-disubstituted aliphatic dicarboxamides and halogenated hydrocarbons such as chloroform and methylene chloride. Particular preference is given to dimethylformamide.

In general, from 10 to 200 ml, preferably from 10 to 100 ml of solvent are used per g of polychromophore I to be halogenated.

Suitable Lewis acids are in particular metal halides, preference being given to iron(III) halides, aluminum trihalides and zinc halides. Specific examples include iron(III) chloride, iron(III) bromide, iron(III) iodide, aluminum trichloride, aluminum tribromide, aluminum triiodide and zinc chloride, particular preference being given to the iron halides.

In general, from 0.01 to 0.5 mol, preferably from 0.05 to 0.2 mol of Lewis acid is used per mole of polychromophore If to be halogenated.

Typically, from 2 to 12 mol, in particular from 2 to 8 mol of N-halosuccinimide are required per mole of If.

The halogenation temperature is generally from 20 to 100° C., preferably from 40 to 80° C.

It is advisable to work under protective gas, for example nitrogen or argon.

Typical reaction times are from 0.5 to 24 h, in particular form 1 to 2 h.

In process technology terms, the procedure is appropriately as follows:

A mixture of polychromophore If to be halogenated, Lewis acid, N-halosuccinimide and solvent is heated to the desired reaction temperature under protective gas with stirring. After cooling to room temperature, the reaction product is precipitated out with dilute inorganic acid, for example with dilute hydrochloric acid. The reaction product is filtered off, washed with hot water and dried.

Further drying of the resulting polychromophores If may, if desired, be undertaken as described above.

If desired, the dihalogenated polychromophores If may be converted, by reacting with a metal cyanide in the presence of an aprotic solvent and of a transition metal catalyst, to the corresponding di-cyano-substituted polychromophores If (B'=remaining $B^1$ or $B^2$ radical=cyano).

Suitable metal cyanides here are in particular alkali metal cyanides such as sodium cyanide or potassium cyanide, or zinc cyanide.

Suitable aprotic solvents are the aforementioned solvents, preference being given to the N,N-disubstituted aliphatic carboxamides and the N-alkyllactams.

In general, from 10 to 200 ml, in particular from 10 to 100 ml of solvent are used per g of dihalogenated polychromophore If.

Suitable transition metal catalysts are in particular palladium complexes, for example tetrakis(triphenylphosphine)palladium(0), tetrakis(tris-o-tolylphosphine)palladium(0), [1,2-bis(diphenylphosphino)ethane]palladium(II) chloride, [1,1'-bis(diphenylphosphino)ferrocene]palladium(II) chloride, bis(triethylphosphine)palladium(II) chloride, bis(tricyclohexylphosphine)palladium(II) acetate, (2,2'-bipyridyl)palladium(II) chloride, bis(triphenylphosphine)palladium(II) chloride, tris(dibenzylideneacetone)dipalladium(0), 1,5-cyclooctadienepalladium(II) chloride, bis(acetonitrile)palladium(II) chloride and bis(benzonitrile)palladium(II) chloride, preference being given to [1,1'-bis(diphenylphosphino)ferrocene]palladium (II) chloride and tetrakis(triphenylphosphine)palladium(0).

Typically, from 1 to 10 mol %, in particular from 2 to 5 mol % of transition metal catalyst are used based on the dihalogenated polychromophore If.

In general, from 2 to 10 equivalents, preferably from 2 to 6 equivalents of metal cyanide are used per mole of dihalogenated polychromophore If.

The reaction temperature is generally from 20 to 150° C., preferably from 50 to 100° C.

It is advisable to work under protective gas, for example nitrogen or argon.

The reaction has typically ended within from 2 to 40 h, in particular from 4 to 20 h.

In process technology terms, the procedure is appropriately as follows:

A mixture of halogenated polychromophore If, transition metal catalyst, metal cyanide is heated to the desired reaction temperature under protective gas with stirring. After cooling to room temperature, the reaction product is precipitated out with lower alcohols to which dilute ammonia may be added. The reaction product is filtered off, washed with hot water and dried.

Further purification of the resulting polychromophores If may, if desired, be undertaken as described above.

Amidation

Polychromophores I in which the X chromophores are bonded to the rylene chromophore via amide groups may advantageously likewise be obtained starting from the corresponding perylenedicarbonyl chlorides If. The rylene chromophore is again especially perylene.

Accordingly, a process has been found for preparing polychromophores based on rylenedicarboxamides of the general formula Ig

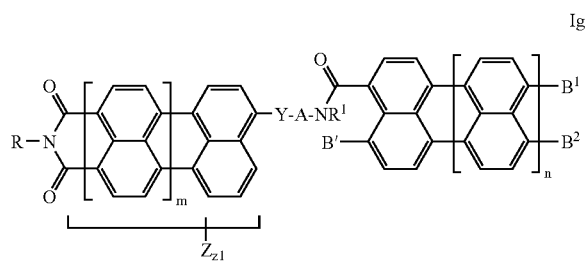

in which n=1 and m=0, B' is hydrogen, halogen or cyano, one of the two $B^1$ and $B^2$ radicals is a radical of the formula

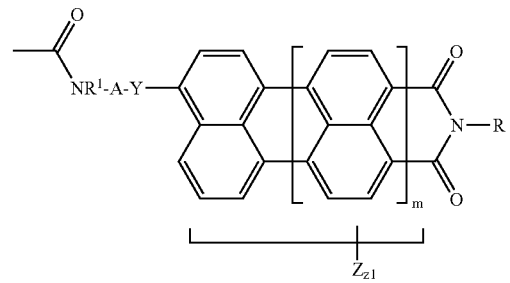

in which m=0 and the other radical is hydrogen, halogen or cyano, which comprises reacting a rylenedicarbonyl chloride of the general formula IIf

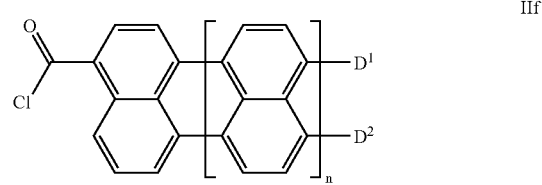

in which n=1 and one of the two $D^1$ and $D^2$ radicals is —COCl and the other radical is hydrogen, in the presence of a non-nucleophilic base and, if desired, additionally of an aprotic solvent, with from 0.8 to 1.2 mol per mole of a rylenedicarboximide derivative of the general formula IIIg

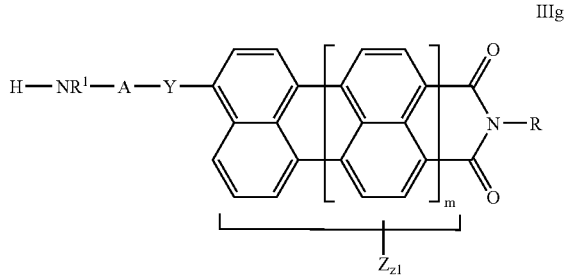

in which m=0 to give a rylenedicarboxamide of the formula Ig in which B' and the remaining $B^1$ or $B^2$ radicals are each hydrogen, and, if desired, halogenating the resulting rylenedicarboxamide, after intermediate isolation, in the presence of a polar organic solvent and of a Lewis acid, with N-halosuccinimide to give the rylenedicarboxamide of the formula Ig in which B' and the remaining $B^1$ or $B^2$ radical are each halogen, and, if desired, converting the resulting halogenated rylenedicarboxamide, with a metal cyanide in the presence of an aprotic solvent and of a transition metal catalyst, to the corresponding cyano-substituted rylenedicarboxamide of the formula Ig in which B' and the remaining $B^1$ or $B^2$ radical are each cyano.

Since the perylenedicarbonyl chlorides IIf typically present in the form of mixtures of the 3,9- and 3,10-isomer are also used for the amidation, the polychromophores Ig are also obtained as a corresponding isomer mixture.

The amidation is undertaken in the presence of a non-nucleophilic base and, if desired, additionally of an aprotic solvent.

The non-nucleophilic bases used are preferably non-nucleophilic nitrogen bases. Suitable bases for this purpose are alkylamines, especially tri($C_2$-$C_6$-alkyl)amines such as triethylamine, tripropylamine and tributylamine, and heterocyclic bases such as pyridine, 4-(N,N-dimethylamino)pyridine, (4-pyrrolidino)pyridine, N-methylpiperidine, N-methylpiperidone, N-methylmorpholine, N-methyl-2-pyrrolidone, pyrimidine, quinoline, isoquinoline, quinaldine, diazabicyclooctane (DABCO), diazabicyclononene (DBN) and diazabicycloundecene (DBU).

These nitrogen bases may simultaneously serve as solvents. In this case, typically from 10 to 100 g, preferably from 10 to 50 g of base are used per g of rylenedicarbonyl chloride IIf.

When the amidation is undertaken in the presence of a further aprotic solvent, especially of an N,N-disubstituted aliphatic carboxamide or of an N-alkyllactam, generally from 3 to 50 g, in particular from 10 to 25 g of nitrogen base and from about 3 to 50 ml, in particular from 10 to 25 ml of the particular solvent are used, in each case per g of rylenedicarbonyl chloride IIf.

In general, rylenedicarboximide derivative IIIg and rylenedicarbonyl chloride IIf are reacted in a molar ratio of from 0.8:1 to 1.2:1.

The reaction temperature is typically from 0 to 75° C., in particular form 20 to 50° C.

It is advisable to undertake the amidation under anhydrous conditions.

The reaction time is generally from 1 to 24 h, preferably from 1 to 5 h.

In process technology terms, the procedure in the amidation is appropriately as follows:

Rylenedicarbonyl chloride IIf, rylenedicarboximide derivative IIIg and non-nucleophilic base, and also solvent if appropriate, are mixed, this mixture is heated, if appropriate, to the desired reaction temperature and stirred at the desired temperature for from 1 to 24 h.

The polychromophores Ig can be isolated by diluting with protic solvents such as water and lower aliphatic alcohols, filtering off, repeated washing with an aqueous base, for example an alkali metal hydrogencarbonate solution, and finally with water, and subsequent drying.

As described for the nucleophilic substitution, the resulting polychromophores Ig may, if desired, be further purified by subjecting them to column chromatography or column filtration, or to a recrystallization or fractional crystallization, sulfuric acid being excluded as a solvent.

Polychromophores Ig which are dihalogenated, especially dichlorinated or dibrominated, or di-cyano-substituted (B'=remaining $B^1$ or $B^2$ radical=halogen or cyano) may be prepared analogously to the corresponding polychromophores If. For a more pre-cise description of the particular procedure, reference is therefore made to the remarks in the esterification section.

Preparation of the Rylenedicarboximide Derivatives III

Finally, a process has also been found for preparing rylenedicarboximide derivatives of the formula III defined at the outset

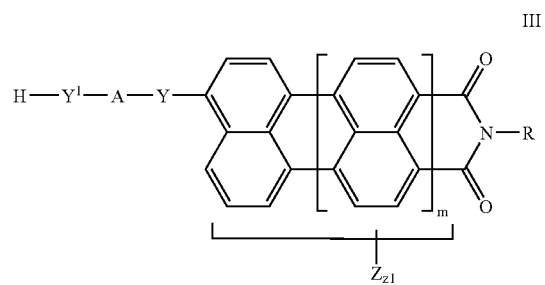

III which comprises reacting a peri-halogenated rylenedicarboximide of the general formula V

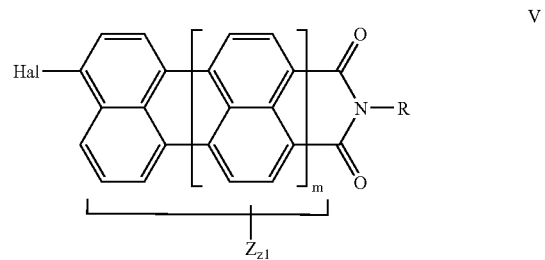

V in which Hal is chlorine or bromine, in the presence of a base and of a non-nucleophilic solvent, with from 2 to 5 mol per mole of halogen atom to be exchanged of an at least bifunctional aromatic compound of the general formula VI

H—$Y^1$-A-Y—H                                    VI.

The at least bifunctional compound VI which replaces the peri-halogen atom is a di(thio)alcohol or an amino(thio)alcohol which is bonded to the rylenedicarboximide V via Y (—O— or —S—).

The at least bifunctional compound VI comprises the bridging member A which has been described in detail above and comprises at least one (het)aromatic radical as the unit which joins the functional groups —YH and —Y$^1$H. Preferred and particularly preferred compounds VI are therefore obvious from the above-described bridging members A.

Specific examples of very particularly suitable compounds VI include:

1,4-dihydroxybenzene (hydroquinone), 1,3-dihydroxybenzene (resorcinol), 1,2-dihydroxybenzene (pyrocatechol), 1,4-, 1,3- and 1,2-dimercaptobenzene, 1,4-dihydroxy-2,5-di(tert-butyl)benzene, 1,4-dihydroxy-2,5-dihexylbenzene, 1,4-dihydroxy-2,5-di(tert-octyl)benzene, 1,4-dihydroxy-2,5-didodecylbenzene, 1,4-dihdyroxy-2,5-di(2-dodecyl)benzene, p-, m- and o-aminophenol, 1,4- and 1,8-dihydroxynaphthalene, 1,4- and 1,8-dimercaptonaphthalene, 1,4- and 1,8-diaminonaphthalene, 4,4'-, 3,3'- and 2,2'-dihydroxydiphenyl (4,4'-, 3,3'- and 2,2'-dihydroxybiphenyl), 4,4'-dihydroxy-2,2', 6,6'-tetramethyldiphenyl, 4,4'-dihydroxy-2,2',6,6'-tetraisopropyldiphenyl, 4,4'-dihydroxy-2,2',6,6'-tetra(2-hexyl)diphenyl, 4,4'-dihydroxy-2,2',6,6'-tetramethyldiphenyl, (4,4'-dihydroxydiphenyl)methane, (4,4'-dihydroxydiphenyl)dimethylmethane (bisphenol A), (4,4'-dihydroxydiphenyl)diethylmethane and (4,4'-dihydroxydiphenyl)diphenylmethane, very particular preference being given to hydroquinone, 1,4-dihydroxy-2,5-di(tert-octyl)benzene, p-aminophenol, 4,4'-dihydroxy-2,2',6,6'-tetramethyldiphenyl, 4,4'-dihydroxy-2,2',6,6'-tetraisopropyldiphenyl, 4,4'-dihydroxy-2,2',6,6'-tetra(2-hexyl)diphenyl and bisphenol A.

The reaction between the peri-halorylenedicarboximide V and the at least bifunctional compound VI is likewise a nucleophilic substitution.

The reaction conditions specified above in the nucleophilic substitution section (type and amount of the non-nucleophilic solvent, type and amount of the base, reaction temperature, procedure in process technology terms, isolation and, if desired, purification of the reaction product) can therefore be applied to the present reaction.

The molar ratio of at least bifunctional compound VI to peri-halorylenedicarboximide V is from 2:1 to 5:1, preferably from 3:1 to 4:1.

By virtue of the excess of VI, the formation of double rylenedicarboximides attached via the —Y-A-Y— moiety, which is to be expected in the case of the diols and dithiols, can be suppressed effectively. The excess VI can additionally be removed readily by washing with a protic solvent, such as water, a lower aliphatic alcohol or an alcohol/water mixture, from the reaction product which is insoluble in these solvents.

The rylenedicarboximide derivatives III are therefore advantageously obtainable without use of complicated protecting group chemistry.

The inventive polychromophores I are notable for the controlled adaptability of their optical properties to the particular application. Their emission is shifted to a longer wavelength compared to their absorption, and the particular wavelength ranges can be determined in a simple manner by appropriate selection of the rylene chromophore and of the X chromophore. In this way, soluble colorants with large Stokes shift are obtainable.

They can be incorporated without any problem into organic and inorganic materials and are suitable for this reason alone for a whole series of applications, of which some will be listed by way of example hereinbelow.

For characterization of the polychromophores I, only the rylene chromophore is specified as the basis. Unless stated otherwise, the X chromophore is the lower homolog in each case.

They can be used generally for coloring coatings, printing inks and plastics.

The perylene- and terrylene-based polychromophores I absorb in the visible region of the electromagnetic spectrum and are notable especially for their fluorescence which is within the visible region of the electromagnetic spectrum in the case of the perylene-based polychromophores.

The quaterrylene-based polychromophores I are of interest especially owing to their absorption capacity in the near-infrared region of the electromagnetic spectrum.

The inventive polychromophores I may be used to produce aqueous polymer dispersions which absorb and/or emit electromagnetic radiation. Fluorescent polymer dispersions are obtained in the case of the terrylene-based polychromophores and especially in the case of the perylene-based polychromophores, while polymer dispersions absorbing in the near infrared region of the electromagnetic spectrum result in the case of the quaterrylene-based polychromophores.

The polychromophores are also suitable for obtaining markings and inscriptions. Owing to their marked absorption in the near infrared region of the electromagnetic spectrum, the quaterrylene-based polychromophores I give rise to infrared light-absorbing markings and inscriptions invisible to the human eye, while the perylene- and terrylene-based polychromophores, owing to the large gap between (short-wavelength) absorption and (long-wavelength) emission, are of particular interest for marking and inscription purposes.

The inventive polychromophores I are finally also usable as filters or emitters for display applications. In this case, the fluorescent polychromophores I which absorb in the visible region, thus in particular the perylene-based polychromophores, are of interest as absorbent color filters or as fluorescent emitters for LCD and OLED displays.

Finally, the polychromophores I may also find use as emitters in chemiluminescence applications. Here, the perylene- and terrylene-based fluorescent polychromophores are again particularly suitable.

Not least, the inventive polychromophores I, especially the perylene- and terrylene-based polychromophores, may also be used as active components in photovoltaics.

EXAMPLES
Example 1
Polychromophore Ia1
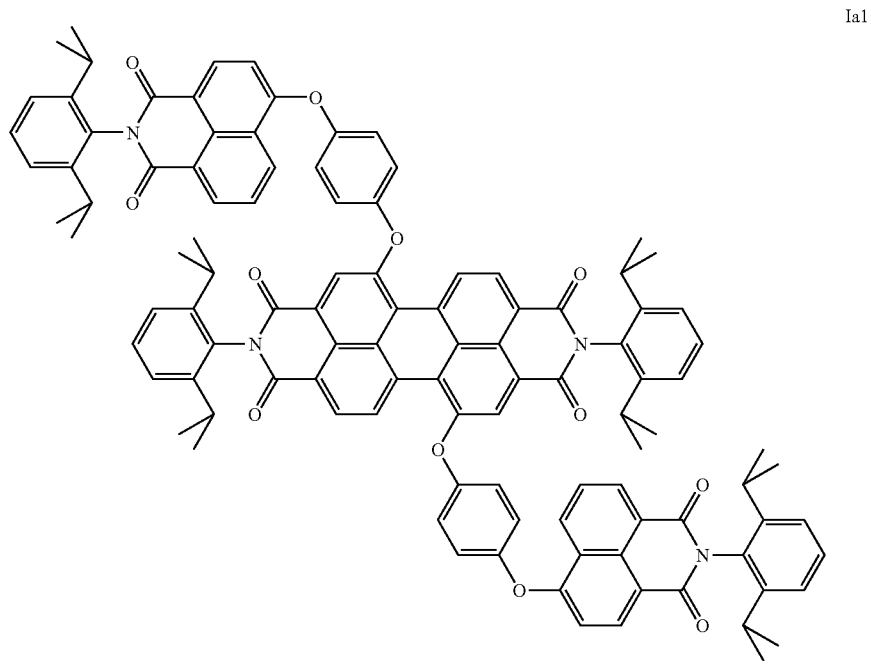
Ia1
+
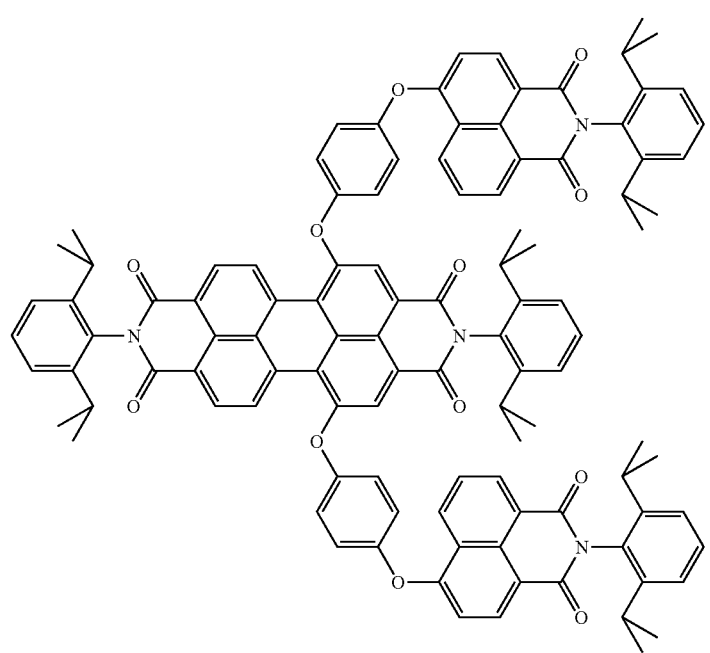

a) Preparation of the Rylenedicarboximide Derivative III1

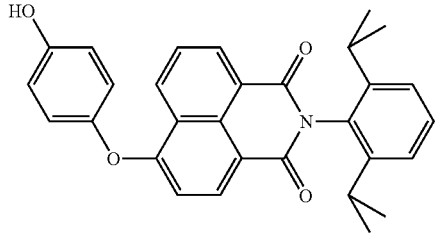

A mixture of 30 ml of N-methylpyrrolidone, 4.15 g (30 mmol) of potassium carbonate, 6.60 g (60 mmol) of hydroquinone and 4.15 g (15 mmol) of N-(2,6-diisopropylphenyl)-4-chloronaphthalene-1,8-dicarboximide was stirred at 80° C. under nitrogen for 24 h.

After cooling to room temperature, the reaction mixture was precipitated in 3 l of water. The resulting suspension was heated to reflux temperature for 30 min, cooled to room temperature and filtered. The filter residue was stirred in a mixture of 200 ml of water and 5 ml of ethanol at 60° C. for 1 h, filtered off again, washed with about 400 ml of warm water and dried at 80° C. under reduced pressure.

6.9 g (quantitative conversion) of the rylenedicarboximide derivative III1 were obtained in the form of a yellowish solid. $R_f$(7:1 toluene/ethanol)=0.40.

b) Preparation of the Polychromophore Ia1

A mixture of 4.6 g (10 mmol) of the rylenedicarboximide derivative III1, 0.86 g (6 mmol) of potassium carbonate, 50 ml of N-methylpyrrolidone and 4.34 g (5 mmol) of a mixture of N,N'-bis(2,6-diisopropylphenyl)-1,7-and-1,6-dibromoperylene-3,4:9,10-tetracarboximide (isomer ratio 75:25) was stirred at room temperature under nitrogen for 28 h. After addition of a further 0.86 g (6 mmol) of potassium carbonate, the mixture was stirred at room temperature for a further 20 h.

The reaction mixture was poured slowly into a mixture of 1 l of water, 50 g of 6% by weight sulfuric acid and 50 ml of ethanol. The product precipitated in this way was filtered off, washed repeatedly with water and with ethanol, and dried at 80° C. under reduced pressure.

7.74 g (95%) of the polychromophore Ia1 were obtained in the form of a red solid, which was purified further by subjecting it to column chromatography on silica gel with a toluene/ethyl acetate mixture (20:1) as the eluent.

$R_f$(10:1 toluene/ethyl acetate)=0.42;
Absorption: $\lambda_{max}$ (CH$_2$Cl$_2$)=351, 525 nm;
Emission: $\lambda_{max}$ (CH$_2$Cl$_2$)=575 nm.

FIG. 1 shows the absorption spectrum (solid line) and emission spectrum (broken line; excitation at 364 nm) of the purified polychromophore Ia1 in methylene chloride.

Example 2

Polychromophore Ia2

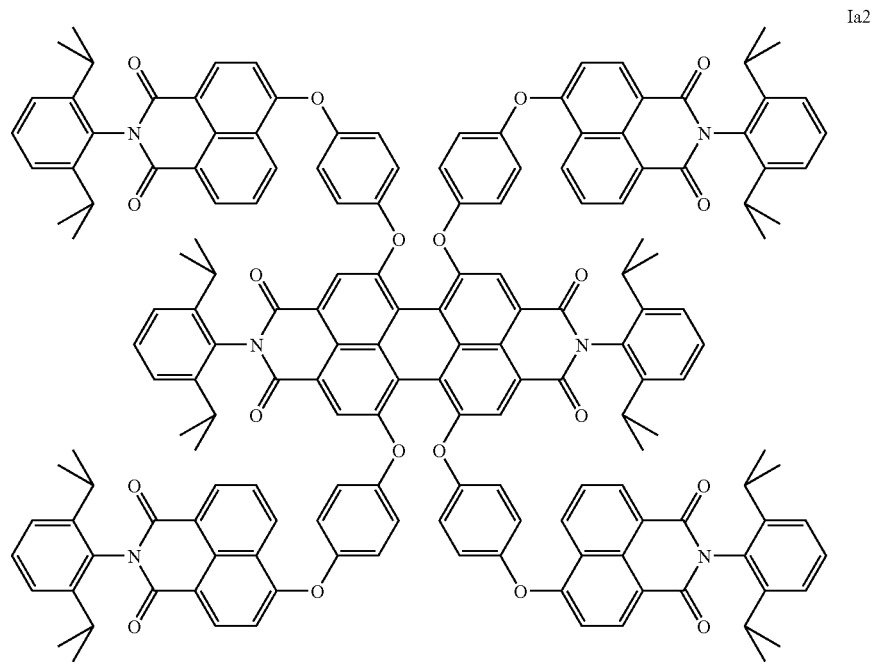 [SMILES: CC(C)c1cccc(C(C)C)c1N1C(=O)c2cccc3c(Oc4ccc(Oc5cc6c7c(cc(Oc8ccc(Oc9ccc%10c%11c(cccc9%11)C(=O)N(c9c(C(C)C)cccc9C(C)C)C%10=O)cc8)c8c9c(Oc%10ccc(Oc%11ccc%12c%13c(cccc%11%13)C(=O)N(c%11c(C(C)C)cccc%11C(C)C)C%12=O)cc%10)cc%10c%11c(cc(Oc%12ccc(Oc%13ccc%14c%15c(cccc%13%15)C(=O)N(c%13c(C(C)C)cccc%13C(C)C)C%14=O)cc%12)c(c5c78)c%119)C(=O)N(c5c(C(C)C)cccc5C(C)C)C%10=O)C(=O)N(c5c(C(C)C)cccc5C(C)C)C6=O)cc4)ccc(c23)C1=O]

A mixture of 0.93 g (2 mmol) of the rylenedicarboximide derivative III1 from example 1a), 0.17 g (1.25 mmol) of potassium carbonate, 10 ml of N-methylpyrrolidone and 0.42 g (0.5 mmol) of N,N'-bis(2,6-diisopropylphenyl)-1,6,7,12-tetrachloroperylene-3,4:9,10-tetracarboximide was stirred at 80° C. under nitrogen for 30 h.

After cooling to room temperature, the reaction mixture was poured slowly into a mixture of 300 ml of 5% by weight sulfuric acid and 30 ml of ethanol. After stirring for one hour, the product precipitated in this way was filtered off, washed with water and dried at 80° C. under reduced pressure. The dried product was dissolved in toluene with heating and stirred with a little activated carbon. The activated carbon was subsequently filtered off and the filtrate was concentrated under reduced pressure.

0.8 g (62%) of the polychromophore Ia2 was obtained in the form of a violet solid and was purified further by subjecting it to a column filtration on silica gel with a toluene/ethyl acetate mixture (10:1) as the eluent.
$R_f$ (10:1 toluene/ethyl acetate)=0.42;
Absorption: $\lambda_{max}$ (CH$_2$Cl$_2$)=349, 551 nm;
Emission: $\lambda_{max}$ (CH$_2$Cl$_2$)=602 nm.

Example 3

Polychromophore Ia3

The formula Ia3 shows the main components of the product tetrasubstituted by the two phenoxy radicals (X and Z), which is present in the form of a mixture of the products comprising the two phenoxy radicals in a ratio of 4:0, 1:3, 2:2, 1:3 and 0:4.

A mixture of 3.72 g (8 mmol) of the rylenedicarboximide derivative 1111 from example 1a), 1.38 g (10 mmol) of potassium carbonate, 50 ml of N-methylpyrrolidone and 3.39 g (4 mmol) of N,N'-bis(2,6-diisopropylphenyl)-1,6,7,12-tetrachloroperylene-3,4:9,10-tetracarboximide was stirred at 80° C. under nitrogen for 12 h. After addition of 2.48 g (12 mmol) of tert-octylphenol, the mixture was stirred at 80° C. for a further 6 h.

Ia3

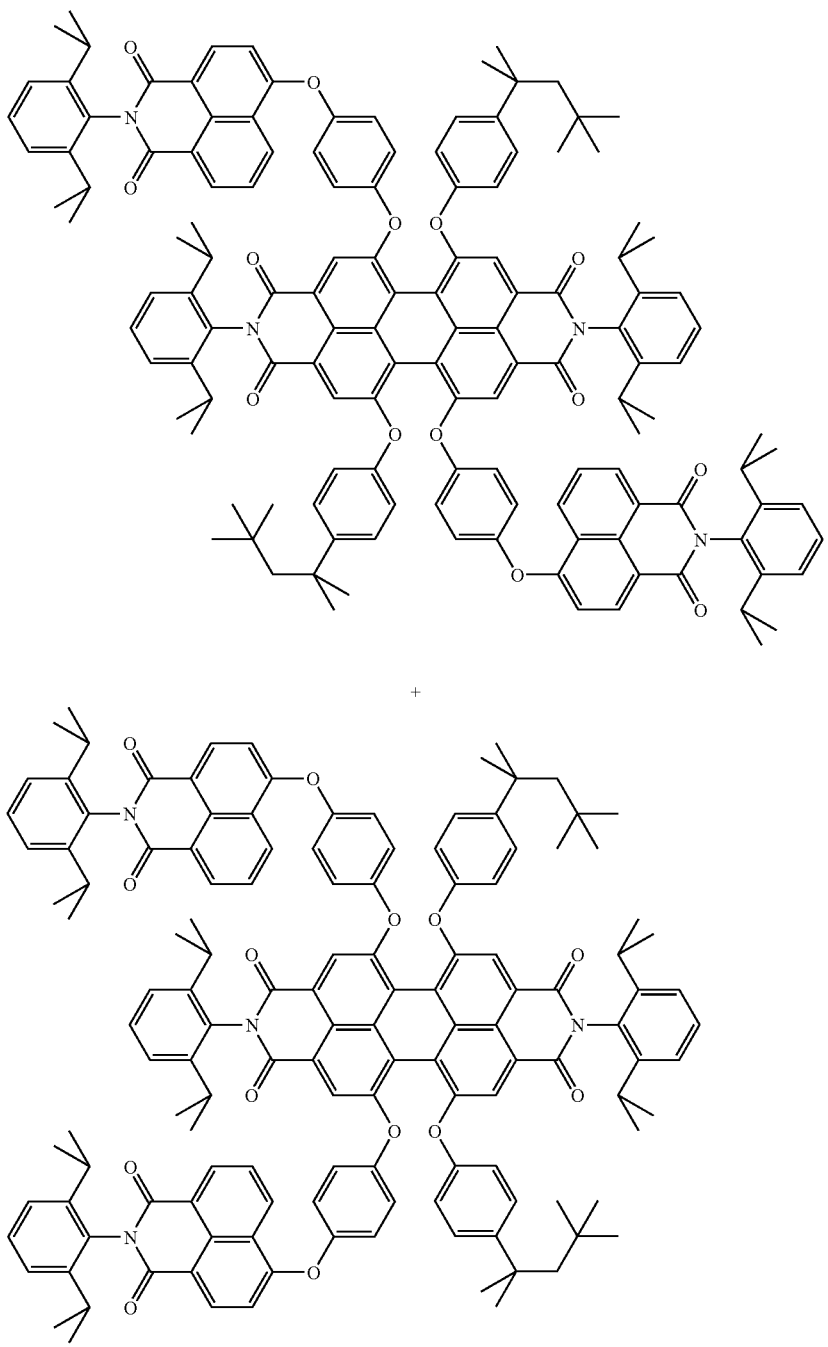

After cooling to room temperature, the reaction mixture was poured slowly into 250 ml of 5% by weight sulfuric acid. The product precipitated in this way was filtered off, washed first with warm water, then with a 1:1 mixture of water and methanol and finally with pure methanol, and dried at 80° C. under reduced pressure. The dried product was dissolved with heating in toluene and stirred with a little activated carbon. The activated carbon was subsequently filtered off, and the filtrate was concentrated under reduced pressure.

7.18 g (87%) of the polychromophore Ia3 were obtained in the form of a red solid as an isomer mixture with Ia3 as the main component.

$R_f$ (10:1 toluene/ethyl acetate)=0.57; 0.82; 0.43; 0.49; 0.96;
Absorption: $\lambda_{max}$ ($CH_2Cl_2$)=361, 570 nm;
Emission: $\lambda_{max}$($CH_2Cl_2$)=611 nm.

Figure 2:
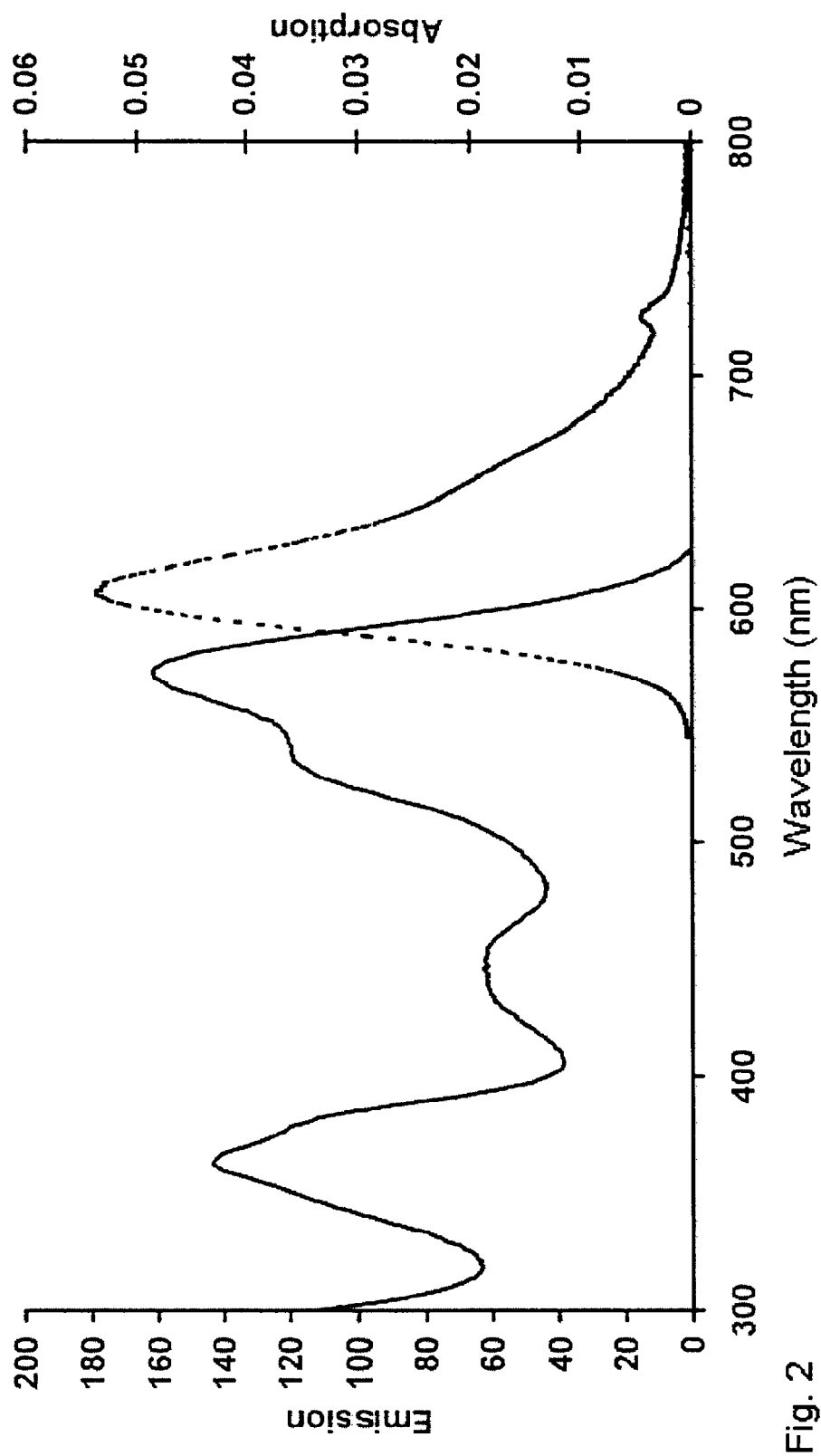

FIG. 2 shows the absorption spectrum (solid line) and emission spectrum (broken line; excitation at 364 nm) of the polychromophore Ia3 in methylene chloride.

Example 4

Polychromophore Ib1 a) Preparation of the Rylenedicarboximide Derivative III2

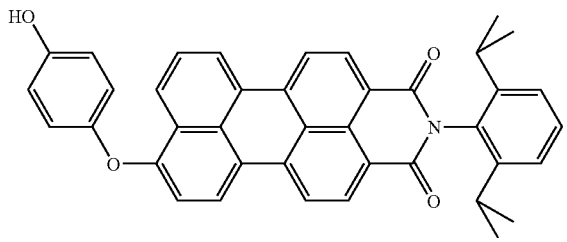

III2

A mixture of 2.8 g (5 mmol) of N,N'-bis(2,6-diisopropylphenyl)-9-bromoperylene-3,4:9,10-tetracarboximide, 1.73 g (12.5 mmol) of potassium carbonate, 50 ml of N-methylpyrrolidone and 2.2 g (20 mmol) of hydroquinone was stirred under nitrogen first at 80° C. for 22 h and then at 110° C. for a further 22 h.

After cooling to room temperature, the reaction mixture was poured slowly into 300 ml of 5% by weight sulfuric acid. The product precipitated in this way was filtered off, washed first with water and then with a 1:1 mixture of water and ethanol, and dried at 80° C. under reduced pressure.

2.7 g (92%) of the rylenedicarboximide derivative III2 were obtained in the form of a violet solid.

$R_f$ (10:1 toluene/ethyl acetate)=0.12.

b) Preparation of the Polychromophore Ib1

A mixture of 1.77 g (3 mmol) of the rylenedicarboximide derivative III2, 1.18 g (3 mmol) of N-(2,6-diisopropylphenyl)-4-chloronaphthalene-1,8-dicarboximide, 1.04 g (7.5

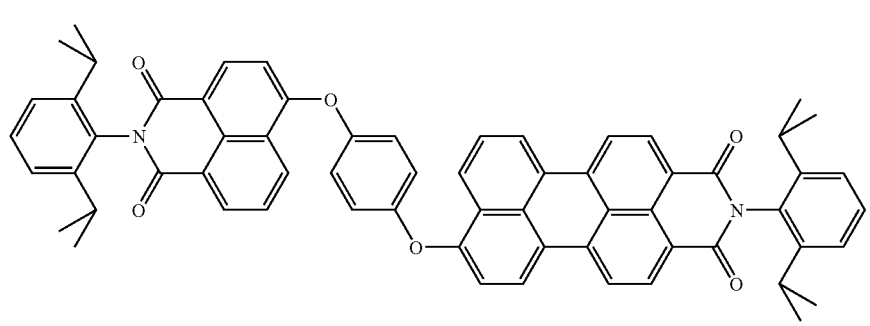

Ib1 mmol) of potassium carbonate and 50 ml of N-methylpyrrolidone was stirred at 80° C. under nitrogen for 34 h.

After cooling to room temperature, the reaction mixture was poured slowly into 500 ml of 5% by weight sulfuric acid. The product precipitated in this way was filtered off, washed with warm water and dried at 80° C. under reduced pressure.

2.78 g (quantitative conversion) of the polychromophore Ib1 were obtained in the form of a red solid.

$R_f$ (10:1 toluene/ethyl acetate)=0.40;

Absorption: $\lambda_{max}$($CH_2Cl_2$)=353, 510 nm;

Emission: $\lambda_{max}$ ($CH_2Cl_2$)=584 nm.

Figure 3:
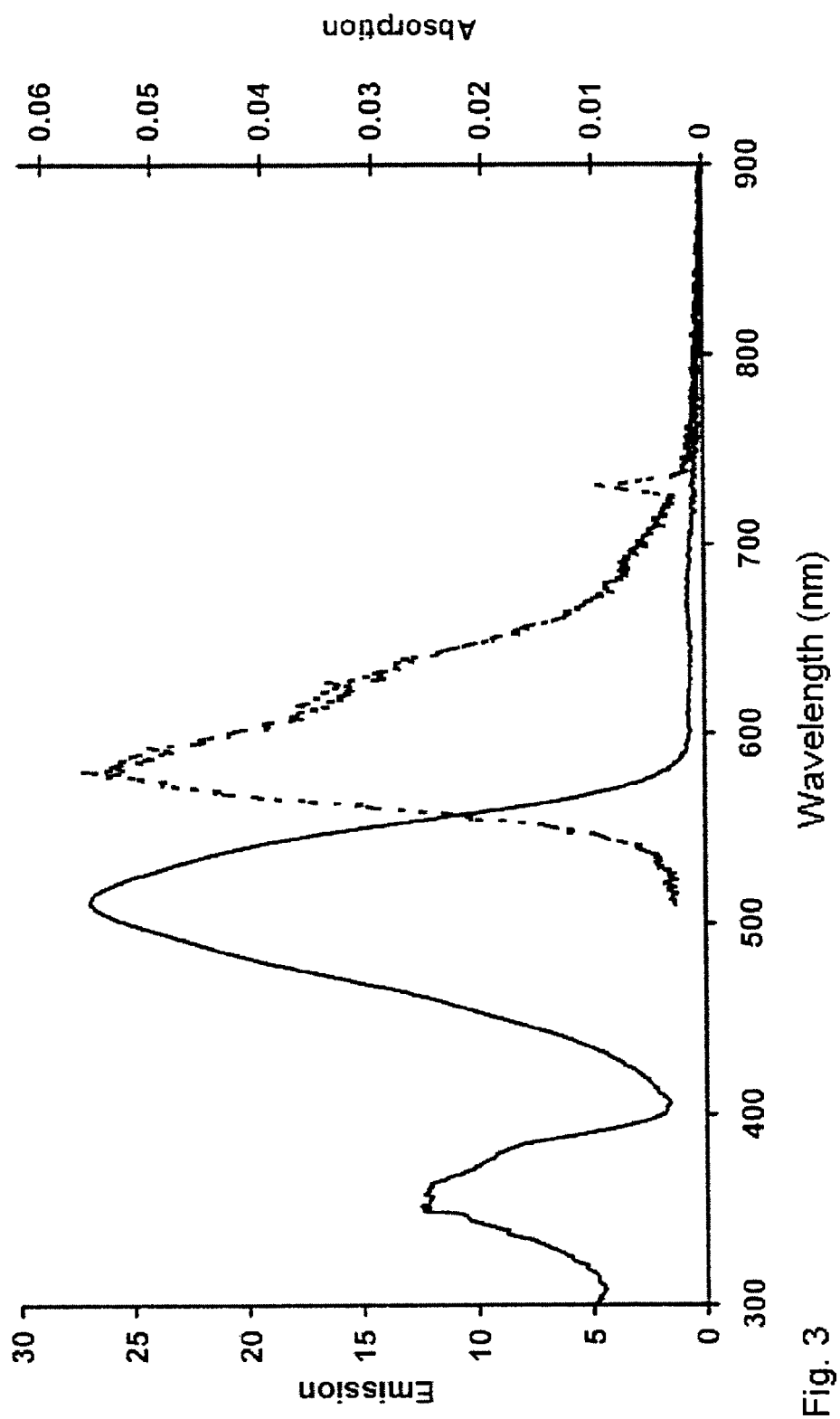

FIG. 3 shows the absorption spectrum (solid line) and emission spectrum (broken line; excitation at 364 nm) of the polychromophore Ib1 in methylene chloride.

Example 5

Polychromophore Ia4

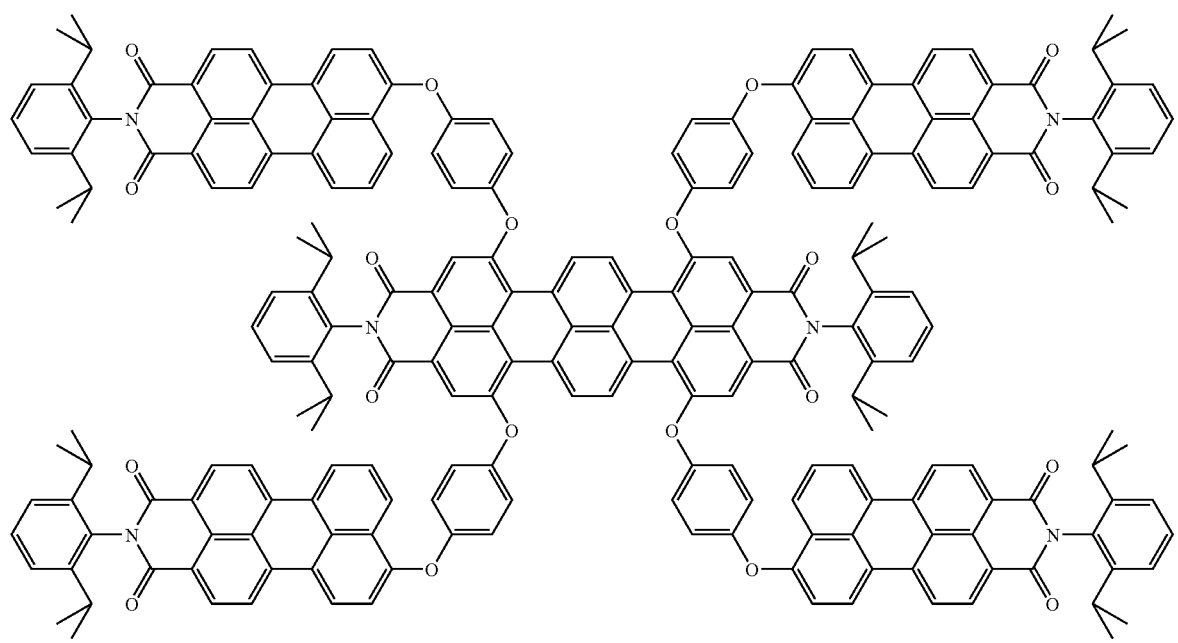

A mixture of 4.4 g (7.5 mmol) of the rylenedicarboximide derivative III2 from example 4a), 1.24 g (9 mmol) of potassium carbonate, 100 ml of N-methylpyrrolidone and 1.73 g (1.5 mmol) of N,N'-bis(2,6-diisopropylphenyl)-1,6,9,14-tetrabromoterrylene-3,4:11,12-tetracarboximide was stirred at 80° C. under nitrogen for 3 h.

After cooling to room temperature, the reaction mixture was poured slowly into 600 ml of 5% by weight sulfuric acid. The product precipitated in this way was filtered off, washed repeatedly with water and with ethanol and dried at 80° C. under reduced pressure.

5.1 g (quantitative conversion) of the polychromophore Ia4 were obtained in the form of a violet solid which was purified further by subjecting it to column chromatography on silica gel with a toluene/ethanol mixture (10:1) as the eluent.

$R_f$(10:1 toluene/ethanol)=0.20;

Absorption: $\lambda_{max}$ (CH$_2$Cl$_2$)=510, 675 nm;

Emission: $\lambda_{max}$ (CH$_2$Cl$_2$)=709 nm.

Example 6

Polychromophore Ic1

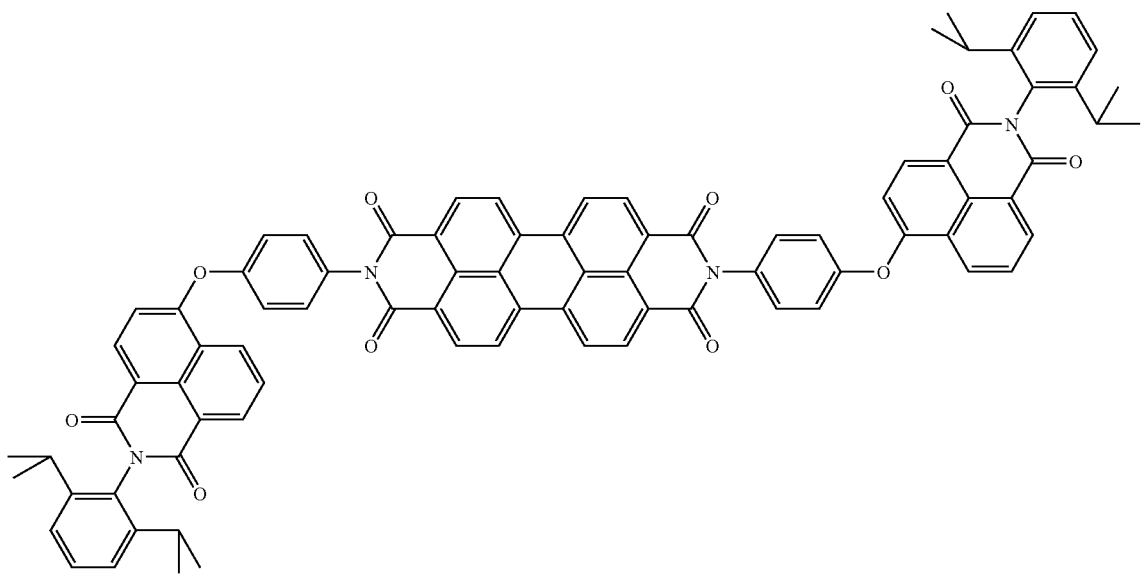

a) Preparation of the Rylenedicarboximide Derivative III3

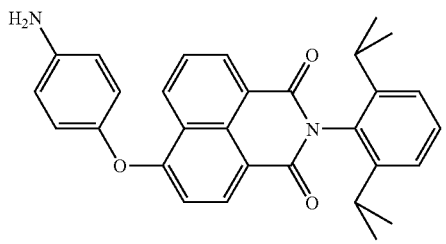

A mixture of 20.0 g (50 mmol) of N-(2,6-diisopropylphenyl)-4-chloronaphthalene-1,8-dicarboximide, 6.7 g (60 mmol) of p-aminophenol, 3.5 g (25 mmol) of potassium carbonate and 100 ml of N-methylpyrrolidone was stirred at 80° C. under nitrogen for 24 h. After addition of a further 7.0 g (50 mmol) of potassium carbonate, the mixture was stirred at 80° C. for a further 6 h.

After cooling to room temperature, the reaction mixture was precipitated in 500 ml of water. The resulting suspension was heated to 80° C. for 24 h, cooled to room temperature and filtered. The filter residue was washed repeatedly with hot water and dried at 80° C. under reduced pressure.

21.5 g (92%) of the rylenedicarboximide derivative 1113 were obtained in the form of a brownish solid.

$R_f$(7:2 toluene/ethanol)=0.60.

b) Preparation of the polychromophore Ic

A mixture of 1.04 g (2.5 mmol) of perylene-3,4:9,10-tetracarboxylic dianhydride, 50 ml of quinoline, 2.4 g of the rylenedicarboximide derivative III3 and 0.5 g (2.5 mmol) of zinc acetate dihydrate was stirred under nitrogen at 160° C. for 6 h, at 180° C. for 6 h and at 200° C. for 2 h.

After cooling to room temperature, the product was precipitated by adding 250 ml of methanol, filtered off, heated again to reflux temperature in 250 ml of methanol, filtered off after cooling and dried at 80° C. under reduced pressure.

2.95 g (92%) of the polychromophore Ic1 were obtained in the form of an orange solid which was purified further by subjecting it to a fractional crystallization in an N-methylpyrrolidone/ethanol mixture (1:3).

$R_f$(7:2 toluene/ethanol)=0.80;

Absorption: $\lambda_{max}(CH_2Cl_2)$=361, 489, 525 nm;

Emission: $\lambda_{max}(CH_2Cl_2)$=535, 578 nm.

Figure 4:
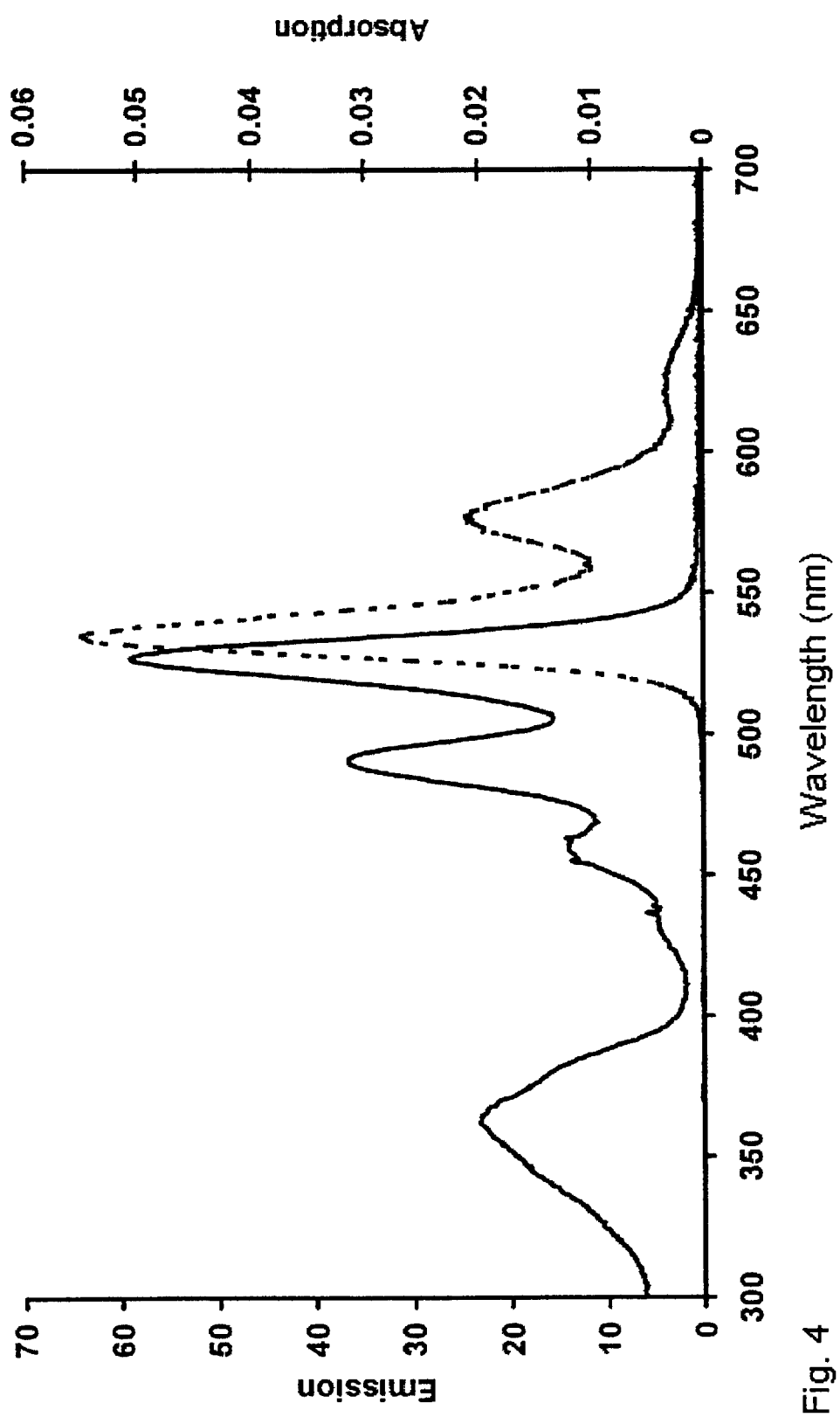

FIG. 4 shows the absorption spectrum (solid line) and emission spectrum (broken line; excitation at 361 nm) of the purified polychromophore Ic1 in methylene chloride.

Example 7

Polychromophore If1

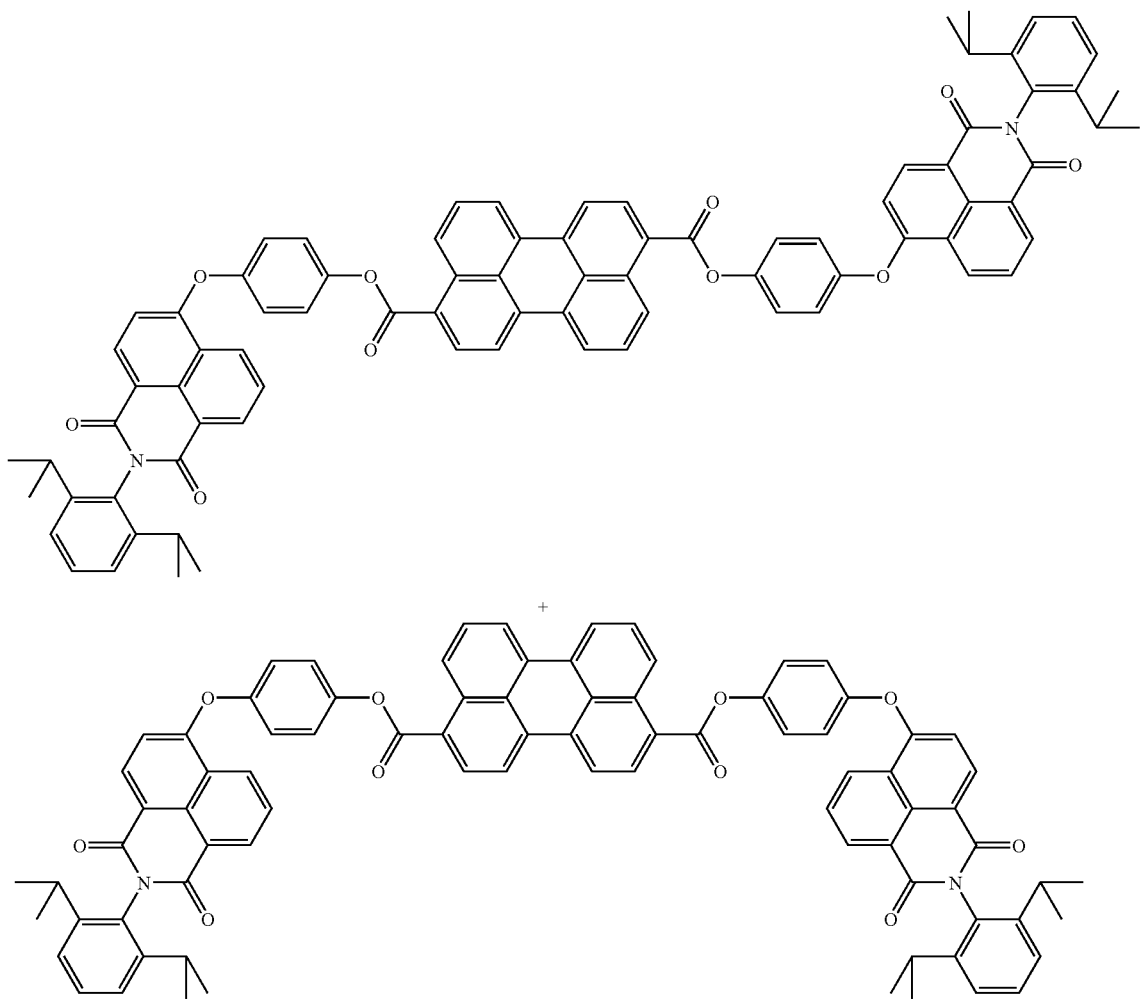

a) Preparation of the Mixture of perylene-3,9-and-3,10-dicarbonyl chloride (Isomer Ratio about 1:1) IIf1

13.7 g (120 mmol) of thionyl chloride were added dropwise under nitrogen at room temperature within 15 min to a mixture of 17.0 g (50 mmol) of a mixture of perylene-3,9-and-3,10-dicarboxylic acid (isomer ratio about 1:1), 125 mol of toluene and 5 drops of dimethylformamide. The mixture was then stirred at 110° C. for 5 h.

After the reaction mixture had been cooled to room temperature, the product was filtered off, washed with petroleum ether until the effluent was colorless and dried in an oil-pump vacuum.

17.2 g (91%) of the isomer mixture IIf1 were obtained in the form of a red solid.

b) Preparation of the Polychromophore If1

A suspension of 1.16 g (29 mmol) of sodium hydride (60% by weight in mineral oil), 100 ml of diethylene glycol diethyl ether and 11.1 g (24 mmol) of the rylenedicarboximide derivative III1 from example 1a) was stirred at room temperature under nitrogen for 1 h. After addition of 5.0 g (13 mmol) of the isomer mixture IIf1, the mixture was stirred at room temperature for another 1 h.

The reaction mixture was then added to 1 l of water. The product precipitated in this way was then filtered off, washed four times with 100 ml each time of saturated sodium hydrogencarbonate solution and then with water, and dried at 80° C. under reduced pressure.

15.0 g (91%) of the polychromophore If1 were obtained in the form of a red solid which was purified further by subjecting it to a fractional crystallization in an N-methylpyrrolidone/water mixture (1:1).

$R_f$(1:10 toluene/methylene chloride)=0.16;

Absorption: $\lambda_{max}(CH_2Cl_2)$=361, 445, 472 nm;

Emission: $\lambda_{max}(CH_2Cl_2)$=490, 522 nm.

Figure 5:
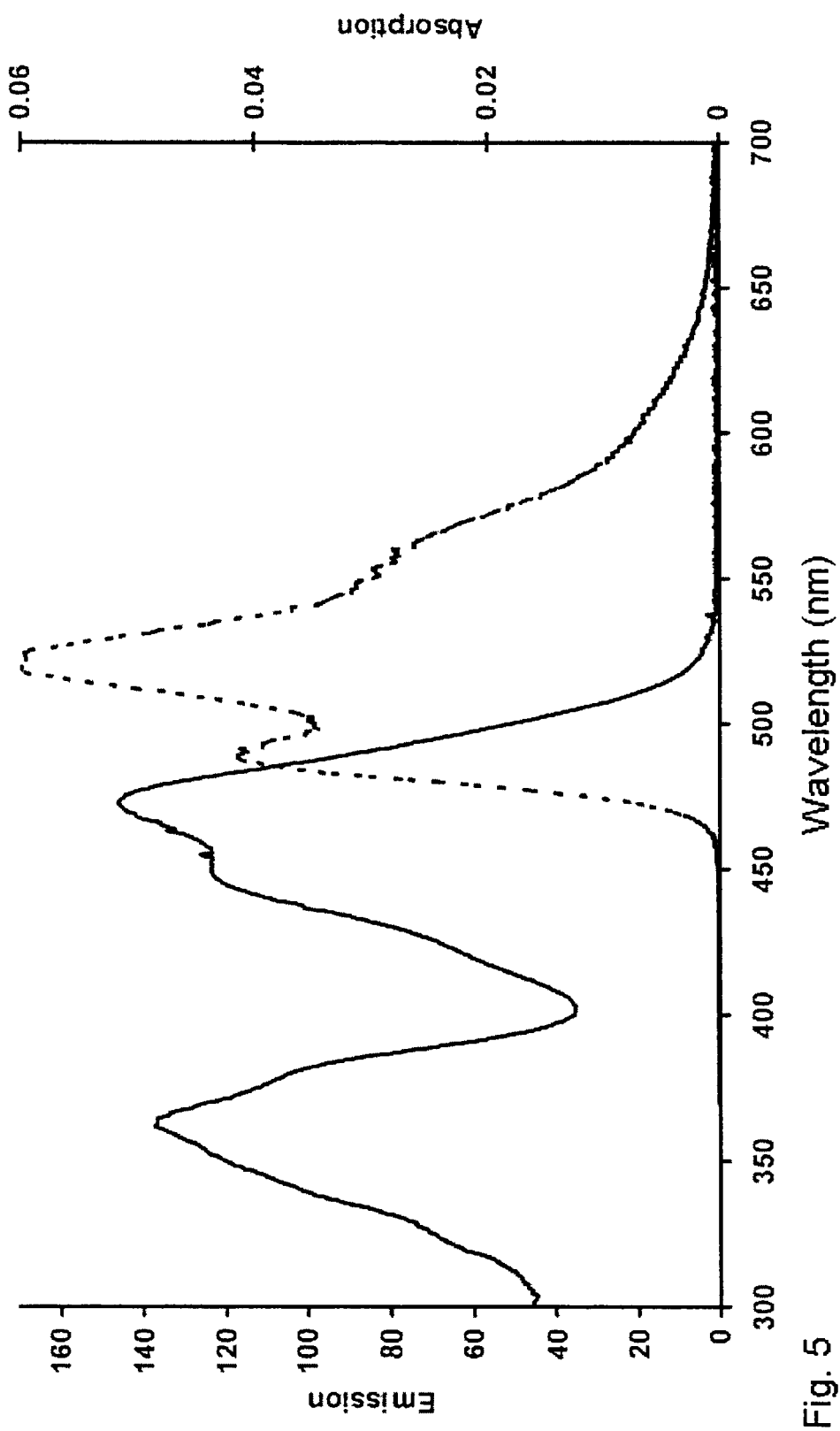

FIG. 5 shows the absorption spectrum (solid line) and emission spectrum (broken line; excitation at 360 nm) of the purified polychromophore If1 in methylene chloride.

Example 8

Polychromophore Ia5

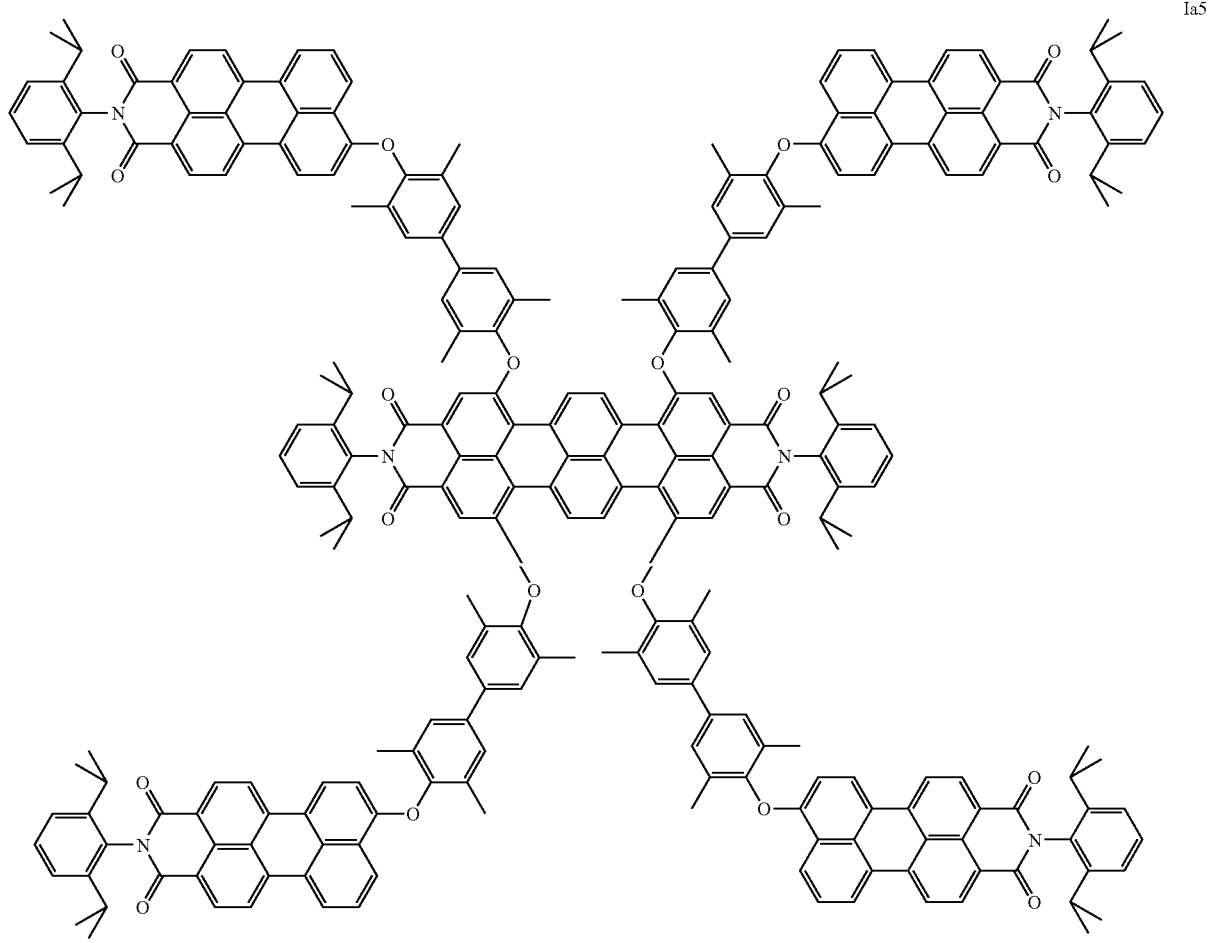

a) Preparation of the Rylenedicarboximide Derivative III4

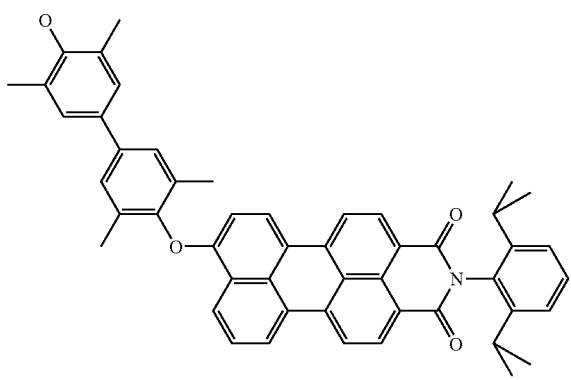

A mixture of 14.0 g (25 mmol) of N-(2,6-diisopropylphenyl)-9-bromoperylene-3,4-dicarboximide, 8.65 g (62 mmol) of potassium carbonate, 24.9 g (100 mmol) of 4,4'-dihydroxy-3,3',5,5'-tetramethyldiphenyl and 200 ml of N-methylpyrrolidone was stirred at 110° C. under nitrogen for 14 h. After addition of a further 3.0 g (22 mmol) of potassium carbonate, the mixture was stirred at 140° C. for another 1 h.

After cooling to room temperature, the reaction mixture was precipitated in 1 l of 5% by weight sulfuric acid. The precipitated product was filtered off, washed with water at 80° C. and dried at 80° C. under reduced pressure. The dried product was heated to reflux temperature in 400 ml of ethanol for 1 h and then cooled slowly to room temperature.

11.5 g (64%) of the rylenedicarboximide derivative III4 were obtained in the form of a violet solid which was purified further by subjecting it to column chromatography on silica gel with methylene chloride as the eluent.

$R_f$(methylene chloride)=0.18.

b) Preparation of the Polychromophore Ia5

A mixture of 0.8 g (0.7 mmol) of N,N'-bis(2,6-diisopropylphenyl)-1,6,9,14-terrylene-3, 4:11,12-tetracarboximide, 2.0 g (2.8 mmol) of the rylenedicarboximide derivative III4, 0.57 g (4 mmol) of potassium carbonate and 50 ml of N-methylpyrrolidone was stirred at 75° C. under nitrogen for 16 h. After further addition of 0.14 g (1 mmol) of potassium carbonate, the mixture was stirred at 75° C. for a further 16 h.

After cooling to room temperature, the reaction mixture was precipitated in 80 ml of 5% by weight sulfuric acid. The precipitated product was filtered off, washed successively with about 500 ml of water and 100 ml of ethanol, and dried at 80° C. under reduced pressure.

2.3 g (90%) of the polychromophore Ia5 were obtained in the form of a violet solid which was purified further by subjecting it to column chromatography on silica gel with a toluene/ethyl acetate mixture (30:1).

$R_f$ (30:1 toluene/ethyl acetate)=0.06;
Absorption: $\lambda_{max}$ (methyl isobutyrate)=520, 683 nm;
Emission: $\lambda_{max}$ (methyl isobutyrate)=702 nm.

Figure 6:
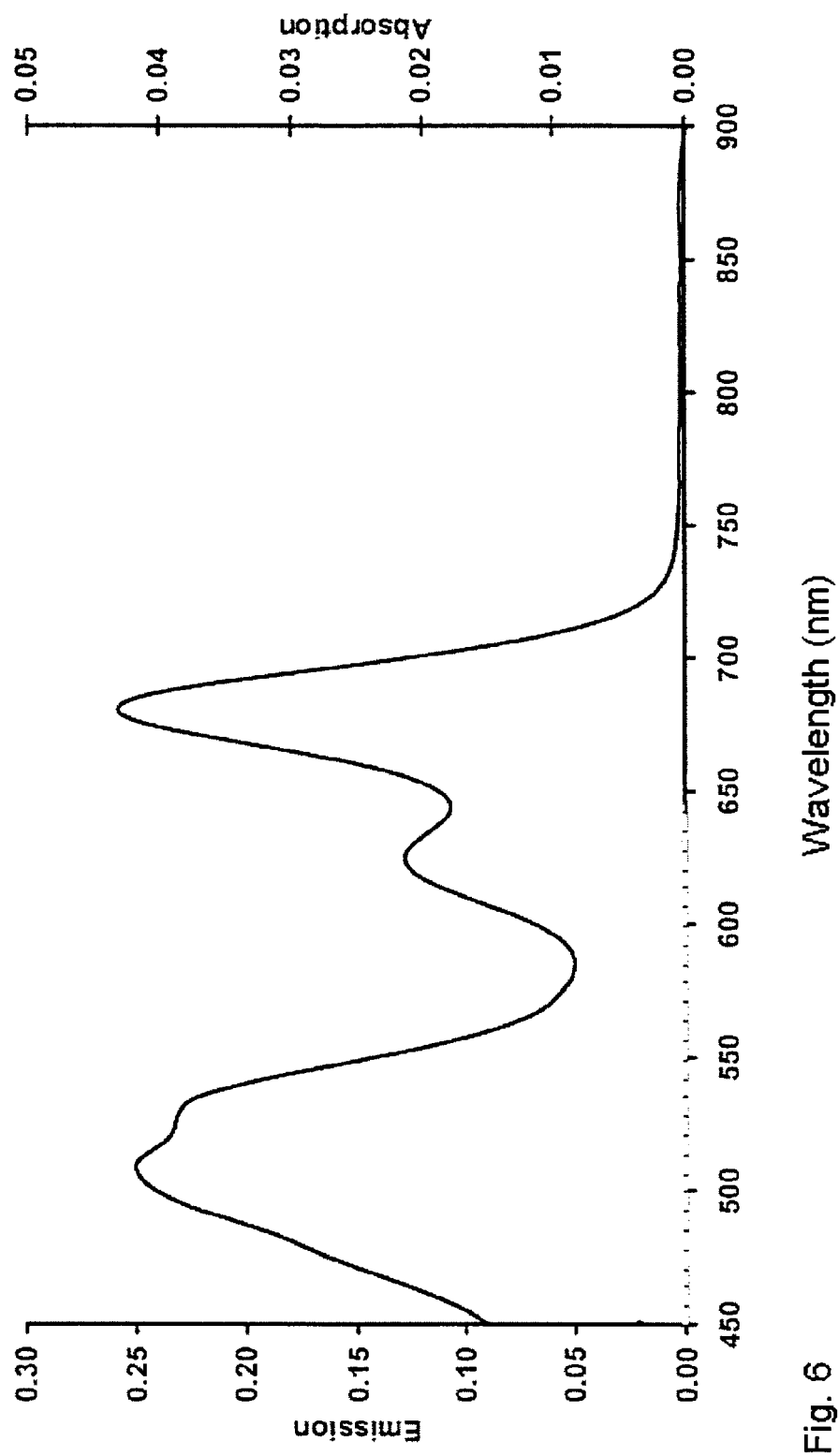

FIG. 6 shows the absorption spectrum (solid line) and emission spectrum (gray line; excitation at 500 nm) of the purified polychromophore Ia5 in methyl isobutyrate.

What is claimed is:

1. A rylene-based polychromophore of the general formula I'

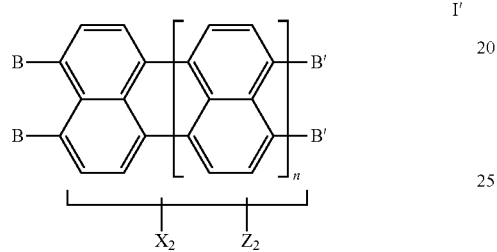

in which the variables are each defined as follows:
X is a rylenedicarboximide radical of the formula

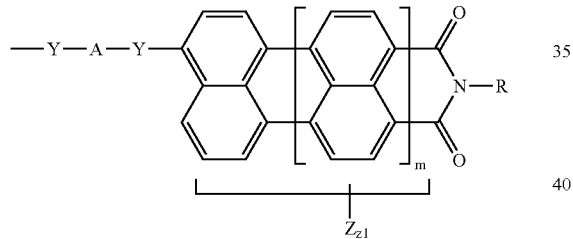

where the X radicals may be the same or different;
Z is aryloxy, arylthio, hetaryloxy or hetarylthio, to each of which may be fused further saturated or unsaturated 5- to 7-membered rings whose carbon skeleton may be interrupted by one or more —O—, —S—, —NR$^1$—, —N=CR$^1$—, —CO—, —SO— and/or —SO$_2$-moieties, where the entire ring system may be mono- or polysubstituted by the (i), (ii), (iii), (iv) and/or (v) radicals:
(i) C$_1$-C$_{30}$-alkyl whose carbon chain may be interrupted by one or more —O—, —S—, —NR$^1$—, —N=CR$^1$—, —C≡C—, —CR$^1$=CR$^1$—, —CO—, —SO— and/or —SO$_2$— moieties and which may be mono- or polysubstituted by: C$_1$-C$_{12}$-alkoxy, C$_1$-C$_6$-alkylthio, —CR$^1$=CR$^1$$_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or saturated or unsaturated C$_4$-C$_7$-cycloalkyl whose carbon skeleton may be interrupted by one or more —O—, —S—, —NR$^1$—, —N=CR$^1$—, —CR$^1$=CR$^1$—, —CO—, —SO— and/or —SO$_2$— moieties, where the aryl and cycloalkyl radicals may each be mono- or polysubstituted by C$_1$-C$_{18}$-alkyl and/or the above radicals specified as substituents for alkyl;

(ii) C$_3$-C$_8$-cycloalkyl whose carbon skeleton may be interrupted by one or more —O—, —S—, —NR$^1$—, —N=CR$^1$—, —CR$^1$=CR$^1$—, —CO—, —SO— and/or —SO$_2$— moieties and to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by: C$_1$-C$_{18}$-alkyl, C$_1$-C$_{12}$-alkoxy, C$_1$-C$_6$-alkylthio, —C≡CR$^1$, —CR$^1$=CR$^1$$_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iii) aryl or hetaryl, to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by: C$_1$-C$_{18}$-alkyl, C$_1$-C$_{12}$-alkoxy, C$_1$-C$_6$-alkylthio, —C≡CR$^1$, —CR$^1$=CR$^1$$_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or hetaryl, each of which may be mono- or polysubstituted by C$_1$-C$_{18}$-alkyl, C$_1$-C$_{12}$-alkoxy, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iv) a —U-aryl radical which may be mono- or polysubstituted by the above radicals specified as substituents for the aryl radicals (iii), where U is an —O—, —S—, —NR$^1$—, —CO—, —SO— or —SO$_2$— moiety;

(v) C$_1$-C$_{12}$-alkoxy, C$_1$-C$_6$-alkylthio, —C≡CR$^1$, —CR$^1$=CR$^1$$_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ or —SO$_3$R$^2$, where the Z radicals may be the same or different when z>1 and/or z1>1;

B when n=1, 2 or 3:
are joined together with formation of a six-membered ring to give a radical of the formula (a) or (b)

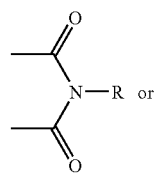

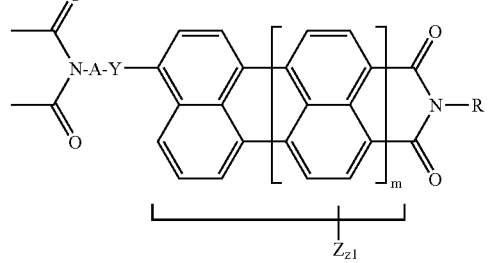

or
one B radical is hydrogen and the other radical is an X radical;
when n=1, additionally:
both are hydrogen, one B radical is hydrogen and the other radical is Z, B', when n=1, 2 or 3:
- are joined to one another with formation of a six-membered ring to give a radical of the formula (a) when the B radicals together are a radical of the formula (a);
- are joined together with formation of a six-membered ring to give a radical of the formula (a) when one B radical is hydrogen and the other radical is an X radical, where, when n=2 or 3, x=0 and z≠0;
- are joined together with formation of a six-membered ring to give a radical of the formula (b) when the B radicals together are a radical of the formula (a) or (b), or one B radical is hydrogen and the other radical is an X or Z radical, where, when n=2 or 3, x=0 and z≠0;

when n=1, additionally:
- are joined together with formation of a six-membered ring to give a radical of the formula (a) or (b) when one B radical is hydrogen and the other radical is a Z radical;

A is a bridging member having at least one aromatic or heteroaromatic radical, where the Y or Y and $Y^1$ groups are bonded to the aromatic or heteroaromatic radical;

Y is —O— or —S—;

$Y^1$ is —O—, —S— or —$NR^1$—;

R is hydrogen;
- $C_1$-$C_{30}$-alkyl whose carbon chain may be interrupted by one or more —O—, —S—, —$NR^1$—, —N=$CR^1$—, —C≡C—, —$CR^1$=$CR^1$—, —CO—, —SO— and/or —$SO_2$— moieties and which may be mono- or polysubstituted by the (ii), (iii), (iv) and/or (v) radicals specified as substituents for the Z radicals;
- $C_3$-$C_8$-cycloalkyl to which may be fused further saturated or unsaturated 5- to 7-membered rings whose carbon skeleton may be interrupted by one or more —O—, —S—, —$NR^1$—, —N=$CR^1$—, —$CR^1$=$CR^1$—, —CO—, —SO— and/or —$SO_2$— moieties, where the entire ring system may be mono- or polysubstituted by the (i), (ii), (iii), (iv) and/or (v) radicals specified as substituents for the Z radicals;
- aryl or hetaryl, to which may be fused further saturated or unsaturated 5- to 7-membered rings whose carbon skeleton may be interrupted by one or more —O—, —S—, —$NR^1$—, —N=$CR^1$—, —$CR^1$=$CR^1$—, —CO—, —SO— and/or —$SO_2$— moieties, where the entire ring system may be mono- or polysubstituted by the (i), (ii), (iii), (iv), (v) radicals specified as substituents for the Z radicals, and/or aryl- and/or hetarylazo, each of which may be mono- or polysubstituted by $C_1$-$C_{10}$-alkyl, $C_1$-$C_6$-alkoxy and/or cyano;
- where the R radicals may be the same or different when they occur repeatedly in formula I;

$R^1$ is hydrogen or $C_1$-$C_{18}$-alkyl, where the $R^1$ radicals may be the same or different when they occur more than once;

$R^2$, $R^3$ are each independently hydrogen;
- $C_1$-$C_{18}$-alkyl whose carbon chain may be interrupted by one or more —O—, —S—, —CO—, —SO— and/or —$SO_2$— moieties and which may be mono- or polysubstituted by $C_1$-$C_{12}$-alkoxy, $C_1$-$C_6$-alkylthio, hydroxyl, mercapto, halogen, cyano, nitro and/or —$COOR^1$;
- aryl or hetaryl, to each of which may be fused further saturated or unsaturated 5- to 7-membered rings whose carbon skeleton may be interrupted by one or more —O—, —S—, —CO— and/or —$SO_2$— moieties, where the entire ring system may be mono- or polysubstituted by $C_1$-$C_{12}$-alkyl and/or the above radicals specified as substituents for alkyl;

n is 1, 2 or 3;

m is 0, 1 or 2;

x, when n=1:
- is from 2 to 4 or else 0 when the B radicals and the B' radicals are each a radical of the formula (b) or one B radical and one B' radical are each a radical of the formula (c);

when n=2:
- is from 2 to 6 when the B radicals and the B' radicals are each a radical of the formula (a);
- is 0 for all further definitions of the B and B' radicals;

when n=3:
- is from 2 to 4 when the B radicals and the B' radicals are each a radical of the formula (a);
- is 0 for all further definitions of the B and B' radicals;

z is from 0 to 8, where x+z≦8, and, when n=2 or 3: z≠0 when x=0;

z1 when m=0: 0;
- when m=1: from 0 to 2;
- when m=2: from 2 to 4.

2. The polychromophore of the general formula I' according to claim 1, in which the variables are each defined as follows:

Z is phenoxy or thiophenoxy, each of which may be mono- or polysubstituted by identical or different (i), (ii), (iii), (iv) and/or (v) radicals:
- (i) $C_1$-$C_{30}$-alkyl whose carbon chain may be interrupted by one or more —O—, —S—, —$NR^1$—, —C≡C—, —$CR^1$=$CR^1$— and/or —CO— and/or —$SO_2$— moieties and which may be mono- or polysubstituted by: $C_1$-$C_{12}$-alkoxy, hydroxyl, halogen, cyano, and/or aryl which may be mono- or polysubstituted by $C_1$-$C_{18}$-alkyl or $C_1$-$C_6$-alkoxy;
- (ii) $C_3$-$C_8$-cycloalkyl whose carbon skeleton may be interrupted by one or more —O—, —S—, —$NR^1$—, —$CR^1$=$CR^1$— and/or —CO— moieties and which may be mono- or polysubstituted by $C_1$-$C_{18}$-alkyl, $C_1$-$C_{12}$-alkoxy and/or $C_1$-$C_6$-alkylthio;
- (iii) aryl or hetaryl, to which may be fused further saturated or unsaturated 5- to 7-membered rings whose carbon skeleton may be interrupted by one or more —O—, —S—, —$NR^1$—, —N=$CR^1$—, —$CR^1$=$CR^1$—, —CO—, —SO— and/or —$SO_2$— moieties, where the entire ring system may be mono- or polysubstituted by: $C_1$-$C_{18}$-alkyl, $C_1$-$C_{12}$-alkoxy, —C=$CR^1$—, —$CR^1$=$CR^1$, hydroxyl, halogen, cyano, —$NR^2R^3$, —$NR^2COR^3$, —$CONR^2R^3$, —$SO_2NR^2R^3$, —$COOR^2$, —$SO_3R^2$, aryl and/or hetaryl, each of which may be mono- or polysubstituted by $C_1$-$C_{18}$-alkyl, $C_1$-$C_{18}$-alkoxy and/or cyano;
- (iv) a —U-aryl radical which may be mono- or polysubstituted by the above radicals specified as substituents for the aryl radicals (iii), where U is an —O—, —S—, —$NR^1$—, —CO—, —SO— or —$SO_2$— moiety;
- (v) $C_1$-$C_{12}$-alkoxy, $C_1$-$C_6$-alkylthio, —C≡$CR^1$, —$CR^1$=$CR^1_2$, hydroxyl, mercapto, halogen, cyano, nitro, —$NR^2R^3$, —$NR^2COR^3$, —$CONR^2R^3$, —$SO_2NR^2R^3$, —$COOR^2$ or —$SO_3R^2$, where the Z radicals may be the same or different when z>1 and/or z1>1;

A is an arylene or hetarylene radical of the formulae

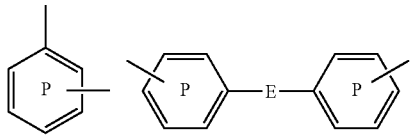

in which the rings P may be the same or different, may comprise heteroatoms as ring atoms and/or may have fused 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by (i), (ii), (iii) and/or (v) radicals specified as substituents for the Z radicals,
where the A radicals may be the same or different when they occur repeatedly in formula I;
E is a chemical bond, an —O—, —S—, —NR$^1$—, —N=CR$^1$—, —C≡C—, —CR$^1$=CR$^1$—, —CO—, —SO— or —SO$_2$— moiety or C$_1$-C$_{12}$-alkylene or C$_4$-C$_7$-cycloalkylene, whose carbon chain may in each case be interrupted once or more than once by these moieties and which may each be mono- or polysubstituted by the (i), (ii), (iii) and/or (v) radicals specified as substituents for the Z radicals;
arylene or hetarylene, each of which may be mono- or polysubstituted by the (i), (ii), (iii) and/or (v) radicals specified as substituents for the Z radicals, where hydroxyl and mercapto are excluded as (v) radicals;
Y is —O—;
Y$^1$ is —O— or —NR$^1$—;
R is C$_1$-C$_{30}$-alkyl whose carbon chain may be interrupted by one or more —O— and/or —CO— moieties and which may be mono- or polysubstituted by: C$_1$-C$_6$-alkoxy, cyano and/or aryl which may be mono- or polysubstituted by C$_1$-C$_{18}$-alkyl and/or C$_1$-C$_6$-alkoxy;
phenyl, naphthyl, pyridyl or pyrimidyl, each of which may be mono- or polysubstituted by: C$_1$-C$_{18}$-alkyl, C$_1$-C$_6$-alkoxy, halogen, cyano, nitro, —CONR$^2$R$^3$, —SO$_2$NR$^2$R$^3$ and/or phenyl- and/or naphthylazo, each of which may be mono- or polysubstituted by C$_1$-C$_{10}$-alkyl, C$_1$-C$_6$-alkoxy and/or cyano;
C$_5$-C$_8$-cycloalkyl which may be mono- or polysubstituted by C$_1$-C$_6$-alkyl, where the R radicals may be the same or different when they occur more than once in formula I;
R$^1$ is hydrogen or C$_1$-C$_6$-alkyl;
R$^2$, R$^3$ are each independently hydrogen;
C$_1$-C$_{18}$-alkyl which may be mono- or polysubstituted by C$_1$-C$_6$-alkoxy, hydroxyl, halogen and/or cyano;
aryl or hetaryl, each of which may be mono- or polysubstituted by C$_1$-C$_6$-alkyl and/or the above radicals specified as substituents for alkyl;
n is 1 or 2;
m is 0 or 1 where m=n−1;
x, when n=1:
is from 2 to 4 or else 0 when the B radicals and the B' radicals are each a radical of the formula (b);
when n=2:
is from 2 to 4 when the B radicals and the B' radicals are each a radical of the formula (a);
is 0 for all further definitions of the B and B' radicals;
z is from 0 to 4, where x+z≦4, where, when n=2: z≠0 when x=0;
z1, when m=0: 0;
when m=1: from 0 to 2.
3. The polychromophore of the general formula I' according to claim 1, in which the variables are each defined as follows:
Z is phenoxy which may be mono- or polysubstituted by identical or different (i), (ii), (iii), (iv) and/or (v) radicals:
(i) C$_1$-C$_{18}$-alkyl whose carbon chain may be interrupted by one or more —O—, —S—, —NR$^1$— and/or —CO— moieties and which may be mono- or polysubstituted by: C$_1$-C$_{12}$-alkoxy, hydroxyl and/or halogen;
(ii) C$_3$-C$_8$-cycloalkyl which may be mono- or polysubstituted by C$_1$-C$_{18}$-alkyl and/or C$_1$-C$_{12}$-alkoxy;
(iii) aryl or hetaryl which may be mono- or polysubstituted by C$_1$-C$_{18}$-alkyl, C$_1$-C$_{12}$-alkoxy, hydroxyl and/or halogen;
(iv) a —U-aryl radical which may be mono- or polysubstituted by the above radicals specified as substituents for the aryl radicals (iii), where U is an —O—, —S— or —NR$^1$-moiety;
(v) C$_1$-C$_{12}$-alkoxy, hydroxyl, halogen or cyano;
B, B' are each independently joined to give a radical of the formula (a) or (b);
A is an arylene radical of the formulae

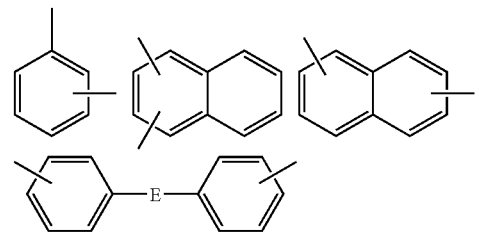

in which the phenylene or naphthylene rings may be mono- or polysubstituted by C$_1$-C$_{18}$-alkyl,
where the A radicals may be the same or different when they occur more than once in formula I;
E is a chemical bond, methylene or isopropylene;
Y, Y$^1$ are each —O—;
R are identical radicals:
C$_1$-C$_{30}$-alkyl whose carbon chain may be interrupted by one or more —O— and/or —CO— moieties and which may be mono- or polysubstituted by: C$_1$-C$_6$-alkoxy, cyano and/or aryl which may be mono- or polysubstituted by C$_1$-C$_{18}$-alkyl or C$_1$-C$_6$-alkoxy;
phenyl, naphthyl, pyridyl or pyrimidyl, each of which may be mono- or polysubstituted by: C$_1$-C$_{18}$-alkyl, C$_1$-C$_6$-alkoxy, halogen, cyano, nitro, —CONR$^2$R$^3$, —SO$_2$NR$^2$R$^3$, phenyl- and/or naphthylazo, each of which may be mono- or polysubstituted by C$_1$-C$_{10}$-alkyl, C$_1$-C$_6$-alkoxy and/or cyano;
C$_5$-C$_8$-cycloalkyl which may be mono- or polysubstituted by C$_1$-C$_6$-alkyl,
R$^1$ is hydrogen or C$_1$-C$_6$-alkyl;
R$^2$, R$^3$ are each independently hydrogen;
C$_1$-C$_{18}$-alkyl which may be mono- or polysubstituted by C$_1$-C$_6$-alkoxy, hydroxyl, halogen and/or cyano;
aryl or hetaryl, each of which may be mono- or polysubstituted by C$_1$-C$_6$-alkyl and/or the above radicals specified as substituents for alkyl;

n is 1 or 2;
m is 0 or 1 where m=n−1;
x, when n=1:
  is from 2 to 4 or else 0 when the B radicals and the B' radicals are each a radical of the formula (b);
  when n=2:
  is from 2 to 4 when the B radicals and the B' radicals are each a radical of the formula (a);
  is 0 when the B and B' radicals are each a radical of the formula b);
z is from 0 to 4, where x+z≦4;
z1 is 0.

4. A process for preparing polychromophores based on rylenetetracarboximides of the general formula Ia

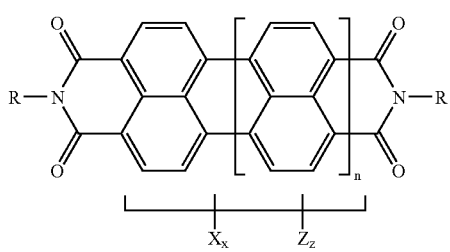

which comprises reacting a halogenated rylenetetracarboximide of the general formula IIa

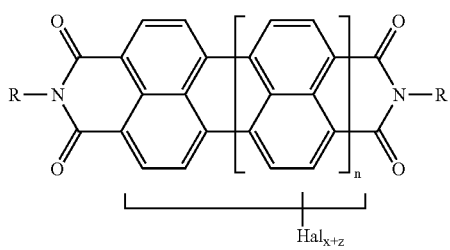

in which Hal is chlorine or bromine, in the presence of a base and of a non-nucleophilic solvent, a) with from 0.8 to 1.2 mol per mole of halogen atom to be exchanged of a rylenedicarboximide derivative of the general formula IIIa

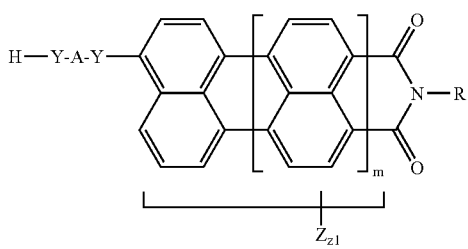

to give a rylenetetracarboximide of the general formula Ia in which z=0 or b) reacting it first with from 0.8 to 1.2 mol per mole of halogen atom to be exchanged of a rylenedicarboximide derivative of the formula IIIa and then with from 0.8 to 3 mol per mole of further halogen atom to be exchanged of a compound of the general formula IV

H—Z    IV or first with from 0.8 to 1.2 mol per mole of halogen atom to be exchanged of a compound of the formula IV and then with from 0.8 to 1.2 mol per mole of further halogen atom to be exchanged of a rylenedicarboximide derivative of the formula IIIa or simultaneously with in each case from 0.8 to 1.2 mol per mole of halogen atom to be exchanged of the rylenedicarboximide derivative of the formula IIIa and of the compound of the formula IV to give a rylenetetracarboximide of the formula Ia in which z≠0, wherein the variables are defined as follows:

X is a rylenedicarboximide radical of the formula

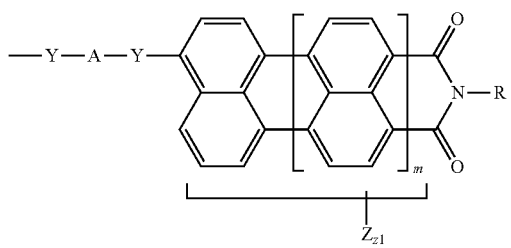

where the X radicals may be the same or different;

Z is aryloxy, arylthio, hetaryloxy or hetarylthio, to each of which may be fused further saturated or unsaturated 5- to 7-membered rings whose carbon skeleton may be interrupted by one or more —O—, —S—, —NR$^1$—, —N=CR$^1$—, —CO—, —SO— and/or —SO$_2$-moieties, where the entire ring system may be mono- or polysubstituted by the (i), (ii), (iii), (iv) and/or (v) radicals:

(i) C$_1$-C$_{30}$-alkyl whose carbon chain may be interrupted by one or more —O—, —S—, —NR$^1$—, —N=CR$^1$—, —C≡C—, —CR$^1$=CR$^1$—, —CO—, —SO— and/or —SO$_2$— moieties and which may be mono- or polysubstituted by: C$_1$-C$_{12}$-alkoxy, C$_1$-C$_6$-alkylthio, —C≡CR$^1$, —CR$^1$=CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or saturated or unsaturated C$_4$-C$_7$-cycloalkyl whose carbon skeleton may be interrupted by one or more —O—, —S—, —NR$^1$—, —N=CR$^1$—, —CR$^1$=CR$^1$—, —CO—, —SO— and/or —SO$_2$— moieties, where the aryl and cycloalkyl radicals may each be mono- or polysubstituted by C$_1$-C$_{18}$-alkyl and/or the above radicals specified as substituents for alkyl;

(ii) C$_3$-C$_8$-cycloalkyl whose carbon skeleton may be interrupted by one or more —O—, —S—, —NR$^1$—, —N=CR$^1$—, —CR$^1$=CR$^1$—, —CO—, —SO— and/or —SO$_2$— moieties and to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by: C$_1$-C$_{18}$-alkyl, C$_1$-C$_{12}$-alkoxy, C$_1$-C$_6$-alkylthio, —C≡CR$^1$, —CR$^1$=CR$^1{}_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iii) aryl or hetaryl, to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by: C$_1$-C$_{18}$-alkyl, C$_1$-C$_{12}$-alkoxy, C$_1$-C$_6$-alkylthio, —C≡CR$^1$, —CR$^1$=CR$^1_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$, —SO$_3$R$^2$, aryl and/or hetaryl, each of which may be mono- or polysubstituted by C$_1$-C$_{18}$-alkyl, C$_1$-C$_{12}$-alkoxy, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ and/or —SO$_3$R$^2$;

(iv) a —U-aryl radical which may be mono- or polysubstituted by the above radicals specified as substituents for the aryl radicals (iii), where U is an —O—, —S—, —NR$^1$—, —CO—, —SO— or —SO$_2$— moiety;

(v) C$_1$-C$_{12}$-alkoxy, C$_1$-C$_6$-alkylthio, —C≡CR$^1$, —CR$^1$=CR$^1_2$, hydroxyl, mercapto, halogen, cyano, nitro, —NR$^2$R$^3$, —NR$^2$COR$^3$, —CONR$^2$R$^3$, —SO$_2$NR$^2$R$^3$, —COOR$^2$ or —SO$_3$R$^2$, where the Z radicals may be the same or different when z>1 and/or z1>1;

A is a bridging member having at least one aromatic or heteroaromatic radical, where the Y or Y and Y$^1$ groups are bonded to the aromatic or heteroaromatic radical;

Y is —O— or —S—;

Y$^1$ is —O—, —S— or —NR$^1$—;

R is hydrogen;

C$_1$-C$_{30}$-alkyl whose carbon chain may be interrupted by one or more —O—, —S—, —NR$^1$—, —N=CR$^1$—, —C≡C—, —CR$^1$=CR$^1$—, —CO—, —SO— and/or —SO$_2$— moieties and which may be mono- or polysubstituted by the (ii), (iii), (iv) and/or (v) radicals specified as substituents for the Z radicals;

C$_3$-C$_8$-cycloalkyl to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by the (i), (ii), (iii), (iv) and/or (v) radicals specified as substituents for the Z radicals;

aryl or hetaryl, to which may be fused further saturated or unsaturated 5- to 7-membered rings whose carbon skeleton may be interrupted by one or more —O—, —S—, —NR$^1$—, —N=CR$^1$—, —CR$^1$=CR$^1$—, —CO—, —SO— and/or —SO$_2$— moieties, where the entire ring system may be mono- or polysubstituted by the (i), (ii), (iii), (iv), (v) radicals specified as substituents for the Z radicals, and/or aryl- and/or hetarylazo, each of which may be mono- or polysubstituted by C$_1$-C$_{10}$-alkyl, C$_1$-C$_6$-alkoxy and/or cyano;

where the R radicals may be the same or different when they occur repeatedly in formula I;

R$^1$ is hydrogen or C$_1$-C$_{18}$-alkyl, where the R$^1$ radicals may be the same or different when they occur more than once;

R$^2$, R$^3$ are each independently hydrogen;

C$_1$-C$_{18}$-alkyl whose carbon chain may be interrupted by one or more —O—, —S—, —CO—, —SO— and/or —SO$_2$— moieties and which may be mono- or polysubstituted by C$_1$-C$_{12}$-alkoxy, C$_1$-C$_6$-alkylthio, hydroxyl, mercapto, halogen, cyano, nitro and/or —COOR$^1$;

aryl or hetaryl, to each of which may be fused further saturated or unsaturated 5- to 7-membered rings whose carbon skeleton may be interrupted by one or more —O—, —S—, —CO— and/or —SO$_2$— moieties, where the entire ring system may be mono- or polysubstituted by C$_1$-C$_{12}$-alkyl and/or the above radicals specified as substituents for alkyl;

n is 1, 2 or 3;

m is 0, 1 or 2;

x when n=1:
  is from 2 to 4;
when n=2:
  is from 2 to 6;
when n=3:
  is from 2 to 4;

z is from 0 to 8, where x+z≦8, and, when n=2 or 3: z≠0 when x=0; and z1 when m=0: 0;
  when m=1: from 0 to 2;
  when m=2: from 2 to 4.

5. A mixture of compounds of the following formula Ia1:

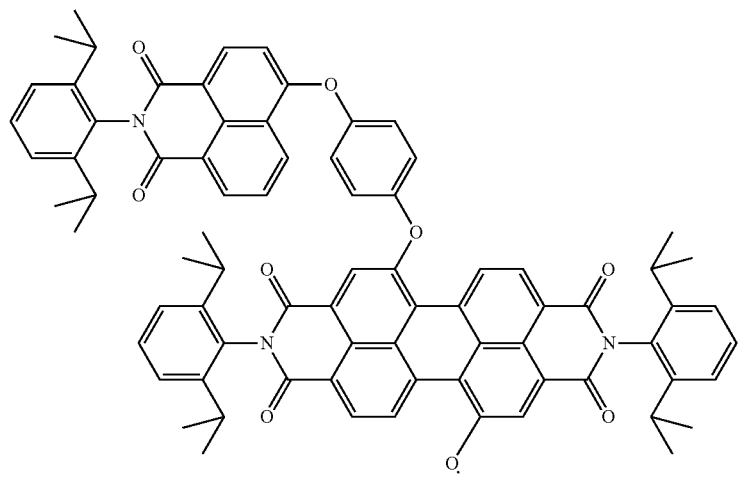

-continued
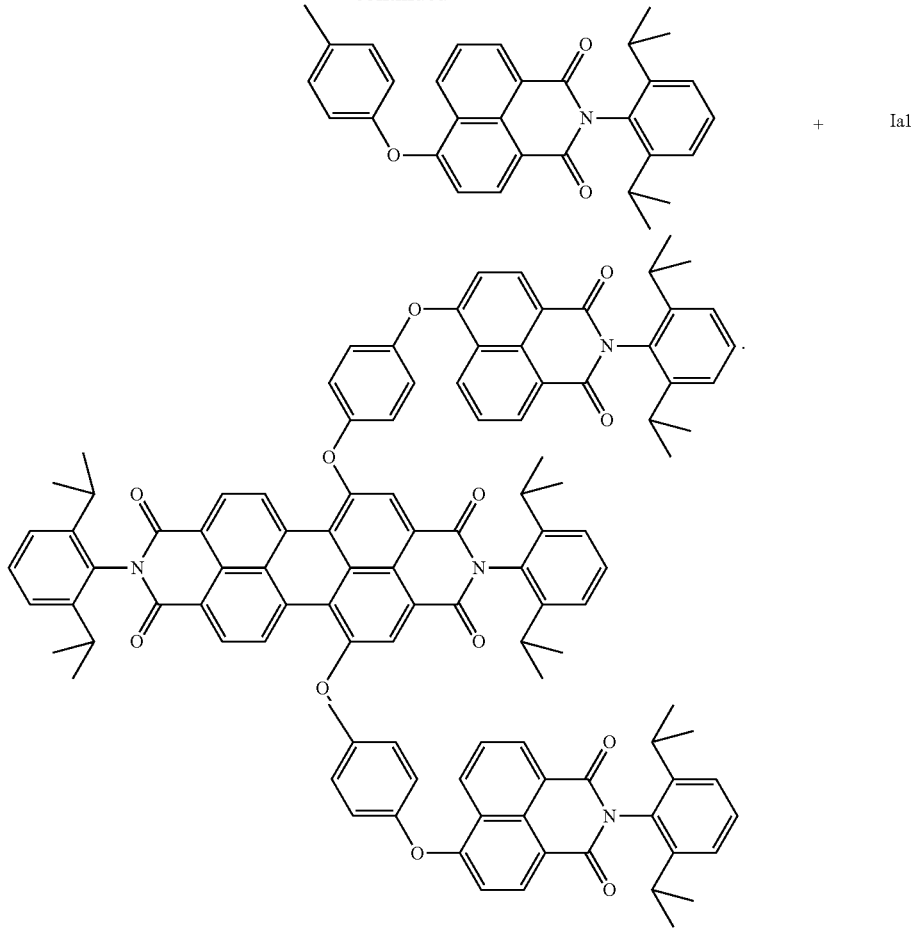
\* \* \* \* \*